(12) United States Patent
Goldberg

(10) Patent No.: US 11,816,624 B2
(45) Date of Patent: Nov. 14, 2023

(54) DELIVERY OF FOOD ITEMS BY AERIAL OR GROUND DRONES TO AND FROM DELIVERY VEHICLES

(71) Applicant: Zume Inc., Mountain View, CA (US)

(72) Inventor: Joshua Gouled Goldberg, San Bruno, CA (US)

(73) Assignee: CONGRUENS GROUP, LLC, San Carlos, CA (US)

( * ) Notice: Subject to any disclaimer, the term of this patent is extended or adjusted under 35 U.S.C. 154(b) by 640 days.

(21) Appl. No.: 16/696,537

(22) Filed: Nov. 26, 2019

(65) Prior Publication Data

US 2020/0167722 A1 May 28, 2020

Related U.S. Application Data

(60) Provisional application No. 62/771,870, filed on Nov. 27, 2018.

(51) Int. Cl.
| | | |
|---|---|---|
| *B64C 39/02* | (2023.01) | |
| *G08G 5/00* | (2006.01) | |
| *G06Q 10/0832* | (2023.01) | |
| *B64D 9/00* | (2006.01) | |
| *B64U 80/86* | (2023.01) | |
| *B64U 101/60* | (2023.01) | |

(52) U.S. Cl.
CPC ....... *G06Q 10/0832* (2013.01); *B64C 39/024* (2013.01); *B64D 9/00* (2013.01); *G08G 5/003* (2013.01); *G08G 5/0013* (2013.01); *G08G 5/0043* (2013.01); *B64U 80/86* (2023.01); *B64U 2101/60* (2023.01); *B64U 2201/10* (2023.01)

(58) Field of Classification Search
CPC .............. G06Q 10/0832; B64C 39/024; B64C 2201/128; B64C 2201/141; B64C 2201/208; B64D 9/00; G08G 5/0013; G08G 5/003; G08G 5/0043; G08G 5/0026; G08G 5/0034; G08G 5/0069
USPC ......................................................... 705/332
See application file for complete search history.

(56) References Cited

U.S. PATENT DOCUMENTS

| | | | | |
|---|---|---|---|---|
| 9,305,280 | B1* | 4/2016 | Berg | ......................... B64D 5/00 |
| 9,840,340 | B2* | 12/2017 | O'Toole | ............... G06Q 10/083 |
| 2018/0141682 | A1* | 5/2018 | Blake | .................... B64C 39/024 |
| 2018/0253805 | A1* | 9/2018 | Kelly | .................. G06Q 20/385 |
| 2019/0050952 | A1* | 2/2019 | Goldberg | ................ A47J 36/32 |

* cited by examiner

*Primary Examiner* — Tyler D Paige
(74) *Attorney, Agent, or Firm* — Goodwin Procter LLP

(57) ABSTRACT

Technologies are generally described for preparation and drone based delivery of food items. In some examples, a delivery vehicle may be arranged for autonomous or semi-autonomous preparation of food items while the vehicle is en route to a delivery destination or parked at the delivery destination. Aerial and/or ground based drones, which may be stored in the vehicle, may be loaded with prepared food items and deliver their payloads to delivery locations. Preparation timing and other parameters for the food items, travel parameters for the delivery vehicle, and/or the delivery destination may be selected based on suitability of the delivery destination for launching/recovering the drones or delivery of the food items to the delivery locations. The drones may carry multiple payloads to multiple locations and may have environmentally controlled storage.

16 Claims, 26 Drawing Sheets

DELIVERY OF FOOD ITEMS BY AERIAL OR GROUND DRONES TO AND FROM DELIVERY VEHICLES

CROSS-REFERENCE TO RELATED APPLICATIONS

This application claims the benefit of U.S. Provisional Patent Application Ser. No. 62/771,870 filed on Nov. 27, 2018. The disclosures of the above-listed provisional application are hereby incorporated by reference for all purposes.

BACKGROUND

Unless otherwise indicated herein, the materials described in this section are not prior art to the claims in this application and are not admitted to be prior art by inclusion in this section.

Conventional food supply chains often include a source or initial supplier of raw ingredients for food products for human consumption, such as plant-based or animal-based ingredients. The ingredients are often transported from the source to one or more processing facilities, where the raw ingredients are prepared into food products including one or more intermediate ingredients and eventually prepared into marketable food products intended for direct human consumption. The food products are then often transported from the processing facilities to locations where consumers can select and/or consume the food products, such as homes, grocery stores, restaurants, etc. Food items in a meal kit are normally processed in a plurality of facilities. The processed food items are then concentrated at a packing facility for packing. A lot of time is typically wasted during those processes, and during transit between the various facilities, generally resulting in a degradation of freshness of food items.

BRIEF SUMMARY

The present disclosure generally describes aerial or ground based drone delivery of food products to and from preparation and delivery vehicles.

According to some examples, a vehicle for preparation and drone based delivery of food items is described. The vehicle may include a cargo area configured to provide a sterile environment for preparation of the food items; a storage area for a plurality of drones, the plurality of drones configured to carry payloads comprising the food items to a plurality of delivery locations; and one or more docking stations configured to provide a secure docking mechanism to the plurality of drones; facilitate transfer of the food items as the payloads to the plurality of drones; and provide a launching mechanism for the plurality of drones. The vehicle may also include an on-board controller configured to determine vehicle travel information, drone travel information, food item information, and preparation information associated with the food items to be prepared and delivered; control one or more food preparation equipment to execute the preparation of the food items; adjust one or more parameters of the preparation of the food items based on one or more of the vehicle travel information, availability of the plurality of drones, or delivery progress of the plurality of drones; and control an operation of the plurality of drones to carry the prepared food items from the delivery destination to the plurality of delivery locations.

According to other examples, a docking station for a food item preparation and delivery vehicle is described. The docking station may include a base affixed to a roof or a sidewall of a cargo area of the vehicle; and one or more docks, each of the one or more docks coupled to a transfer mechanism to receive prepared food items from the cargo area of the vehicle. The one or more docks may be configured to provide a secure docking mechanism to a plurality of drones configured to deliver the prepared food items from a delivery destination of the vehicle to a plurality of delivery locations; transfer of the food items received from the cargo area of the vehicle as payloads to the plurality of drones; and provide a launching mechanism for the plurality of drones.

According to further examples, a system for preparation and drone based delivery of food items is described. The system may include a plurality of drones configured to carry payloads comprising the food items to a plurality of delivery locations; and a vehicle. The vehicle may include a cargo area configured to provide a sterile environment for preparation of the food items; one or more docking stations configured to provide a secure docking mechanism to the plurality of drones; facilitate transfer of the food items as the payloads to the plurality of drones; and provide a launching mechanism for the plurality of drones; and a controller. The controller may be configured to determine vehicle travel information, drone travel information, food item information, and preparation information associated with the food items to be prepared and delivered; transmit instructions to an on-board controller of the vehicle to control one or more food preparation equipment to execute the preparation such that the food items; adjust one or more parameters of the preparation of the food items based on one or more of the vehicle travel information, availability of the plurality of drones, or delivery progress of the plurality of drones; and control an operation of the plurality of drones to carry the prepared food items from the delivery destination to the plurality of delivery locations.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In some instances, structures and methods associated with the cultivation, harvesting, processing, preparation, cooking, transport, and delivery of food ingredients of prepared food items have not been shown or described in detail to avoid unnecessarily obscuring descriptions of the implementations.

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Briefly stated, technologies are described for preparation and drone based delivery of food items. In some examples, a delivery vehicle may be arranged for autonomous or semi-autonomous preparation of food items while the vehicle is en route to a delivery destination or parked at the delivery destination. Aerial and/or ground based drones, which may be stored in the vehicle, may be loaded with prepared food items and deliver their payloads to delivery locations. Preparation timing and other parameters for the food items, travel parameters for the delivery vehicle, and/or the delivery destination may be selected based on suitability of the delivery destination for launching/recovering the drones or delivery of the food items to the delivery locations. The drones may carry multiple payloads to multiple locations and may have environmentally controlled storage.

Figure 1:
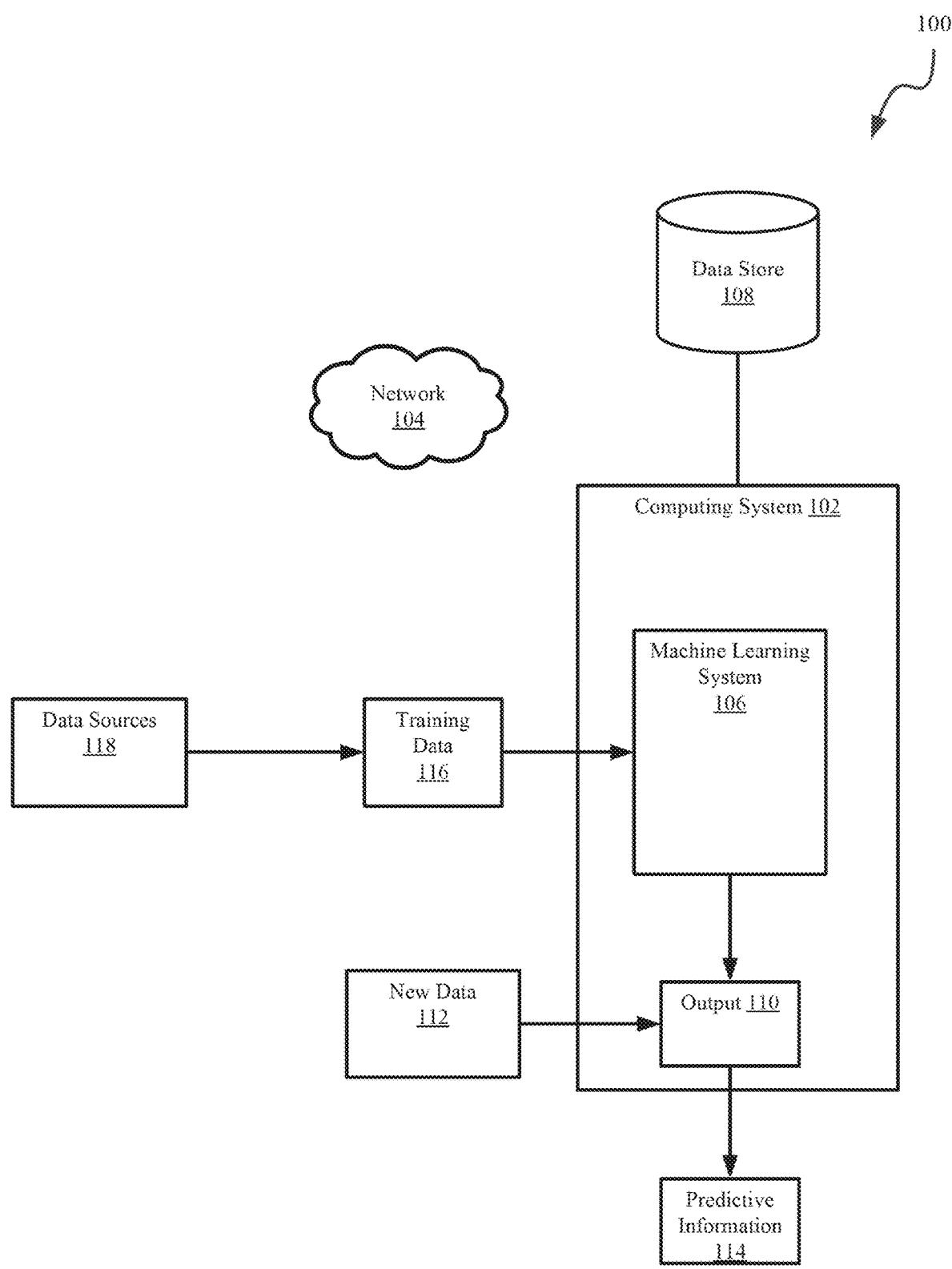
FIG. 1 is a schematic diagram of an illustrative networked environment for facilitating logistics via implementation of machine learning systems.

FIG. 1 shows a processor-based networked environment 100 in which one or more artificial machine learnings are implemented that interact with a set of subsystems to generate predictive information regarding one or more food items. The environment 100 comprises a computational system 102 that communicates over a network 104 with other entities in the environment 100. The computational system 102 comprises software and hardware including one or more processors coupled to memory storing a set of executable instructions that, as a result of execution by the one or more processors, cause the computational system 102 to perform one or more operations described herein. The computational system 102 may include additional components to fulfill the operations described herein, such as a communication interface for communicating over the network 104. The network 104 may include public and private networks, such as cellular telephone networks, the internet, local area networks, and wide area networks, by way of non-limiting example.

The environment 100 further comprises a machine learning system 106 that includes one or more machine learning layers between input and output layers thereof and that can model complex non-linear relationships. Machine learning systems generate compositional models where the object is expressed as a layered composition of primitives. The extra layers enable composition of features from lower layers, potentially modeling complex data with fewer units than a similarly performing shallow network. The machine learning system 106 may be implemented by executing a set of executable instructions stored in memory of the environment 100 that, as a result of execution by one or more processors, cause performance of one or more operations described herein. The machine learning system 106 may be part of the computational system 102 (e.g., common memory and/or processors) or may be implemented using one or more components common to the computational system 102 and the machine learning system 106. The machine learning system 106 may process training data 116 obtained from one or more other entities of the environment 100 to generate an output that is useable to predict information about one or more aspects of the food products in the future. The training data 116 may be stored in a non-transitory training data 116 store 108 communicatively coupled to the machine learning system 106.

The machine learning system 106 may obtain training data 116 from system entities and use that data to generate an output that predicts or forecasts circumstances that will exist in the environment 100 in the future given a set of inputs. The machine learning system 106 may be trained using supervised or unsupervised learning, or may perform supervised or unsupervised learning during operation. Supervised learning is the machine learning task of inferring a function from labeled training data 116 and unsupervised learning is a type of machine learning algorithm used to draw inferences from datasets consisting of input data without labeled responses. Unsupervised learning is a type of machine learning algorithm used to draw inferences from datasets consisting of input data without labeled responses. An output 110 generated by the machine learning system 106 is useable generate predictive information 114 based at least in part on new or current data 112 obtained from the system entities and machine learning training.

The predictive information 114 provided using the output 110 of the machine learning system 106 may be predictive of one or more supply need aspects of the food products, or other aspects described herein. As one example, the machine learning system 106 may obtain food product ordering data indicating a number of a particular food product ordered over a period of time in a given region and associated data (e.g., social event data and weather data for the time and region), and use the food product ordering data and associated data to generate an output 110 useable to predict supply need at a future time for the food product or ingredients thereof using new data. As another example, the machine learning system 106 may obtain ingredient supply data regarding a set of ingredients used to make food products (e.g., the amount of ingredients produced in a period of time) and associated data (e.g., weather data and data regarding the farms at which the ingredients were grown), and process the ingredient supply data and associated data to generate an output 110 useable to predict supply of one or more of the set of ingredients at a future time using new data. The output 110 generated and the training data 116 used for generation of the output may involve various aspects of the supply chain, including growth, harvesting, processing, transport, preparing, cooking, delivery, and sales, by way of non-limiting example.

The output of the machine learning system 106 provides efficiencies and optimizations that were not previously provided in at least some food product supply chains. The output 110 may process new information 112 obtained from farms, stores, social media, etc., to provide predictive information 114 that system entities in the environment 100 may use to determine predicted supply need information and/or supply information for ingredients. Using the predicted supply need information, stores may coordinate with suppliers and logistics providers to ensure that an appropriate amount of ingredients is provided. The predictive information indicates to farmers that a certain amount of each ingredient will need to be produced. Moreover, the predictive information may specify conditions sufficient to satisfy supply need while optimizing production—for example, when, where, and how much of an ingredient should be planted. The predictive information may indicate when an ingredient should be harvested and loaded onto a truck for shipping to optimize ripeness of the ingredient upon delivery. The predictive information may indicate how product should be loaded onto a truck to achieve stability of the ingredients during transit, and the route which the truck should take to deliver to help optimize the ripeness of the ingredients. Further, based on the predictive information provided, food products can be prepared while on the truck using the ingredients so that cooking of the food products is completed just as the delivery truck arrives at a customer destination. Other benefits provided according to the instant disclosure include reduced waste of ingredients, elimination of middlemen, improved variety of ingredients, and improved freshness and quality of food products and the ingredients thereof. Those of ordinary skill in the art will appreciate these and other benefits according to the instant disclosure.

The training data 116 is obtained from a plurality of sources within the environment 100 including sources providing data regarding one or more of the following aspects: supply need and sales for food products and the ingredients thereof, supply of ingredients (e.g., amounts of ingredients provided, sufficiency of ingredients, quality of ingredients), weather, events, economic and/or financial indicators, transit, traffic, farming, scheduling, production time, and geography and/or location data. Individual sources may provide training data fitting into one or more of the above-categories, or other data described herein. In some implementations, the sources of the training data 116 may provide the training data 116 with a label associated with a corresponding data input object such that the machine learning system 106 may be trained at least in part according to supervised machine learning principles. In some implementations, the training data 116 may be labelled by an entity (e.g., control subsystem 102) after being provided by the source. In at least some of those implementations, the data may be labelled based on identification information associated with the data—for example, based on an identifier provided with the data. In some implementations, one or more of the sources may provide the data without a label such that the machine learning system 106 may be trained at least in part according to unsupervised machine learning principles.

The training data 116 is obtained from a variety of data sources 118 in the environment 100 and provided to the machine learning system 106. Illustrative examples of the sources of the training data 116 are as follows:

Sources 118 include sources of data regarding historical use of ingredients used thereof include physical supply locations (e.g., brick and mortar stores, kiosks), online sellers, vending machines, and vehicles equipped to prepare and provide food products to consumers. The data regarding historical use of ingredients for food products may include order information regarding one or more orders placed by physical suppliers or for automated production delivery vehicles, such as an amount of food products ordered or an amount of one or more ingredients used to prepare the food product ordered. The sources may provide the data in response to each sale or as a result of accumulating data regarding a number of sales.

Sources 130 of data regarding supply of ingredients include farms, butchers and meat producers, and food processing entities (for obtaining cheese, flour, tortillas, etc.). The data regarding supply of ingredients includes supply information indicating an amount of ingredients supplied by the respective sources 130 over periods of time. Supply information provided by farms may indicate one or more of the following: amounts of ingredients planted, amounts of ingredients harvested, attrition of planted ingredients, amounts of livestock born, attrition of livestock, and information regarding livestock sold to butchers and meat producers (e.g., age, weight, gender, health, quantity sold). Farms may provide other information for which associations may be created with supply data, including soil type, feed used for livestock, crop rotation information, chemicals used (e.g., pesticides, fungicides), occurrences of infestations, and types and amounts of farming equipment possessed for use in connection with farming operations (e.g., tractors and attachments thereto). The supply data provided by butchers and meat producers may indicate one or more of the following: information regarding livestock received (e.g., age, weight, gender, health, quantity purchased), equipment possessed (e.g., meat grinders, packaging devices, sausage stuffers), and information about meat products produced (e.g., types of products, quality of meat, wasted product, amounts of product produced, weights of packaged items). Food processing entities may process ingredients purchased from suppliers (e.g., farmers, wholesalers) to produce processed foods, such as cheese, flour, and bread. Supply information provided by food processing entities indicates one or more of the following: amounts and types of ingredients obtained to make food, equipment possessed, amounts and type of product produced using the ingredients obtained, and time taken to produce the product.

In some implementations, equipment of the supply data sources 130 may be equipped or associated with sensing devices that measure production characteristics, such as an amount of a product produced by the equipment or an amount of ingredient used to produce the product. For instance, a tractor may include sensor devices or subsystems that detect an amount of produce produced relative to the area or distance travelled. Data collected by various sensor devices or subsystems may be aggregated and provided to the control subsystem 102 or other entity in the environment 100. Individual ones of the supply data 130 sources may provide the supply information on a periodic basis or in response to a request to provide the information.

The environment 100 may include event data sources 138 from which data may be obtained regarding marketing activities or events in one or more geographic areas. Marketing activities and events are activities and events occurring at a scheduled time, date, and location for a designated purpose. Examples of marketing activities and events include concerts, sporting events, political rallies, protests, theatrical events, holiday events (e.g., events celebrating New Year's Eve, Halloween, July $4^{th}$), and conferences. Sources 138 for providing the data regarding marketing activities or events obtain data regarding the events and provide the data to the machine learning system 106 directly or indirectly. The event data sources 138 may include hardware and software comprising one or more sets of instructions stored in memory that, as a result of execution by one or more processors, cause performance of operations described herein.

Obtaining event data from the event data sources 138 may involve using automated agents or bots that scrape or crawl websites, social media, calendars, and applications to identify and extract data regarding the marketing events and activities. For instance, the event data sources 138 may crawl websites of concert artists, venues, or ticketing websites to identify information about upcoming and past music concerts in a geographic area. The data sources 138 may extract information from the websites, such as time, date, and location of the concerts, as well as other data, such as venue capacity and ticket sale information. Obtaining the event data from the event data sources 138 may involve performing one or more database queries searching for data regarding marketing events or activities in a geographic region for one or more periods of time. The data sources 138 may provide marketing event and activity data for future as well as past events. Past marketing event and activity data may be used as training data for the machine learning system 106. For instance, past marketing event and activity data may be processed in association with historical order information of orders contemporaneous and proximate to the time and location of the event or activity. The machine learning system 106 may process future marketing event and activity data to generate predictive information 114 indicating supply need of one or more ingredients.

The environment 100 further include sources of economic indicator data 140 from which data may be obtained regarding one or more economic indicators that indicate trends in a national economy. Examples of economic indicators include retail sales, employment and labor market statistics, current stage of economic cycle, personal income, Gross Domestic Product (GDP), Money Supply (M2), Consumer Price Index (CPI), Producer Price Index (PPI) and Consumer Confidence Surveys. The sources of economic indicator data 140 may include public agencies, departments, and bureaus responsible for maintaining economic data and statistics (e.g., U.S. Bureau of Labor Statistics, U.S. Treasury, U.S. Department of Commerce, Federal Deposit Insurance Corporation, U.S. Bureau of Economic Analysis, U.S. Federal Reserve); private companies and firms providing and maintaining records of economic data and statistics; and specialized associations and organizations (e.g., The Conference Board, Organization for Economic Cooperation and Development). Obtaining economic indicator data from the sources of economic indicator data 140 may include accessing a database or website from which the economic indicator data is obtained—for example, by performing a database query for the economic indicator data or downloading a collection of data objects comprising economic indicator data. Obtaining the economic indicator information may involve using automated agents or bots that scrape or crawl websites to identify and extract economic indicator data. The training data 116 may include past economic indicator data used in association with historical order information to train the machine learning system 106. Accordingly, the output 110 of the machine learning system 106 may generate predictive information regarding at least a future supply need of one or more of the ingredients of food products in a future period of time.

The environment 100 may include sources providing meteorological data and/or astronomical event data. Meteorological data is data regarding weather events, conditions, and characteristics, and may include data regarding past, current, and predicted indications of precipitation, temperature, wind, and atmospheric pressure, by way of non-limiting example. Astronomical event data is data relating to the sun and the moon, and includes data regarding sunrise events, sunset events, moonrise events, moonset events, moon phase, solar flares, tides, and sun angle. The meteorological data and/or astronomical data obtained may be associated with other data, such as temporal data indicating a date and/or time corresponding to the data, and geographical data indicating a geographical region corresponding to the data. The meteorological data and/or astronomical data may be obtained from websites or databases maintained by public or private entities, such as the National Oceanic and Atmospheric Administration, the National Weather Service, and the National Climatic Data Center. Current or contemporaneous meteorological data and/or astronomical data may be obtained from one or more sensors (e.g., photosensors, wind sensors, precipitation sensors, and thermal sensors) located within one or more geographical regions, and may be associated with temporal data and location data corresponding to the time, date, and/or place at which the data was collected. The data collected may be stored for use as training data 116 in the data store 108.

The environment 100 may also include sources of ingredient production information 142 that provide information regarding the production of an ingredient. The ingredient production information includes information regarding the time it takes for an ingredient to be produced, from inception to delivery. Such information regarding production includes an amount of time that an ingredient takes from inception to delivery, and may include information regarding production events from inception to delivery, such as a time and location at which each production event occurs (e.g., when and where a plant was harvested). The term "inception" as used herein refers to the event initiating the formation of an ingredient. In the context of flora (e.g., plants, fungus), inception may refer to the germination or planting of one or more flora. In the context of fauna, such as farm animals used for meat production, inception may refer to the successful impregnation an animal. In the context of ingredients that are generated by processing one or more other constituent ingredients (e.g., flour, pepperoni, and cheese), inception refers to the point at which at least one of the constituent ingredients is harvested, gathered, slaughtered, or otherwise obtained. In the case of cheese, for instance, inception refers to the point at which the milk is obtained from an animal to begin production of the cheese. In the case of flour, inception refers to the point at which the grain or plant matter is harvested.

The sources of ingredient production information 142 may also provide information relating to the ordering and delivery of seeds or starter plants used to produce the food ingredients. Information relating to ordering and delivery indicates an amount of time between when an order for seeds, starter plants, or other constituent is placed, and when the order is actually delivered or made available for pickup. The information relating to ordering and delivery may also indicate a supplier of the seeds or starter plants, distance between the source and destination, delivery progress throughout the shipment, information about the delivery vehicles involved in the transport, and condition information regarding internal and external conditions of the transport vehicle(s). Other constituent ingredients for which such information related to ordering and delivery include other units of floral reproduction, such as spores and root starters.

The sources of ingredient production information 142 may also provide time information indicating an amount of time that it takes to plant and grow the seeds or starter plants into plants that can be used to provide the ingredients. For instance, the information amount of time in which it takes an herb seed to grow into an herb plant from which herbs may be harvested, or the amount of time in which it takes a tomato seed to grow into a tomato plant bearing ripe tomatoes. The information indicating the amount of time may further indicate times that it takes the seed or starter plants into other stages of growth (e.g., vegetative stage, budding stage, flowering stage). The sources of ingredient production information 142 may also provide related information to the time information, such as farming conditions (e.g., method of growth, whether grown indoors/outdoors), types of plants grown, equipment used, time/date at which the seed or starter plant is grown, and other variables or factors that may affect plant growth, as described below.

The sources of ingredient production information 142 also provide harvesting information indicating an amount of time that it takes to harvest the plants. The harvesting information may indicate a time and date at which harvesting of the plants produced by the seeds or starter plants began, and a time and date at which harvesting of the plants ended. Harvesting information may include information regarding the equipment used to harvest the plants, types of plants harvested, space or resources available based on harvesting schedule, and other information affecting harvesting discussed herein. Harvesting may correspond to removal of the entire plant from the soil, or removal of a part or portion of the plant. Postharvest information may also be provided relating to the postharvest processing of plant matter after it has been removed from the ground and before it is loaded onto a vehicle for shipment. Postharvest processing information may include information regarding the postharvest processing, cleaning, trimming, sorting, packing, or drying processes of the plant matter after harvesting and before loading, and may include information indicating an amount of time taken in postharvest processing and the type of crop processed.

The sources of training data also include sources of food item production information 144 that provide information regarding the production of food items. The food item production information includes information regarding the time it takes for a food item to be produced, from the point of inception of an earliest ingredient to the point when the food item is delivered or ready for presentation to a customer. The food item production information may include information regarding one or more intermediate events in production or time periods in the production, such as a time at which an order for a food item is placed relative to when the food item is ready for delivery, or a time at which all ingredients sufficient to prepare a food item are delivered relative to when the order for the ingredients was placed. The sources of food item production information 144 may include one or more of physical brick-and-mortar stores in which the food items are assembled; automated devices (e.g., robots) that prepare, assemble, and cook the ingredients to create the food item; shipping intermediaries; and farms that grow the ingredients.

The machine learning system 106 or the computing system 102 may be trained as a result of least processing the training data 116 from the sources described herein. Training the machine learning system 106 may, in some instances, cause the machine learning system 106 or the computing system 102 to perform one or more operations described herein as a result of processing the training data 116. In at least some implementations, the trained machine learning system 106 or generate predictive information 114 regarding conditions that will be present in the environment 100 at a future time or period of time. In some implementations, the output 110 may generate or modify a set of instructions stored in the may be a set of executable instructions (e.g., program, application), or modifications to an existing set of executable instructions. In some implementations, the set of instructions may be part of the machine learning system 106 or the computational system 102. In some implementations, the set of instructions may correspond to an application or program separate from the machine learning system 106 or the computational system 102.

The machine learning system 106 implements one or more machine learning models (e.g., machine learning algorithms) to generate the output 110 using the training data 116 provided. The one or more machine learning models implemented by the machine learning system 106 include regression machine learning models in which the output a value is provided based on new information 112 received. Examples of regression machine learning models include linear regression, multivariate regression Least Absolute Selection Shrinkage Operator, logistic regression, random forest, learning vector quantization, support vector, k-nearest neighbor, and multivariate regression algorithms, by way of non-limiting example. The machine learning system 106 may implement multi-level or hierarchal approaches in which relationships between parameters in the training data 116 are determined in connection with generating the output 110—for example, Deep Learning models, machine learnings (e.g., Convolutional Neural Networks, Deep Neural Networks), and hierarchal Bayesian models. Those of ordinary skill in the art will appreciate that numerous machine learning models are applicable to generate the output 110 described herein without departing from the scope of the instant disclosure.

The machine learning system 106 provides predictive information regarding one or more aspects of the environment 100 to facilitate a short, inside-out supply chain ("SIOSC") in which ingredients are collected at a source and processed in transit to optimize freshness and quality at the time of delivery. In an SIOSC, ingredients for the food items are grown and ready just-in-time to be loaded onto a transport vehicle for shipment. The transport vehicles are equipped with automated robotics for processing a specific set of ingredients into a product. For example, the automated robotics prepare and cook tomatoes, basil, garlic, and onions into a tomato sauce during transit from the farm to another location. The transport vehicles are also equipped with environmental controlled storage (controlling for, e.g., temperature, moisture, light) to optimize the ripeness of the ingredients at destination delivery. The ingredients and/or product produced in the transport vehicle may be transferred to a delivery vehicle, which may prepare and deliver food items in transit to one or more destinations. Using preparation and delivery of a pizza as an example, the autonomous robotics in the delivery vehicle may slice pepperoni, toss a crust, place the requisite ingredients on the crust, and cook the pizza so that the pizza is ready as the delivery vehicle arrives at the delivery destination. In some implementations, the transit vehicle and delivery vehicle may be the same vehicle. In some implementations, there may be more than one transport vehicle.

At various points during the aforementioned SIOSC, training data 116 is provided to train the machine learning system 116 regarding scheduling, transport, preparation, harvesting, growing, and other aspects of the environment 100. As a result of this machine learning SIOSC, the ingredients go from farm to customer in a much shorter period of time than it typically takes in a national or regional distribution chain. The ingredients are picked so that they will be optimally ripe when used to prepare a food item 204 and food wastage is reduced. The machine learning aspects disclosed herein predict or forecast supply need of a food provider based on numerous factors and provide predictive information to entities in the environment 100 related to, e.g., scheduling, growing, transporting, and preparing the ingredients. This reduces the time and distance between the farm and customer's mouth, eliminates warehousing, reduces packaging and food waste, and improves freshness and quality of the food using machine learning to guide the process. Those of ordinary skill in the art will appreciate these and other benefits resulting from the systems and method disclosed herein.

Figure 2A:
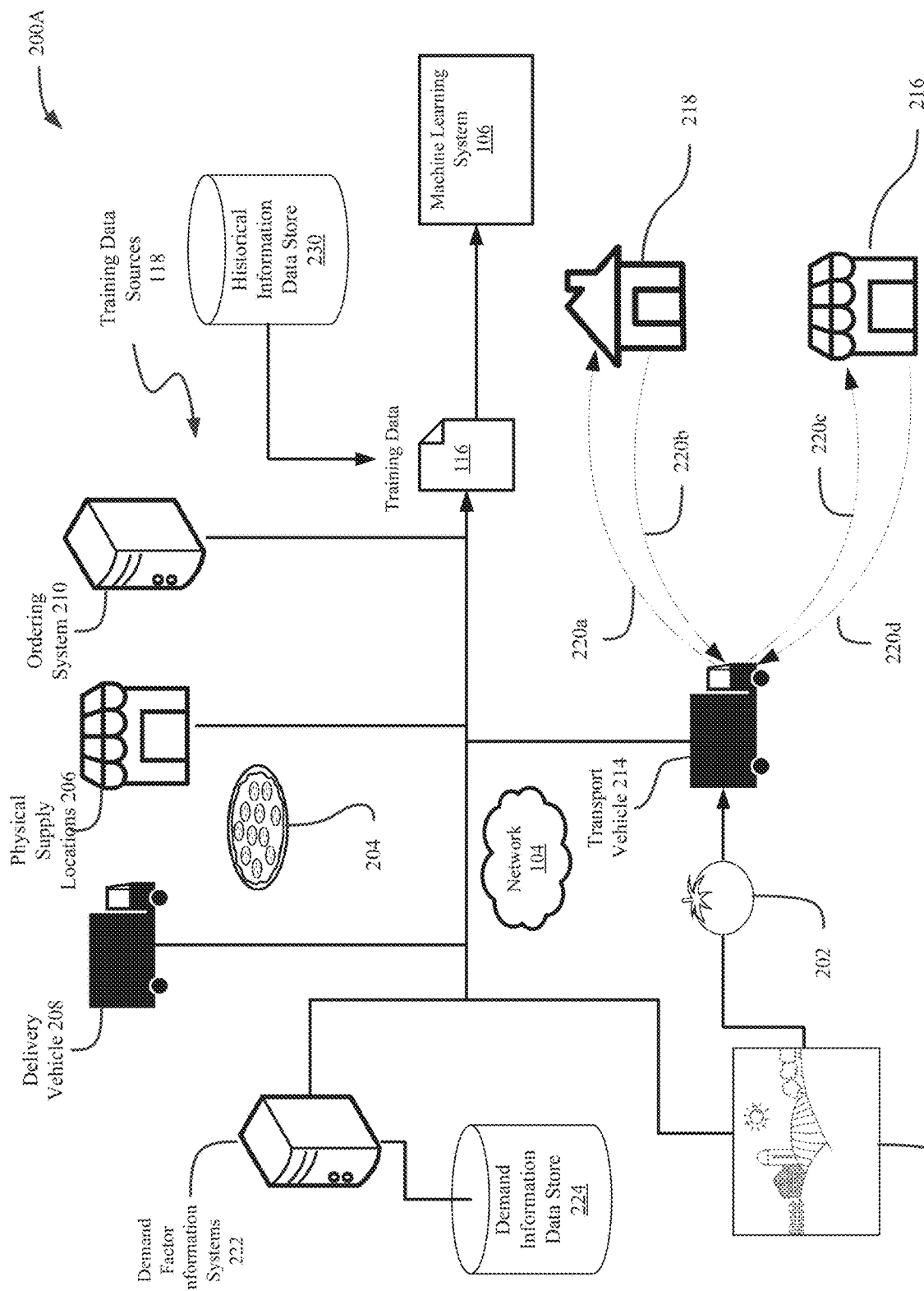
FIG. 2A is a second schematic diagram of an illustrative networked environment for facilitating logistics via implementation of machine learning systems.

FIG. 2A shows an illustrative environment 200A in which the machine learning system 106 is trained using training data 116 at a first point in time. The training data 116 is generated by a plurality of training data sources 118 and provided to the machine learning system 106. The machine learning system 106 processes the training data 116 according to one or more machine learning methods to generate the output 110. Historical information regarding events, economic indicators, etc., may be obtained and provided to the machine learning system 106, which may generate the output 110 at least in part using the historical information.

The training data sources 118 provide various information related to the production, transport, preparation, processing, and utilization of ingredients 202 and food items 204 for a specified service area. The training data sources 118 include physical supply entities 206, delivery vehicles 208, electronic ordering systems 210, ingredient producers 212, and transport vehicles 214 associated with the specified service area.

Physical supply entities 206 are any physical location at which food items 204 are prepared or made available to a customer for collection. The physical supply entities 206 include brick-and-mortar stores, kiosks, vending machines, and other stationary locations to which a customer comes to obtain food items 204. The physical supply entities 206 at least in part produce the food items 204, either automatically (i.e., via automated robotics) or manually, using the ingredients 202. The physical supply entities 206 track information regarding use of the ingredients 202 in preparing the food items, such as an amount (e.g., weight, volume, quantity) of each ingredient 202 used to prepare each food items 204. The information may correlate the amount of each ingredient 202 used with a corresponding food item 204 prepared, or may correlate the amount of ingredients 202 used for a plurality of food item 204 prepared. In either case, the amount of ingredient 202 used is associated with a particular type of food item 204, such as the amount of cheese used to prepare a pizza.

The training data 116 provided by the physical supply entities 206 includes information representative of use of the ingredients 202 used in preparation of the food items 204, including information indicating an amount of the ingredients 202 used for preparation of each food item 204. The training data 116 may include information regarding an amount of time the food items 204 took to prepare. Additional information may be included or associated with information provided by the physical supply entities 206, such as whether the entity preparing the food items 204 is human or robotic. The physical supply entities 206 may be coupled to an inventory control or enterprise business system such that the supply and use of the ingredients 202 is tracked. Equipment in the physical supply entities 206 may include sensors or tracking devices (e.g., radio-frequency identification devices) for tracking the use and supply of the ingredients 202 in connection with producing the food items 204.

Delivery vehicles 208 are vehicles that deliver food items 204 to a location specified by the customer. Delivery vehicles 208 providing the training data 116 as discussed herein include production delivery vehicles and standard delivery vehicles. Standard delivery vehicles 208 are delivery vehicles in which prepared food items 204 (e.g., cooked) are loaded and delivered to a customer specified location. Automated delivery vehicles are equipped with automated preparation systems comprising hardware and software that at least in part prepares or cooks the food items 204 during transit. For example, a production delivery vehicle may automatically cook a pizza during transit to the customer specified location without a human specifying or controlling a cooking temperature or cooking time of the pizza during transit. Production delivery vehicles may implement automated driving systems (i.e., self-driving cars) in which a human does not control navigation of the delivery vehicle 208 during transit, and non-automated vehicles in which a human controls navigation of the delivery vehicle 208. In some implementations, the delivery vehicles 208 are also the transport vehicles 214 that transport ingredients 202 from an ingredient producer 212 to a physical supply location 206 or a customer-specified location. In such implementations, the transport vehicles 214 may be production delivery vehicles 208 that are part of a farm-to-table delivery system in which the ingredients 202 are loaded onto the production vehicle at an ingredient producer 212 location, and the production vehicle prepares the food items 204 in transit so that the food item 204 finishes cooking just as the production vehicle arrives at the customer-specified location.

The training data 116 provided from the delivery vehicles 208, in some implementations, includes information regarding delivery of the food items 204. Such information indicates the time the delivery vehicle 208 to deliver food items 204. The delivery vehicles 208 may also provide time information regarding when delivery of the food item(s) 204 began and was completed, location information indicating their location along a delivery route at various times (e.g., global positioning system information), and the route taken. Traffic condition data indicating traffic conditions along one or more delivery routes may be obtained and associated with the training data 116 provided by the delivery vehicles 208. In implementations where the delivery vehicle 208 is a production delivery vehicle, the delivery vehicle 208 may provide training data 116 representative of the use of one or more ingredients used in preparation of the food items 204, and may further be representative of an amount of time taken to respectively prepare and cook the food item 204.

The electronic ordering system 210 is a processor-based system that tracks customer order information of food item 204 orders placed by customers. Such order information may include information indicating what food items 204 were ordered, date and time the food items 204 were ordered, the location where possession of the ordered food items 204 was transferred to the customer, etc. The order information may specify, for each respective food item 204 of a number of available food items 204, a total number of instances of orders for a respective type of prepared food item 204 in a defined period of time for the service area. The information regarding order instances may be for orders placed or orders fulfilled within the defined period of time. The ordering system 210 may be part of or interface with an online ordering system in which customers may place orders for food items 204 through a Website or application. The ordering system 210 may be part of or interface with a point-of-sale ordering system via which a food service company tracks orders placed. The training data 116 provided by the electronic ordering system 210 may be representative of order information tracked.

The ingredient producers 212 are entities (e.g., farms) that produce one or more ingredients 202 for a defined service area. The ingredient producers 212 include farms that plant, grow, or otherwise produce vegetables, meats, dairy, fruits, fungi, grains, etc., that are to be used in making food items 204 for a service area. Such farms may employ various methods. The ingredient producers 212 may also include entities that process one or more of the ingredients 202 produced by a farm to make the ingredient 202 directly useable to produce a food item 204. Ingredient producers 212 may, for instance, include butchers that slaughter, dress, clean or otherwise prepare meat prior to being loaded onto the transit vehicles 214 so that the meat can be used to prepare the food items 204 while in transit. For instance, a butcher may clean and dress a pig carcass and provide the appropriate meat for loading onto the transit vehicle 214 where the pork may be ground and packaged into sausage. As another example, ingredient producers 212 may include cheese producers that make cheese using milk (and other necessary ingredients) procured from farmers.

The training data 116 provided by the ingredient producers 212 may include information regarding production of the ingredients 202. Such training data 116 may include information representative of an amount of time that a crop takes to grow, from inception (e.g., when a seed is planted, when a plant starter is planted, when an animal is impregnated) to harvest (e.g., when fruit/vegetable is ripe and picked, when an animal is born). The ingredient producers 212 also provide information regarding the crop produced (e.g., type of crop), information regarding the yield of a crop planted (e.g., amount of seed planted versus amount of crop harvested); farming techniques to be used for plants that supply the one or more ingredients; farming methods (e.g., standard soil, hydroponic, aeroponic, indoor planting, outdoor planting); location of the farm; space available to farm plants that supply the one or more ingredients; equipment to be used to farm plants that supply the one or more ingredients; growth rates of plants that supply the one or more ingredients; a season during which plants that supply the one or more ingredients are to be grown; and variables that affect growth of plants that supply the one or more ingredients.

The ingredient producers 212 may also provide information regarding one or more controlled or uncontrolled factors related to growth of one or more crops that supply the ingredients. In some implementations, the ingredient producers 212 may have facilities that can control factors related to conditions affecting growth of the crops that farmers using, for example, environmental control systems, irrigation control systems, lighting control systems, films placed on window panels, etc. The controlled factors related to an amount of oxygen, an amount of carbon dioxide, an amount of water, a type of watering system, an amount of nutrients provided to the crops, concentration of nutrients provided to the crops, pH level of the nutrients and/or water provided, how nutrients are delivered, amount of light intensity, spectrum of light, intervals of light, amount of humidity, amount of fertilizers, temperature, and amount of ventilation. In some implementations, growth of the crops that supply the ingredients 202 may be subject to one or more factors that are not controlled by the ingredient producers 212. Such uncontrolled factors may be related to one or more of an amount of oxygen supplied to the crops, an amount of carbon dioxide supplied to the crops, an amount of water supplied to the crops, amount of nutrients supplied to the crops, concentration of nutrients supplied to the crops, nutrient pH level, amount of light intensity, spectrum of light; intervals of light, amount of humidity, and temperature.

The training data 116 provided by the ingredient producers 212 may also include information regarding harvesting of the crops that supply the ingredients 202. The information regarding harvesting may indicate amounts of time that the plants comprising a crop take to harvest. For instance, when a crop of plants in one or more fields is ripe, the information regarding harvesting may indicate an amount of total time taken to harvest an entire crop from beginning to end, or amounts of time that each of the one or more fields growing the plants takes to harvest. This information may specify or be associated with information regarding the area of the field(s), the equipment used to harvest the crop, area covered to harvest the plants, conditions during harvest (e.g., weather conditions, temperature) and other pertinent information regarding the harvesting procedure. The information regarding harvesting may indicate different amounts of time that harvesting takes for different amounts of plants that supply the ingredients.

The ingredient producers 212 may further provide information regarding postharvest processing of crops after being removed from the ground, tree, root, etc., and before being loaded onto the transport vehicle 214 for shipment. Such postharvest processes include cleaning, trimming, sorting, packaging, or drying processes of plant matter after harvesting. The postharvest information may include information indicating an amount of total time taken for the postharvest processes and an indication of the crop being processed.

The transit vehicles 214 are vehicles (e.g., trucks, vans) onto which crop is loaded from the ingredient producers 212 and taken to another location, such as a location 216 providing one or more food items 204 (e.g., store, vending machine, kiosk) or a yet as to be identified customer delivery location 218. The transit vehicles 214 may be vehicles equipped to process one or more ingredients 202 in transit to a destination such that the form of the ingredients 202 has changed or one or more food items 204 is prepared therefrom. For instance, ingredients 202 may be loaded onto a transit vehicle 214 at one or more ingredient producer 212 locations and, during transit, the ingredients 202 may be processed and cooked into a pizza that is delivered to a customer delivery location 218 just as it finishes cooking. As another example, ingredients 202 may be processed and cooked in transit to produce a supply of tomato sauce that is delivered to a location providing one or more food items 216. Processing of the ingredients 202 during transit may include cleaning, sorting, preparing (e.g., slicing, peeling), packaging, grinding, and dressing, by way of non-limiting example. The transit vehicles 214 may be equipped with environmental controls controlling one or more environmental factors such as temperature, light, humidity, etc. In some implementations, however, the transit vehicles 214 may be standard shipping vehicles equipped to transport the ingredients 202.

Training data 116 provided by or in connection with the transit vehicles 214 includes information regarding transit between an ingredient producer 212 and a location to which the ingredients 202 or food items 204 are delivered (e.g., location 216 providing food items 204, customer delivery location 218). The information regarding transit includes transit time information representative of an amount of time taken in transit between the ingredient producer 212 location and the delivery location. The information regarding transit may also include route information representative of routes taken between the ingredient producer 212 location and the delivery location. The route information may include sequential ordering of roads and turns taken throughout the transit or information indicating a time (e.g., time of day, time travelled) for each road or turn. Condition information may be obtained (e.g., by computing system 102) and correlated with the information regarding transit in connection with the route information, the condition information indicating traffic conditions, weather conditions, and construction encountered in transit. The condition information may be obtained from a third-party via, for example, an application programming interface through which such information is made available (e.g., Google® Maps, Accuweather®).

Training data 116 provided by the transit vehicles 214 may include ingredient processing information regarding pre-processing of the ingredients 202 or at least partial preparation of the food items 204 performed by the transit vehicles 214 during transit. Such information is representative of an amount of the ingredients 202 pre-processed (e.g., washed, sliced), an amount of food items 204 prepared, and/or the amount of ingredients 202 used to at least partially prepare the food items 204. The ingredient processing information may also include information representative of an amount of time taken to pre-process the ingredients 202 and/or at least partially prepared food items 204.

One or more demand factor information systems 222 may provide information representative of conditions present contemporaneous to the provisioning of training data 116 by the training data sources 118. The demand factor information systems 222 may obtain and store marketing event or activity information obtained from one or more event information systems, economic indicator information obtained from one or more economic indicator systems, as well as other information related to demand factors attributed to affecting, predicting or being related to demand for food items 204 (e.g., weather information, traffic information, geographical information). Such information obtained may be stored in a demand information data store 224, which may be a relational data store in which demand information obtained is stored in association with other relevant information. Obtaining the demand factor information from the sources may involve using automated agents or bots that scrape or crawl websites to identify and extract relevant information regarding economic indicators, events, the service area, etc.; performing one or more database queries searching for data regarding marketing events or activities in a geographic region for one or more periods of time; or performing one or more database queries regarding economic indicators for one or more periods of time. These methods, however, are merely illustrative and other automated or manual methods of obtaining historical information are considered as being within the scope of the instant disclosure.

The marketing event information is representative of events or activities occurring in or around a service area for a designated purpose. Events or activities include sporting events, concerts, protests, festivals, holidays, theatrical events, political rallies, conferences, and the like. Marketing events or activities for which historical information may be obtained are those of sufficient scope, either individually or in aggregate, to affect supply need of ingredients 202 or food items 204 or delivery of food items 204 or ingredients 202. The event information obtained may include information regarding a purpose of the event, time and location(s) of the event, attendance expected, an attendance recorded, and/or other information specific to the event (e.g., score of sporting event, concert artists). The event information may be correlated with training data 116 received—for instance, events and information associated therewith may be correlated with information representative of order information for food items 204 received for a service are contemporaneous to an event.

The demand factor information systems 222 may be network connected processor-based systems that obtain and store event information for one or more service areas in the demand factor information data store 224. The event information systems may be websites, social media sites, databases, applications, or other similar location or entity storing or providing event information. For instance, event information regarding music concerts in or around a service area may be obtained from concert venue or artist websites or social media pages.

The economic indicator information is representative of indicators of economic trends. Examples of economic indicators include retail sales, employment and labor market statistics, current stage of economic cycle, personal income, Gross Domestic Product (GDP), Money Supply (M2), Consumer Price Index (CPI), Producer Price Index (PPI) and Consumer Confidence Surveys. The economic indicators may be for or associated with a defined time period in the past or present. The economic indicators may be indicative of economic trends for a defined location or area, such as economic indicators for county, city, regional, national, foreign, or international economies. In at least some implementations, the economic indicators may be correlated to a particular service area. Further, the economic indicators may be correlated with training data 116 received—for instance, economic indicator information may be correlated with information representative of historical use of one or more ingredients 202. The demand factor information systems 222 may obtain the economic indicator information from public agencies, departments, and bureaus responsible for maintaining economic data and statistics (e.g., U.S. Bureau of Labor Statistics, U.S. Treasury, U.S. Department of Commerce, Federal Deposit Insurance Corporation, U.S. Bureau of Economic Analysis, U.S. Federal Reserve); private companies and firms providing and maintaining records of economic data and statistics; and specialized associations and organizations (e.g., The Conference Board, Organization for Economic Cooperation and Development).

The demand information obtained may be correlated in data storage with training data 116 corresponding to the period of time, service area, or other parameter to which the information pertains. For instance, historical use information of ingredients 202 or food items 204 for a service area may be correlated with marketing event information of events in and around the service area for a defined period of time. As another example, historical use information of ingredients 202 or food items 204 for a service area may be correlated with economic indicators for a defined period of time.

Training data 116 received from one or more of the training data sources 118 may be used to train the machine learning system 106 according to various appropriate models and methods. The training data 116 may be provided to the machine learning system 106 directly via the network 104, or may be collected by an intermediary and provided to the machine learning system 106. Such machine learning training may involve supervised, unsupervised, or semi-supervised methods in which the training data 116 is respectively labeled, unlabeled, or comprises both labelled and unlabeled data. The machine learning system 106 may be trained according to one or more machine learning models or systems, including decision tree learning models or system, artificial machine learning models or systems, support vector machine models or systems, clustering models or systems, Bayesian network models or systems. Training the machine learning system 106 may include modifying executable instructions of the machine learning system 106 itself, executable instructions of the computing system 102, or generating or modifying the output 110 comprising a set of computer-executable instructions (e.g., application, program).

The training data 116 may comprise data obtained or provided from a historical information data store 230 comprising historical information regarding the historical use of one or more ingredients 202 at time periods in the past in at least the service area, and historical order information regarding orders placed for one or more food items 204 at time periods in the past in at least the service area. The training data 116 may be obtained or provided by the computational system 102 and provided to the machine learning system 106 for training, as described herein.

The machine learning system 106 is trained to predict various future conditions regarding a service area using the training data 116. A machine learning system 106 may be assigned to a corresponding individual service area. Each machine learning system 106 may therefore be unique to a service area, such as a defined geographic area. Although only one machine learning system 106 is depicted, a plurality of machine learning systems 106 may be deployed each corresponding to a different service area. At least some of the training data 116 used to train the machine learning system 106 may be specific to the service area—for example, historical use information representative of an amount of ingredients 202 used in a defined period of time may be for food item providers 216 (e.g., stores, vending machines, automated production delivery vehicles) located within or assigned to the service area. Similarly, some of the historical information used to train the machine learning system 106 in some implementations may be particular to the service area corresponding to the machine learning system 106.

Training the machine learning system 106 using at least some of the training data 116 may cause the machine learning system 106 or the computing system 102 to perform one or more operations described herein, Operations performed by the machine learning system 106 or the computing system 102 may include generating information predictive of various conditions that will be present in the environment 100 at a defined future time. In some instances, the machine learning system 106 or the computing system 102 may perform various determination operations, scheduling operations, or causing performance of other operations by other entities in the environment 100.

Figure 2B:
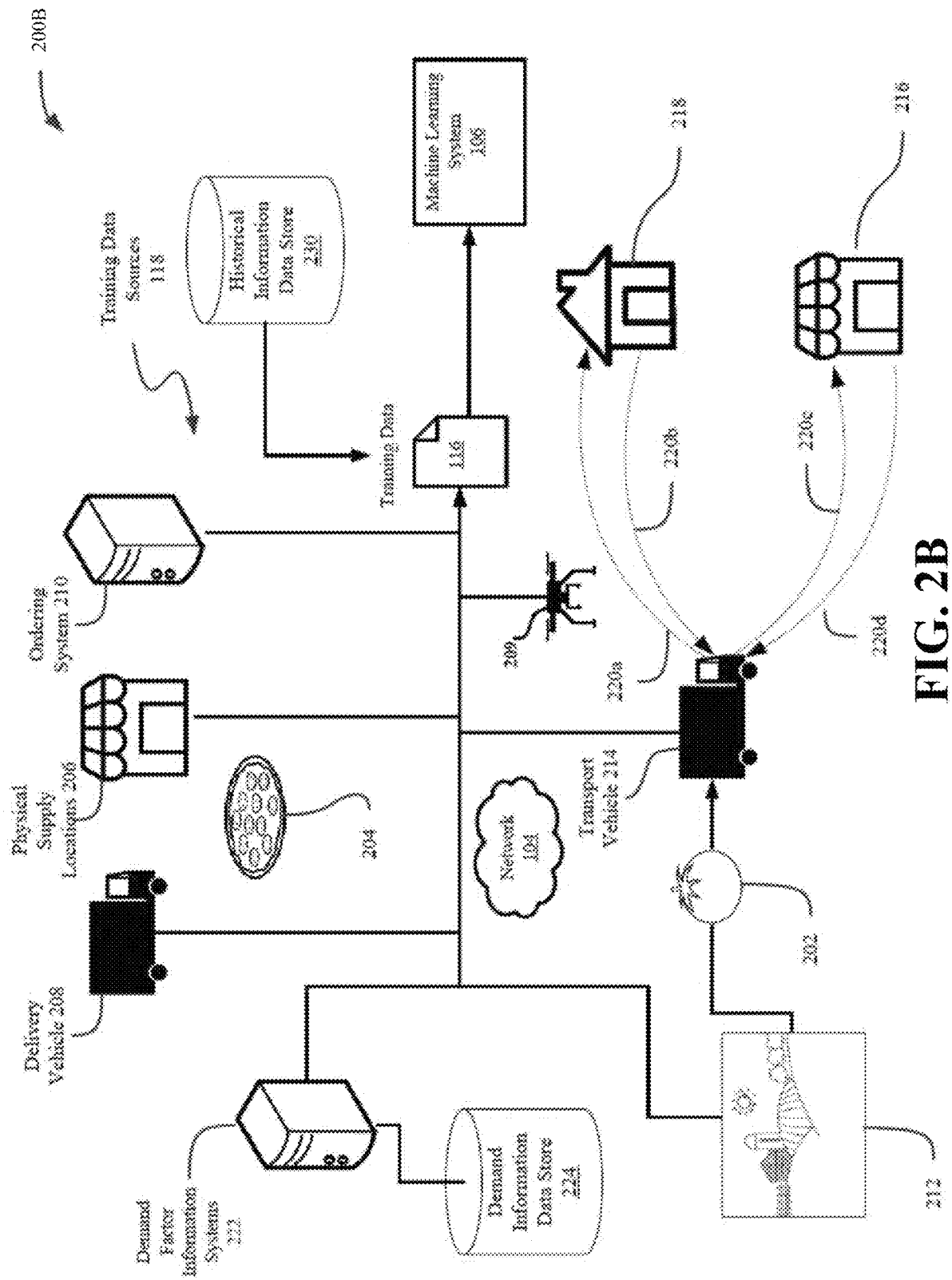
FIG. 2B is a third schematic diagram of an illustrative networked environment for facilitating logistics via implementation of machine learning systems.

FIG. 2B shows a schematic diagram of an illustrative networked environment 200B for facilitating logistics via implementation of machine learning systems. As illustrated in FIG. 2B, in some implementations, transportation of ingredients 202 or a respective food item 204 between a transport vehicle 214 or a delivery vehicle 208 and a destination (such as a physical supply location 206, ingredient producer 212, a food item provider 216 or a delivery location 218) may be performed by an aerial drone 1180a. In such implementations, as discussed above, the transport instructions 422 may specify the date, time, and location the delivery vehicle 208 or transport vehicle 214 will rendezvous, receive and interface with the aerial drone 1180a; routes that the delivery vehicle 208 or transport vehicles 214 are to take to the rendezvous location; delivery routes 220 that the delivery vehicle 208 or transport vehicle(s) 214 are to take to other delivery locations or rendezvous locations for other aerial drones 1180a. The transport instructions 422 may include updated instructions received after the initial transport instructions 422, such as instructions received during transit that modify content of the instructions 422 as a result of, e.g., new current demand information 416, changes to delivery status or timing, or variations in aerial drone 1180a performance. Similarly, the aerial drones 1180a may be provided with their own transport instructions 422 that may specify the date, time, and location of the transport vehicle it must rendezvous with and/or a pickup or delivery location (e.g., of an ingredient producer 212, delivery location 216, or food item provider 216) at which one or more ingredients 202 or food items 204 are to be delivered or loaded onto the aerial drone 1180a; pick-up or delivery routes 220 that the loaded transport vehicle(s) 214 are to take to the location. The transport instructions 422 for the aerial drone 1180a may also include updated instructions received after the initial transport instructions 422, such as instructions received during transit that modify content of the instructions 422 as a result of, e.g., new current demand information 416. The transport instructions 422 may further include plurality of such transport instructions 422, for example where the aerial drone 1180a receives instructions to deliver to two delivery locations 218, pick up from a food item provider 216 and an ingredient provider, and then rendezvous with the transport vehicle to deliver the ingredient 202 and food item 204 from to the transport vehicle 214.

In some implementations, delivery vehicle 208 or transport vehicle 214 may be an aerial drone 1180a. In such implementations, as described above, the transport instructions 422 may further include plurality of such transport instructions 422, for example where the aerial drone 1180a receives instructions pick up from a food item provider 216, to deliver to two delivery locations 218, pick up from an ingredient provider 212, and then return to the physical supply location 206 to deliver the ingredient 202 it picked up from the ingredient provider 212. Persons of skill in the art will recognize that these examples are non-limiting, and that any transport instructions 422 or series of transport instructions 422 that are within the capabilities of the transport vehicle 214/aerial drone 1180a may be practiced with the disclosed concepts.

In some implementations, the transport vehicles 214 may have equipment for pre-processing the ingredients 202 in transit, such as by washing, slicing, or portioning the ingredients 202 or preparing one or more food items 204 using the ingredients 202 loaded. In at least some of those implementations, the transport vehicles 214 may also be delivery vehicles 208 that cook prepared food items 204 in transit and arrive at a location just as cooking of the food item 204 is completed. In such implementations, the transport instructions 422 may specify the equipment that the transport vehicle 204 should be equipped with, a configuration of the equipment. The transport instructions 422 may include information specifying times or locations along a route at which various steps for preparing, processing, or cooking of ingredients 202 and food items 204 should be performed. During transit, the computing system 102 via the machine learning system 106 may update information regarding route or destination, or information regarding preparing, pre-processing, or cooking of ingredients 202 or food items 204 preparation according to updated or new demand factor information 412 obtained, or other information that may affect travel, such as weather or traffic.

In some implementations, the transport instructions 422 may specify a service area (e.g., geographic region) to which the transit vehicles 214 loaded with ingredients 202 are to travel from the ingredient producer 212, which is determined based at least in part on the future supply need 418. While transport vehicles 214 are in transit, the computational system 102 may determine more specific locations within a service area or may determine a different service area to which one or more of the transit vehicles 214 are to travel based on updated future supply need 418. For instance, while a transit vehicle 214 is in transit, the computing system 102 may receive new or updated current demand information 416 and, as a result of processing the current demand information 416 via the trained machine learning system 106, determine that there is a high likelihood that a particular region or location in the service area will experience a high demand for a food item 214 which the transit vehicle 214 is equipped to produce. The computational system 102 may then provide updated transport instructions 422 specifying an updated route or location for the transport vehicle 214.

The transport vehicle 214 transports the ingredients 202 loaded thereon along one or more routes to the service area or a location therein according to the transport instructions 422. In some implementations, the transport vehicle 214 may notify the computational system 102 of the vehicle's location upon arrival in the service area. The computational system 102 may, according to an updated future supply need 418, provide further instructions to the transport vehicle 214 instructing the transport vehicle 214 to travel to a specific region within the service area, a food item provider 216, or customer specified location 218. The transport vehicle 214 may deliver the ingredients 202, pre-processed or otherwise, or prepared or cooked food items 204 to the food item provider 216 or customer specified location 218 according to route and/or destination information included in the updated transport instructions 422.

Figure 3:
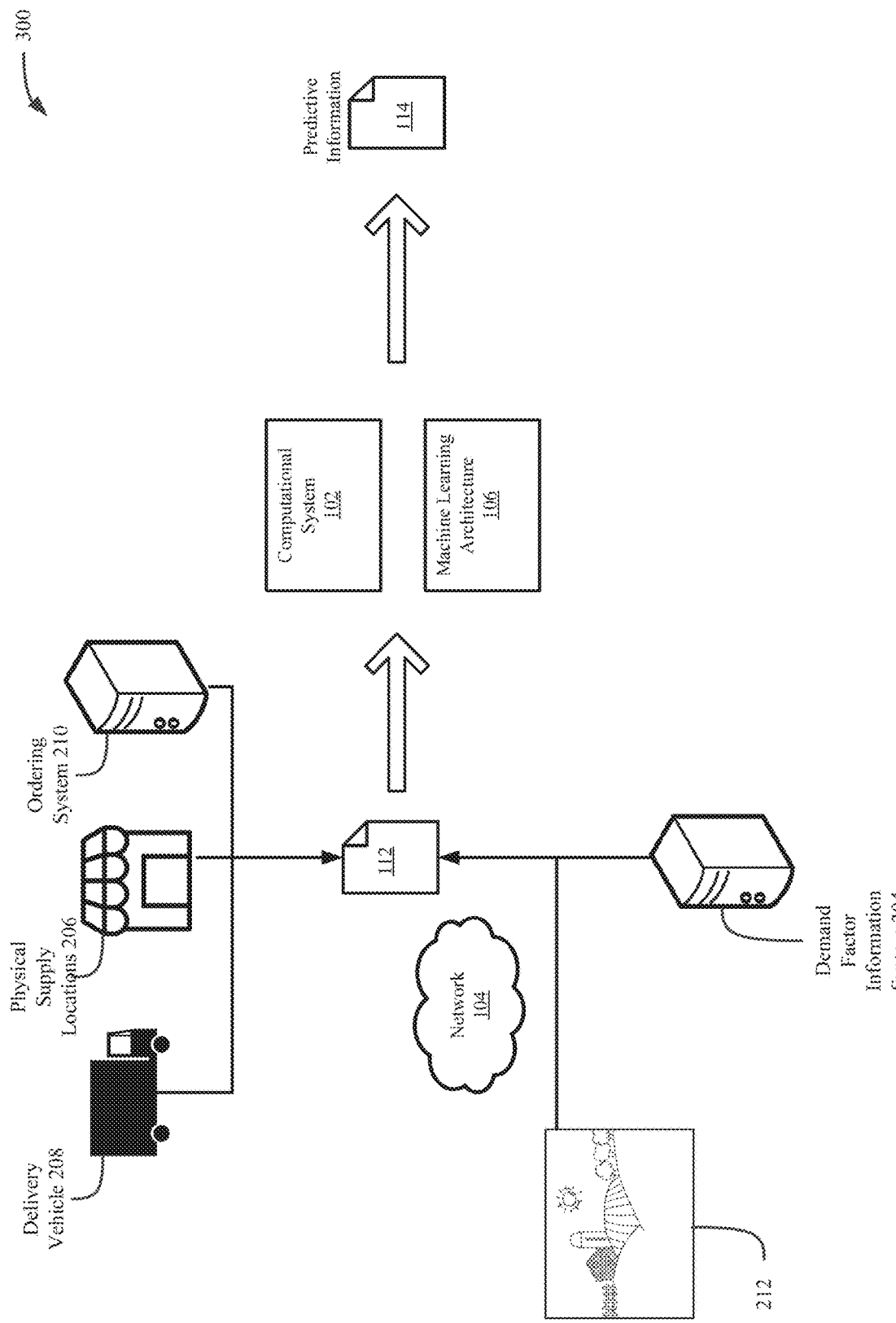
FIG. 3 is a schematic diagram of an illustrative networked environment in which a machine learning system is trained to generate predictive information for facilitating logistics for the production of ingredients of food items.

FIG. 3 shows an illustrative environment 300 in which the computational system 102 or the trained machine learning system 106 perform various operations based on new information 112 obtained. The environment 300 corresponds at least in part to the environment 200A or 200B but at a second point in time after the first point of time. The new information 112 may be obtained from sources similar or identical to the training data sources 118, sources of demand factor information, or other sources described herein as appropriate. For example, the environment 300 may include a demand factor information system 304 that obtains information representative of one or more factors affecting, predicting, or related to demand for the one or more ingredients 202 used in preparation of one or more prepared food items 204. Such factors may include marketing events or activities, economic indicators, or one or more condition that cause demand for ingredients 202 to increase or decrease. The demand factor system 304 may crawl or scrape internet or social media sources relevant to the service area to determine such demand factor information. In some instances, the demand factor information system 304 may perform database queries for obtaining the demand factor information. Using the new information 112, the machine learning system 106 and/or the computing system 102 may generate predictive information 114 regarding conditions that will be present in the environment 100 at a future time. The predictive information 114 may then be used to facilitate logistics in the environment 100 by, for example, planting, harvesting, shipping, and processing of ingredients 202, or preparing, cooking, or delivering food items 204. Numerous illustrative examples of the operations will now be described.

Figure 4A:
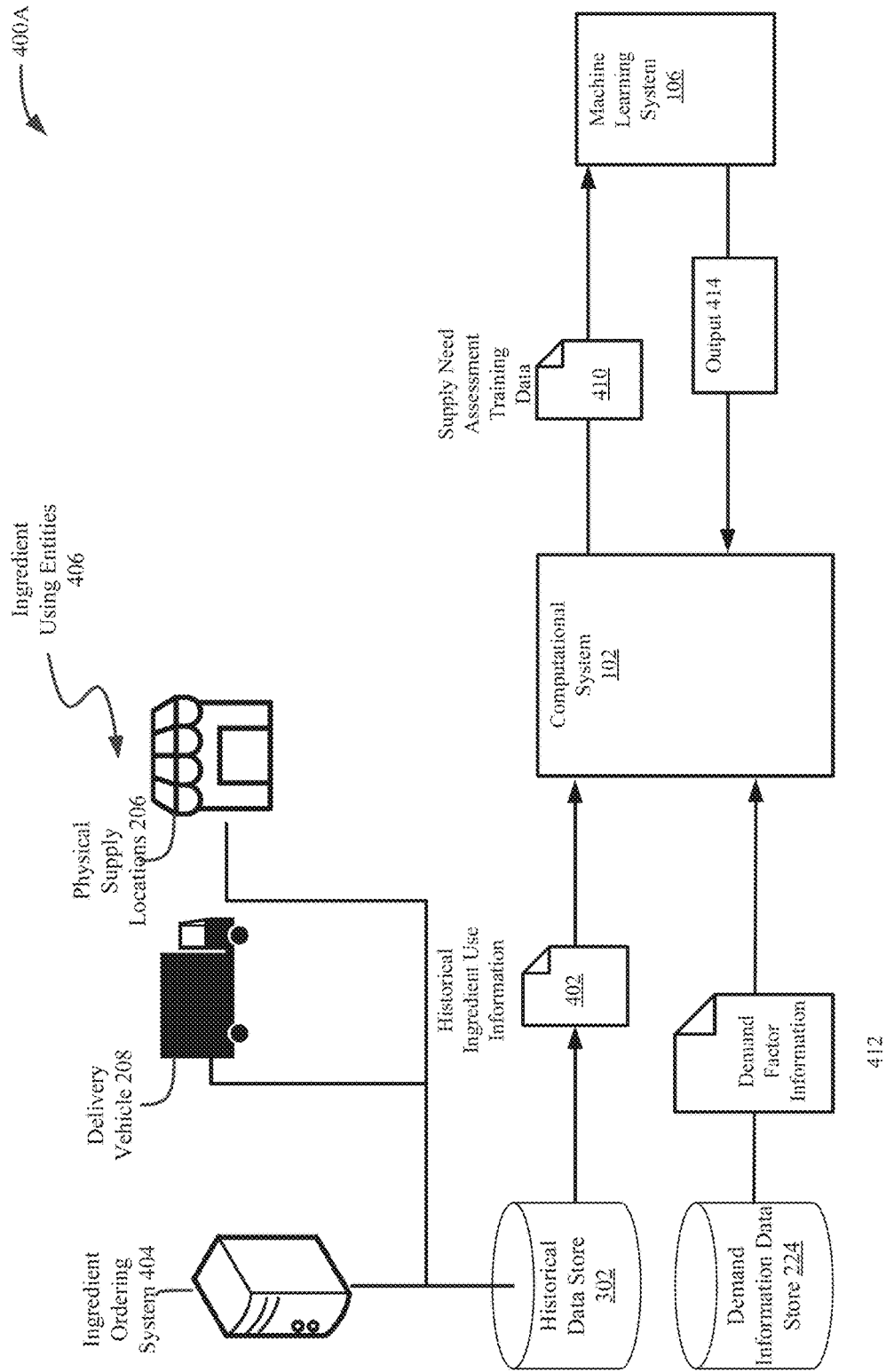
FIG. 4A is a schematic diagram of an illustrative networked environment in which a machine learning system is trained at a first time.

FIG. 4A shows an environment 400A in which the machine learning system 106 is trained at a first point in time to predict a future supply need for ingredients 202 based on historical use of the ingredients 202. The computing system 102, which may be an entity for managing logistics among various entities of the environment 400 depicted, obtains historical use information 402 representative of a historical use of one or more ingredients 202 used in preparation of one or more food items 204 for one or more service areas. The service area is a geographic region comprising one or more food services establishments (e.g., physical food item supply entities 206, automated production delivery vehicles 208) supplied by a logistics provider. In connection with using ingredients 202 in preparation of one or more of the food items 204, information representative of such historical use of the ingredients 202 may be generated by one or more entities using the ingredients 202 to produce food items 204.

Entities 406 using the ingredients 202 to produce the food items 204 may include one or more of automated production delivery vehicles 208, physical supply locations, ingredient ordering systems 404, or other entities using ingredients 202 to produce food items 204. The historical ingredient use information 402 is generated based on ingredient 202 usage over time. One metric of ingredient usage may be a stock of the ingredients 202 possessed by the respective entities 406 at different points in time. For instance, an entity 406 may provide information representative of respective amounts of one or more ingredients 202 possessed by the entity 406 according to the volume, number of containers, weight, etc., of the respective ingredients 202. Another metric may be an amount of the respective ingredients 202 ordered at different points in time by the entities 406. An electronic ingredient ordering system 404 may receive order communications from the automated production delivery vehicles 208 and/or the physical supply entities 206 requesting a supply of the ingredients 202 to be delivered or made available to the requesting entity. The order communications include information identifying the ingredients 202 needed, indicating amounts of respective ingredients 202 needed (e.g., weight, volume, quantity, size), and optionally a requested date by which the supply of the respective ingredients 202 should be delivered. Yet another metric may be an amount of the respective ingredients 202 used in a defined period of time.

The historical ingredient use information 402 obtained from the ingredient-using entities 406 may be stored in the historical data store 302 or provided to the computational system 102. The ingredient use information 402 provided may have a certain format, dimensionality (e.g., number of entry fields), and/or labels indicating a type of ingredient 202 and a corresponding amount of the respective ingredient 202 requested or possessed. For instance, the ingredient use information 402 may comprise one or more datasets each comprising a set of entries, wherein each entry includes information representative of ingredient 202 usage over time. Instances of the ingredient use information 402 may include or be associated with time information indicating the point in time or period of time to which the information corresponds, such as a time at which an order was placed or a time at which a supply was measured or determined. In some implementations, some or all of the historical ingredient use information 402 may be unlabeled, however. The ingredient use information 402 may be provided and/or stored in a delimiter-separated value format, such as a comma-separated value format, tab-separated value format, or semi-colon-separated format. As one example, the historical ingredient use information 402 may include a dataset arranged by column and row.

The computational system 102 may obtain demand factor information 412 for training the machine learning system 106. The demand factor information 412 may include economic indicator information, event or activity information, and/or other information representing one or more factors attributed to affecting, predicting or being related to demand for the food items 204 in the service area. The demand factor information 412 obtained may correspond to one or more defined periods of time and service areas for the historical ingredient use information 402. As one example, for a historical use entry in the historical ingredient use information 402 corresponding to a time T1 and service area A1, demand factor information 412 for a time period including or before the time T1 for the service area A1 may be included in or associated with the historical use entry. The machine learning system 106 can therefore be trained to correlate new demand factor information with a predicted future supply need for the service area.

The machine learning system 106 is trained to predict a future supply need of the ingredients 202 in the service area using supply need training data 410. The supply need assessment training data 410 is provided by the computing system 102 and comprises at least some of the historical ingredient use information 402. The supply need is a condition of a food item producer (e.g., automated production deliver vehicle 208, physical supply location 206) regarding possession of a supply of ingredients 202 sufficient to fulfill orders for food items 204. Supply need may be indicated by classification or numerical representation. In some implementations, supply need may be represented using a classification technique in which a discrete bi-class scale indicates whether a food item producer's supply of respective ingredients 202 is either "sufficient" or "insufficient," or a multi-class scale in which the sufficiency of the food item producer's supply is indicated by degree—for example, "extremely insufficient," "moderately insufficient", "moderately sufficient," and "extremely sufficient." In some implementations, the supply need may be represented using a regression technique in which continuous numerical values indicate the sufficiency of a food item producer's supply need. For instance, a positive numerical value may indicate that a food item producer's supply of an ingredient is sufficient, and the numerical value may indicate the supply surplus, in units (e.g., weight, volume, quantity), of the ingredient 202. By contrast, a negative numerical value may indicate that a food item producer's supply of an ingredient is insufficient, and the numerical value may indicate the supply deficiency, in units, of the ingredient 202.

The computing system 102 may train the machine learning system 106 using one or more machine learning models provided or otherwise specified by the computing system 102. Some of the machine learning models may be classification models via which a set of inputs is mapped to a corresponding discrete output or classification regarding a supply need of one or more of the food item 204 producers. Some of the machine learning models may be regression models via which a set of inputs is mapped to a numeric value corresponding to a supply need of one or more of the food item 204 producers. Examples of such models include decision tree learning systems, support vector machine systems, artificial neural network systems, clustering systems, and Bayesian network system models. These examples are, however, intended to be non-limiting, and those of ordinary skill in the art will appreciate that other machine learning models may be suitable to appropriately train the machine learning system 106.

As one example of training, the machine learning system 106 may be trained using a training set 51 containing historical ingredient use information 402 and demand factor information 412 for a specific service area A1 and defined period of time T1. The machine learning system 106 may be trained to optimize the accuracy and precision of predicting future supply need 418. The machine learning system 106 may initially set weights and biases for parameters of a learning model to predetermined or random values. Such parameters correspond to events, economic indicators, dates, times, weather conditions, or other demand factors attributed to affecting, predicting or being related to the demand for prepared food items 204, as described herein. Via optimization methods (e.g., gradient descent algorithms), the machine learning system 106 may optimize the model by iteratively reducing error in weights and biases for the parameters using test cases included in the supply need assessment training data 410, such as test cases for the historical ingredient use information 402. After the initial training of the machine learning system 106 to predict future supply need, the machine learning system 106 may receive further training using updated historical ingredient use information 402 and updated demand factor information 412. The accuracy and precision of the future supply need 418 predicted may therefore be further improved or adjusted over time according to changing demand factors for the service area.

Figure 4B:
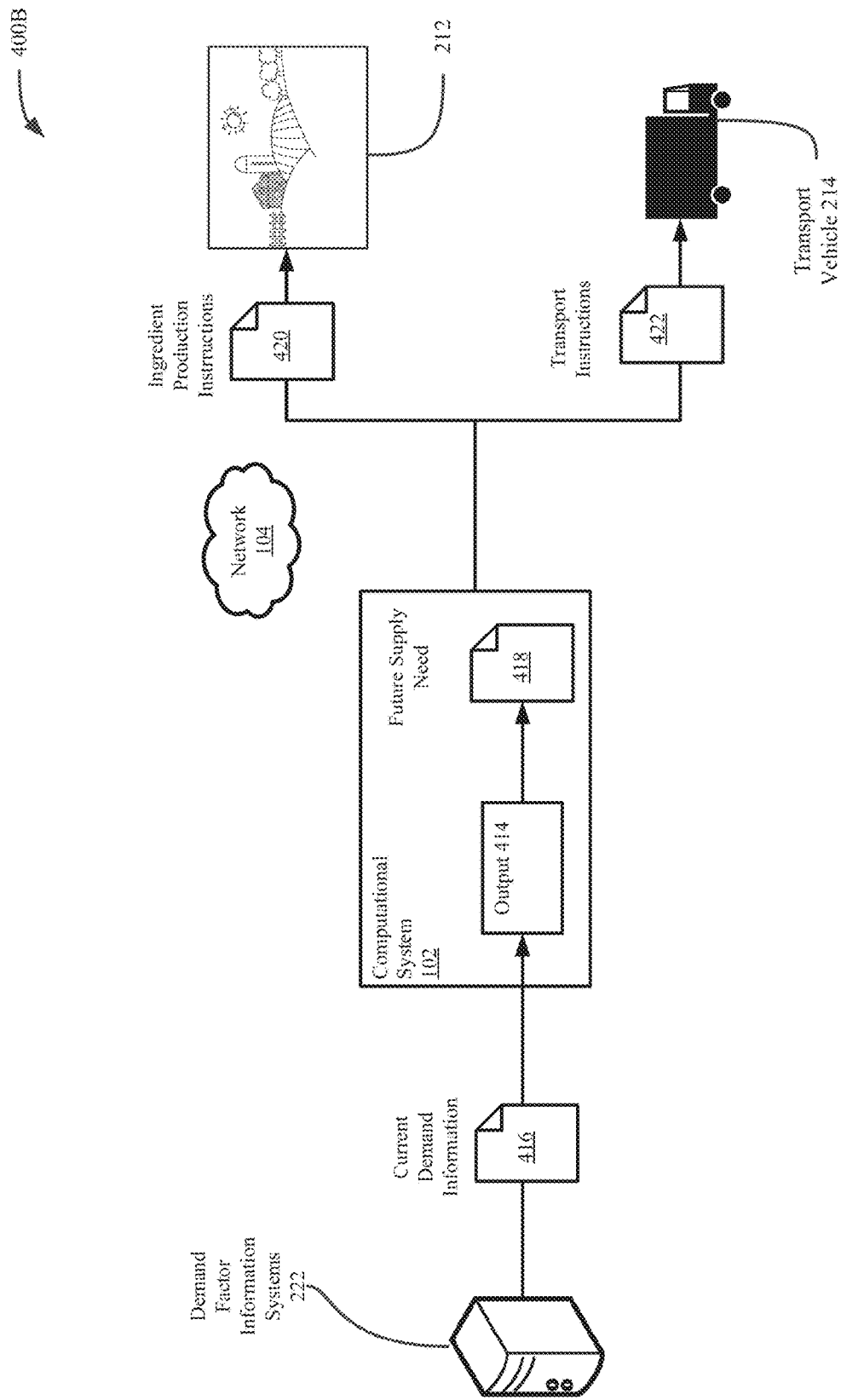
FIG. 4B is a schematic diagram of an illustrative networked environment in which future supply need is predicted, via the trained machine learning system, to facilitate logistics.

As a result of being trained, the machine learning system 106 may predict, or generate an output 414 useable to predict, a future supply need of one or more ingredients 202 for prepared food items 204 for the service area. FIG. 4B shows an environment 400B in which a future supply need of one or more ingredients 202 is predicted via the machine learning system 106 at a second point in time after the first point in time depicted and described with respect to FIG. 4A. The future supply need for the service area is determined by the computational system 102 using current demand information 416 obtained from physical supply entities 206, automated production delivery vehicles 208, and/or ingredient ordering systems 404 for the service area. The current demand information 416 represents one or more demand factors attributed to affecting, predicting or being related to demand for one or more food items 204 for the service area. The current demand information 416 may be indicative of demand for one or more of the food items 204 in the service area based at least in part on current or recent conditions related to the service area. The factors attributed to affecting, predicting, or being related to demand for the one or more food items 204 include one or more of: a particular time of day, a particular time of week, a particular time of month, a particular time of year; a particular day of week, a particular day of month, a particular day of year, a particular week of month, particular week of year, a particular month of year, a particular event, a particular holiday, a concert, a festival, a particular recurring event, a particular recurring sporting event, a particular recurring community event, a particular season, one or more economic indicators, retail sales, employment and labor market statistics, current stage of economic cycle, personal income, demographics, Gross Domestic Product (GDP), Money Supply (M2), Consumer Price Index (CPI), Producer Price Index (PPI) and Consumer Confidence Survey, one or more factors specific to the service area, or one or more factors attributed to affecting or predicting demand specifically in the service area. It is noted that training the machine learning system 106 to predict future supply need 418 for a particular service area is beneficial at least because a set of demand factors that affect or are useful in predictions for one service area may not be as accurate or precise as a second set of demand factors for another service area. In other words, a trained machine learning system 106 for one service area may not be as effective at predicting future supply need 418 for another service area at least because certain demand factors may affect some service areas more than others. Accordingly, training machine learning systems 106 for specific service areas, as described herein, allows for more accurate and precise future supply need 418 prediction.

The current demand information 416 may be obtained from sources of economic indicator data for the service area, sources of macroeconomic indicator data, sources of event or activity data for the service area (e.g., in and around the service area), or other information specific to the service area. Such other information specific to the service area may be demand factors determined by the machine learning system 106 as being relevant to the future supply need for the service area. The service area represents an area serviced or defined by one or more of logistics suppliers, processors, trucking companies, shipping companies, wholesalers, resellers, supply chains managers, producers, farms, agricultural cooperatives, plantations, agricultural areas, markets, sales regions, distributors, retailers, importers, exporters, restaurants, restaurant chains, commissaries, grocery stores, co-ops, farmers markets, snack stands, concession stands, food trucks, food carts, vending kiosks, locker kiosks, hot dog carts, pop-up restaurants, supper clubs, temporary restaurants, venues, festivals, concerts, neighborhoods, boroughs, camps, community centers, cities, towns, counties, states, commonwealths, provinces, parishes, municipalities, districts, regions, countries and governments.

The computational system 102, using the current demand information 416 obtained, predicts the future ingredient supply need 418 of one or more ingredients 202 used in preparation of the food items 204 for the service area. The future ingredient supply need 418 is predicted using the output 414, which may be a new set of instructions or a modification to an existing set of instructions of the machine learning system 106 or the computational system 102. For instance, the trained machine learning system 106 may receive the current demand information 416 as input and process the current demand information 416 to predict the future ingredient supply need 418. The future ingredient supply need 418 may include information representative of an amount of one or more of the food items 204 that will be ordered in the service area for a defined future period of time. The amount of one or more food items 204 may be represented by an indication of quantity, volume, weight, or other similar metric of the one or more food items 204. The computational system 102 may then determine an amount of each ingredient 202 sufficient to produce the amount of food items 204 predicted.

The computational system 102 may obtain recipes for the one or more food items 204 to determine the amount of ingredients 202. The recipes specify an amount of each ingredient 202 sufficient to prepare each instance of the food items 204. For each type of food item 204 of the future ingredient supply need 418 predicted, the computational system 102 may multiply the amount of each ingredient 202 specified in the recipes by the amount of the respective food item 204 predicted to determine an amount of ingredient 202 sufficient to produce the amount of the respective food item 204 predicted. Then, for each ingredient 202, the computational system 102 may aggregate the amount of each respective ingredient 202 determined for each respective food item 204 to determine the total amount of each ingredient 202 that will be sufficient to satisfy the future supply need 420.

To meet the future ingredient supply need 418 predicted for the service area for the defined time in the future, the computational system 102 may cause operations to be performed to generate the corresponding amount of each ingredient 202 determined. In at least some implementations, the computational system 102 may generate and provide ingredient production instructions 420 to one or more ingredient producers 212 to produce the amount of ingredients 202 determined far enough in advance to allow the ingredients 202 to be planted, grown, harvested, processed, and delivered in time to meet the future ingredient supply need 418. A plurality of production instructions 420 may be respectively sent to different ingredient producers 212 wherein each of the plurality of production instructions 420 comprise different instructions specific to the ingredient producer 212. For instance, one of the production instructions 420 may be tailored according to attributes of the ingredient producers 212, such as soil type, water type, crops produced, equipment possessed, etc. The production instructions 420 may specify the type of ingredient 202 needed, the amount of each ingredient 202 to be produced, the time and date at which each ingredient 202 should be planted, the time and date at which the ingredients 202 should be harvested, and postharvest processing to be performed on the ingredients 202. The ingredient producers 212 accordingly plant, grow, and harvest an amount of ingredients 202 sufficient to, and at the appropriate time, to meet the future ingredient supply need 418.

The computational system 102, in at least some implementations, may generate and provide transport instructions 422 to one or more transport vehicles 214. The transport instructions 422 specify instructions regarding loading, transport, processing, and delivery of the ingredients 202 to one or more destinations. In at least some instances, at least some of the transport instructions 422 may be included in the production instructions 420 or otherwise provided to ingredient producers 212 to enable the ingredient producers 212 to anticipate and coordinate loading of ingredients 202 onto transport vehicles 214. A plurality of transport instructions 422 may be respectively sent to different transport vehicles 214 wherein each of the transport instructions 422 comprise different instructions specific to the transport vehicle 214. As one example, one of the transport instructions 422 may be tailored according to a configuration of the transport vehicle 214, such as its environmental control, fuel capacity, efficiency, or ingredient 202 processing capabilities. The transport instructions 422 may specify the date, time, and location (i.e., of an ingredient producer 212) at which one or more ingredients 202 harvested are to be loaded onto the transport vehicle 214; routes that the transport vehicles 214 are to take to the ingredient producers 212; or delivery routes 220 that the loaded transport vehicle(s) 214 are to take to a destination (e.g., service area or location therein, customer specified delivery location 218, food item provider 216) or to pick up additional ingredients 202 from other ingredient producers 212. The transport instructions 422 may include updated instructions received after the initial transport instructions 422, such as instructions received during transit that modify content of the instructions 422 as a result of, e.g., new current demand information 416.

Figure 5:
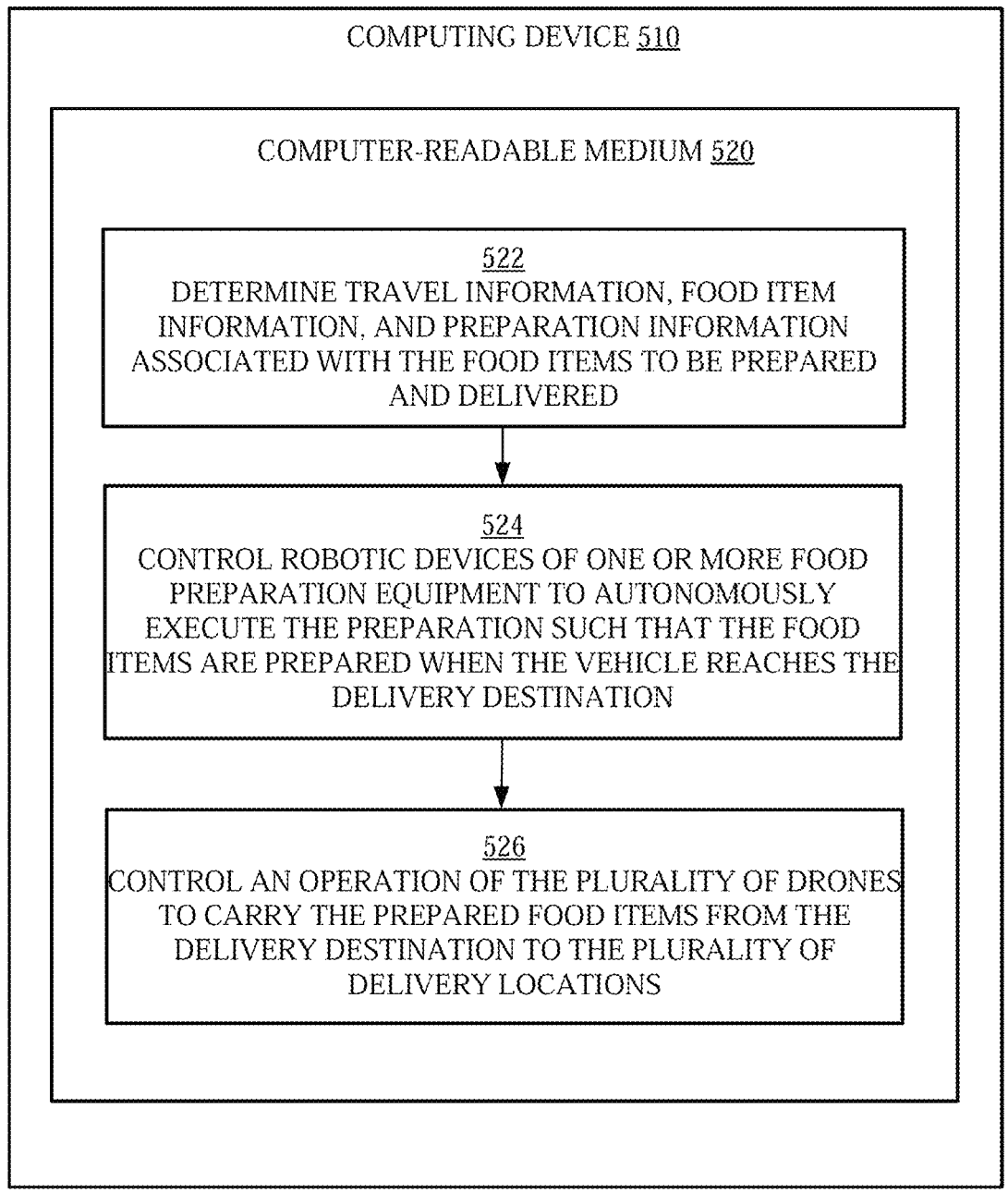
FIG. 5 is a flow diagram illustrating an example method for preparation and drone based delivery of food items in accordance with at least some embodiments described herein.

FIG. 5 is a flow diagram illustrating an example method for preparation and drone based delivery of food items in accordance with at least some embodiments described herein.

Example methods may include one or more operations, functions, or actions as illustrated by one or more of blocks 522, 524, and 526, which may in some embodiments be performed by a computing device such as the computing device 510 in FIG. 5 and/or other general purpose and specialized devices communicatively coupled to the computing device 510. Such operations, functions, or actions in FIG. 5 and in the other figures, in some embodiments, may be combined, eliminated, modified, and/or supplemented with other operations, functions or actions, and need not necessarily be performed in the exact sequence as shown. The operations described in the blocks 522-526 may be implemented through execution of computer-executable instructions stored in a computer-readable medium such as a computer-readable medium 520 of a computing device 510.

An example process for preparation and drone based delivery of food items may begin with block 522, "DETERMINE TRAVEL INFORMATION, FOOD ITEM INFORMATION, AND PREPARATION INFORMATION ASSOCIATED WITH THE FOOD ITEMS TO BE PREPARED AND DELIVERED", where travel information such as delivery destination, one or more potential routes between delivery destinations, road condition information for the potential routes, traffic condition information for the potential routes, weather condition information for the potential routes, vehicle type and requirements, route licensing requirements, and similar ones may be determined (e.g., received, scheduled, predicted, etc.) from one or more resources. Food item information may include quantity information, quality information, type information, or packaging information associated with the food items to be prepared. In some examples, an estimated time to reach the delivery destination may be determined based on the travel information.

Block 522 may be followed by block 524, "CONTROL ROBOTIC DEVICES OF ONE OR MORE FOOD PREPARATION EQUIPMENT TO AUTONOMOUSLY EXECUTE THE PREPARATION SUCH THAT THE FOOD ITEMS ARE PREPARED WHEN THE VEHICLE REACHES THE DELIVERY DESTINATION", where food items may be prepared in the delivery vehicle such that the preparation is completed (food items ready to be delivered) by the time the delivery vehicle reaches the delivery destination. Food items may include cooked, frozen, or otherwise prepared meals, configurable meal kits to be prepared by the recipient, or regulated consumables (e.g., alcohol, tobacco, cannabis products). In some examples, preparation process parameters (e.g., timing of individual preparation steps) may be adjusted based on estimated time of arrival at the delivery destination, etc.

Block 524 may be followed by block 526, "CONTROL AN OPERATION OF THE PLURALITY OF DRONES TO CARRY THE PREPARED FOOD ITEMS FROM THE DELIVERY DESTINATION TO THE PLURALITY OF DELIVERY LOCATIONS", where one or more aerial or ground based drones may be used to deliver prepared food items to a plurality of delivery locations (e.g., homes, schools, businesses, hospitals, and similar). The drones may be stored in a storage area of the delivery vehicle and released at the delivery destination. Alternatively, the delivery destination may be a base for drones. The drones may be capable of carrying a single payload or multiple payloads (i.e., multiple food items to multiple destination locations).

Figure 6:
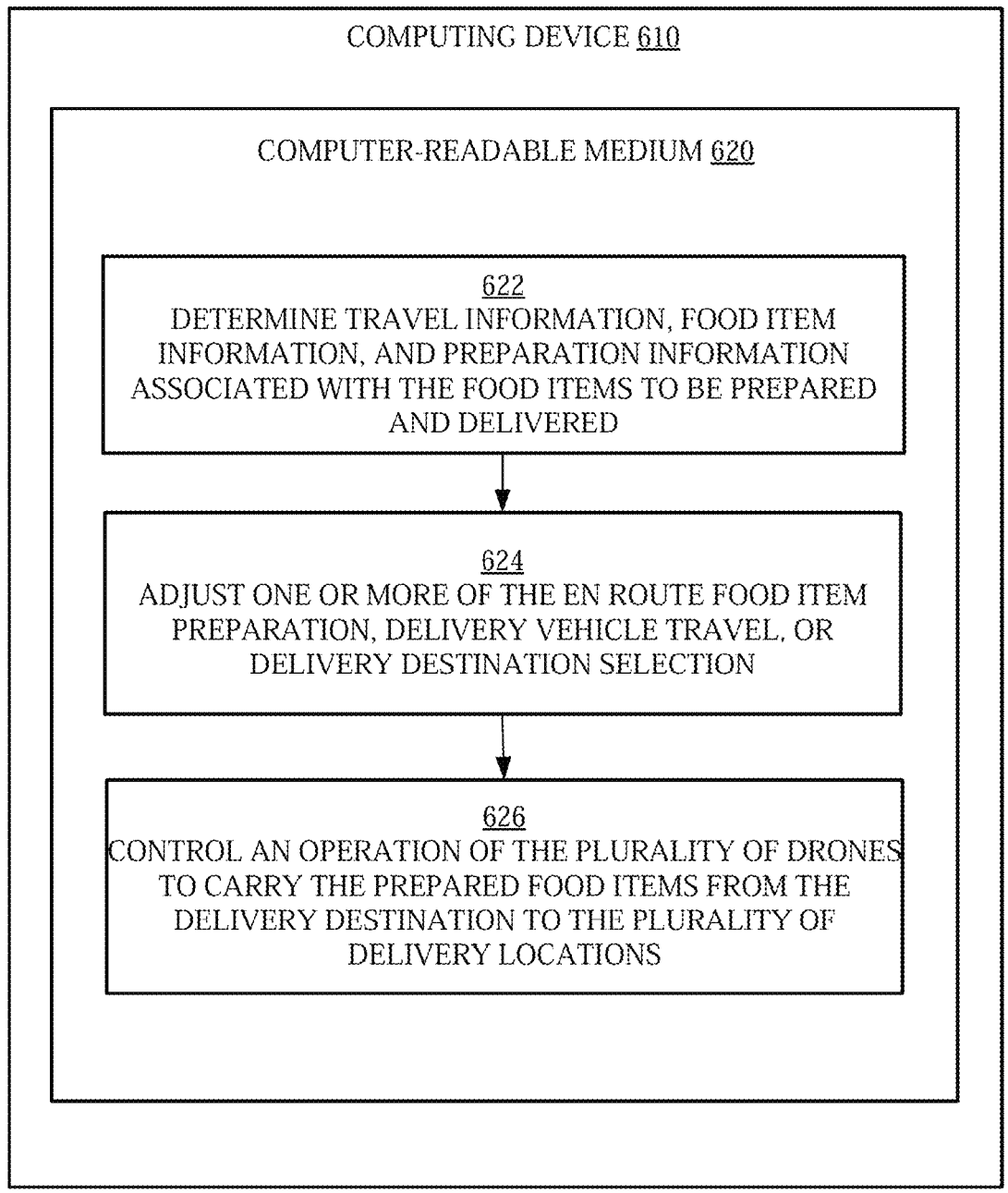
FIG. 6 is a flow diagram illustrating another example method for preparation and drone based delivery of food items in accordance with at least some embodiments described herein.

FIG. 6 is a flow diagram illustrating another example method for preparation and drone based delivery of food items in accordance with at least some embodiments described herein.

Example methods may include one or more operations, functions, or actions as illustrated by one or more of blocks 622, 624, and 626, which may in some embodiments be performed by a computing device such as the computing device 610 in FIG. 6 and/or other general purpose and specialized devices communicatively coupled to the computing device 610. Such operations, functions, or actions in FIG. 6 and in the other figures, in some embodiments, may be combined, eliminated, modified, and/or supplemented with other operations, functions or actions, and need not necessarily be performed in the exact sequence as shown. The operations described in the blocks 622-626 may be implemented through execution of computer-executable instructions stored in a computer-readable medium such as a computer-readable medium 620 of a computing device 610.

An example process for preparation and drone based delivery of food items may begin with block 622, "DETERMINE TRAVEL INFORMATION, FOOD ITEM INFORMATION, AND PREPARATION INFORMATION ASSOCIATED WITH THE FOOD ITEMS TO BE PREPARED AND DELIVERED", where in addition to travel information and food item information, preparation information such as timing of various preparation steps in execution, quantity of remaining ingredients, and similar information may be determined. The information may be used to identify potential food item quantities to be prepared (e.g., if one or more orders are changed while the delivery vehicle is en route), alternative routes or scenarios in case of changes in travel information (e.g., road conditions, traffic, etc.), and delivery preparations (e.g., number and type of drones to be used).

Block 622 may be followed by block 624, "ADJUST ONE OR MORE OF THE EN ROUTE FOOD ITEM PREPARATION, DELIVERY VEHICLE TRAVEL, OR DELIVERY DESTINATION SELECTION", where preparation process parameters (e.g., timing of individual preparation steps), travel parameters (e.g., route, speed, etc.) for the delivery vehicle, and/or the delivery destination selection may be adjusted based on determined information. For example, whether the delivery destination is suitable for at least one of launching or recovering the plurality of drones or whether the delivery destination is suitable for optimal delivery of the prepared food items to the delivery locations by the plurality of drones may be determined and if the delivery destination is determined not to be suitable, another delivery destination may be selected.

Block 624 may be followed by block 626, "CONTROL AN OPERATION OF THE PLURALITY OF DRONES TO CARRY THE PREPARED FOOD ITEMS FROM THE DELIVERY DESTINATION TO THE PLURALITY OF DELIVERY LOCATIONS", where one or more aerial or ground based drones may be used to deliver prepared food items to a plurality of delivery locations (e.g., homes, schools, businesses, hospitals, and similar). The drones may be stored in a storage area of the delivery vehicle and released at the delivery destination. Alternatively, the delivery destination may be a base for drones. The drones may be capable of carrying a single payload or multiple payloads (i.e., multiple food items to multiple destination locations).

Figure 7:
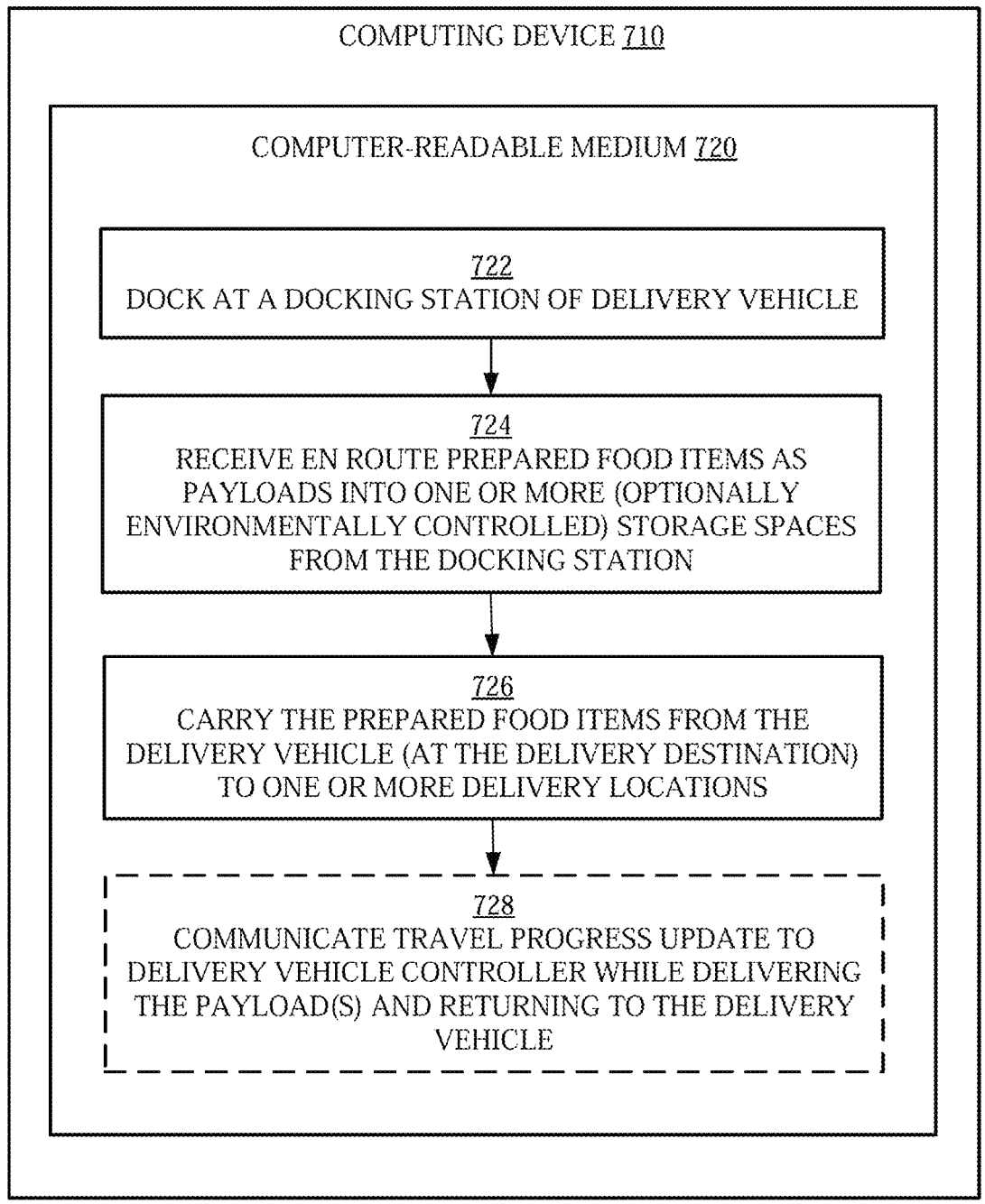
FIG. 7 is a flow diagram illustrating an example method for drones to deliver prepared food items in accordance with at least some embodiments described herein.

FIG. 7 is a flow diagram illustrating an example method for drones to deliver prepared food items in accordance with at least some embodiments described herein.

Example methods may include one or more operations, functions, or actions as illustrated by one or more of blocks 722, 724, 726, and 728, which may in some embodiments be performed by a computing device such as the computing device 710 in FIG. 7 and/or other general purpose and specialized devices communicatively coupled to the computing device 710. Such operations, functions, or actions in FIG. 7 and in the other figures, in some embodiments, may be combined, eliminated, modified, and/or supplemented with other operations, functions or actions, and need not necessarily be performed in the exact sequence as shown. The operations described in the blocks 722-728 may be implemented through execution of computer-executable instructions stored in a computer-readable medium such as a computer-readable medium 720 of a computing device 710.

An example process for drones to deliver prepared food items may begin with block 722, "DOCK AT A DOCKING STATION OF DELIVERY VEHICLE", where aerial or ground based drones may be released from a storage area of the delivery vehicle at the delivery destination or return from a delivery trip and dock at a docking station of the delivery vehicle. In some examples, the docking station may include a to transfer a payload to a drone when docked to the docking station without exposing an interior environment of the delivery vehicle to an external environment exterior to the delivery vehicle.

Block 722 may be followed by block 724, "RECEIVE EN ROUTE PREPARED FOOD ITEMS AS PAYLOADS INTO ONE OR MORE (OPTIONALLY ENVIRONMENTALLY CONTROLLED) STORAGE SPACES FROM THE DOCKING STATION", where the food items may be loaded into payload compartments (storage spaces) on the drone. In some examples, the storage spaces may include drawers, which may be environmentally controlled. For examples, some may be heated to keep hot food items hot and others may be cooled to keep cold food items cold.

Block 724 may be followed by block 726, "CARRY THE PREPARED FOOD ITEMS FROM THE DELIVERY VEHICLE (AT THE DELIVERY DESTINATION) TO ONE OR MORE DELIVERY LOCATIONS", where the aerial or ground based drones loaded with the food items as payload may deliver the payloads to the destination locations such as homes, schools, businesses, hospitals, and comparable locations. In some cases, a drone may deliver a single payload to a single delivery location and return to the delivery vehicle. In other cases, a single delivery drone may deliver multiple payloads to multiple delivery locations and then return.

Block 726 may be followed by optional block 728, "COMMUNICATE TRAVEL PROGRESS UPDATE TO DELIVERY VEHICLE CONTROLLER WHILE DELIVERING THE PAYLOAD(S) AND RETURNING TO THE DELIVERY VEHICLE", where a controller on a drone may report to a controller on the delivery vehicle information such as a remaining travel time to a delivery location, a remaining travel time to the delivery vehicle, a fuel level, a geo-location of the drone, or a speed of travel. The reported information may be used by the controller on the delivery vehicle to determine order processing, as well as, continued food item preparation.

The operations included in the processes described above are for illustration purposes. En route food product preparation and delivery through drones may be implemented by similar processes with fewer or additional operations, as well as in different order of operations using the principles described herein. The operations described herein may be executed by one or more processors operated on one or more computing devices, one or more processor cores, and/or specialized processing devices, among other examples.

Figure 8:
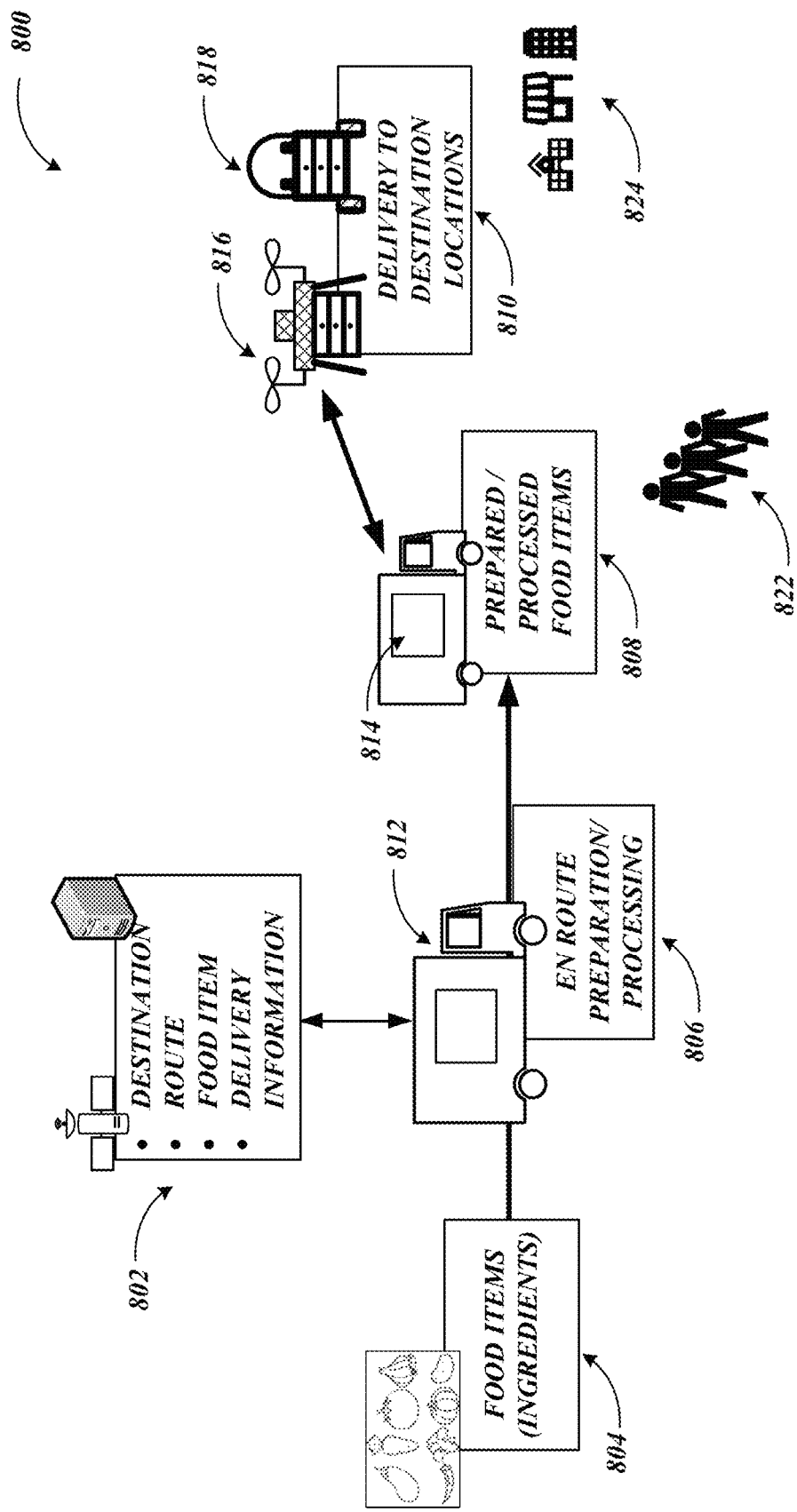
FIG. 8 is a conceptual diagram illustrating major aspects of a system for preparation and drone based delivery of food items according to one or more implementations.

FIG. 8 is a conceptual diagram illustrating major aspects of a system for preparation and drone based delivery of food items according to one or more implementations.

As shown in diagram 800, a delivery vehicle 812 equipped for food item preparation may receive food items 804 (raw materials, ingredients, and similar items to be processed) and deliver prepared and/or processed food items 808 to a delivery destination. En route preparation 806 may include a multi-step process, where operational parameters (e.g., temperature for heating or cooling an ingredient, water pressure for washing an ingredient, slicing or blending speeds, etc.) and timing of each step may be determined and/or adjusted based on travel route parameters such as road conditions, weather conditions, traffic congestion, expected arrival time, etc. Weather conditions may include one or more temperature, humidity, altitude, winds, wave size, etc. Road conditions may include one or more of road curvatures, road tilt (or expected vehicle tilt), construction, road roughness, etc.

A control system 802 may receive information associated with the food items (their quantity, quality, type, packaging, etc.), travel information, and/or delivery information such as delivery addresses, possible routes, order sizes, etc. The control system may determine operational parameters of the process steps and their timing based on the received information and instruct an autonomous food item preparation system in the delivery vehicle 812 to perform the steps of the process based on the operational parameters and timing. The control system 802 may also send instructions for travel to the delivery vehicle (autonomous driving or for vehicle driver).

The autonomous food item preparation system in the delivery vehicle may include one or more food preparation and storage equipment arranged in one or more sealable container modules configured to feed each other. The delivery vehicle 812 may include a truck, a railway car, and/or a watercraft or any other suitable vehicle. Alternatively, the autonomous food item preparation system may be installed in a container, which may be affixable to and transportable by one or more vehicles. In some cases, updated travel information such as addition of a new intermediate waypoint, elimination of an existing intermediate waypoint, change of the delivery destination, change of vehicle type or status, or selection of a different route may be received while en route. In response, operational parameters and timing of the steps of the process for food item preparation may be adjusted such that the food item is in a desired preparation state when the vehicle arrives at the delivery destination.

The delivery destination may be selected based on vehicle travel information, drone travel information, food item information, and preparation information associated with the food items to be prepared and delivered. Vehicle travel information may include road conditions (road curvatures, road tilt (or expected vehicle tilt), construction, road roughness, etc.), weather conditions (temperature, humidity, altitude, winds, wave size, etc.), traffic congestion, expected arrival time, fuel levels etc. Drone travel information may include availability of the drones, delivery progress of the plurality of drones, a speed of each drone, a route of travel of each drone, a number of payloads for each drone, or a selection of the plurality of delivery locations. The selection may further be based on one or more of a concentration of orders for food items, availability of parking, travel routes for the drones and/or the delivery vehicle.

In other examples, the delivery destination may be a pre-installed hub location, where drones may be stored, maintained, etc. The delivery destination may be selected/modified based on travel conditions (e.g., traffic, road conditions, etc.) while the delivery vehicle is en route or based on changes to orders, in some examples. Once at the delivery destination, prepared food items may be delivered directly to customers 822 through a delivery window 714 of the delivery vehicle 812. In addition, aerial drones 816 and/or ground based drones 818 may be used to deliver prepared food items to delivery locations (810) such as homes, schools, businesses, hospitals, and similar locations 824.

As described herein, the delivery process may take into consideration a multitude of factors, and various steps of the process may be adjustable dynamically. For example, a single delivery vehicle (e.g., a truck) may utilize a vending window for direct delivery to customers (walk-up customers or customers picking up their previously placed orders) along with a drone (aerial or ground based) to delivery some orders to delivery locations. Similarly, a single vehicle may utilize multiple drones or one or both types to make deliveries to multiple delivery locations. Furthermore, multiple delivery vehicles with drones may have their delivery processes coordinated. For example, upon receiving a higher than usual number of orders in one area, delivery vehicles may be diverted to that area or a delivery vehicle with a higher number of drones may be sent to that area in place of one with a fewer number of drones.

In addition to the number (and type) of orders, other conditions such as weather-related, structural, or regulatory hindrances at a delivery destination may cause changes in the delivery process. For example, a delivery destination may have a high number of power poles, trees, or similar structural elements in its vicinity, which may hamper drone operations. Upon determining the structural issue, a system according to embodiments may select a new delivery destination or make changes to the delivery method. Order recipients may be contacted and asked if they would be willing to pick up their orders directly from the delivery vehicle, which may be parked closer to the delivery location(s). In another example, high winds or rain may be expected at the delivery destination near the time of deliveries. The system may again change the delivery destination, delivery method, or delivery time contacting the order recipients for confirmation or selection of a new delivery method/time. In a further example, local regulations may limit the hours of drone operations. Upon determining that the arrival of the delivery vehicle (e.g., due to road or traffic conditions) may fall into the restricted operation times, the system may change the delivery time, destination, or method. For example, the delivery vehicle may be parked at a different location sooner than the expected arrival time at the original destination and drones sent out earlier to meet the drone operation time restrictions.

In determining the external factors to be considered in the decision-making process, the system may rely on measurements of environmental characteristics by local sensors, sensors on the delivery vehicle, or third party information services. Such characteristics may include weather conditions, structural elements at a delivery destination, regulatory requirements, etc. For example, the system may receive up-to-date weather information from a weather service and compare that against pending deliveries. Similarly, sensors such as weather sensors (wind, temperature, humidity), cameras, and other types on the delivery vehicle may be used to provide input to the system. In some examples, one or more of the drones may also be equipped with sensors to detect environmental characteristics and change a delivery location selection or order of deliveries based on measured/sensed characteristics.

Additionally or alternatively, operating conditions of the process step and/or food preparation equipment may be adjusted based upon the travel information and/or determined operating conditions of the vehicle. For example, the equipment parameters may be decreased, e.g., speed lowered, based upon determined (estimated or measured) travel information or vehicle parameters such as high vehicle sway or vibration. Similarly, process parameters including temperature, process (e.g., rising or cooking) time and or even ingredients may be adjusted based upon a determined environmental change of the travel information (e.g., altitude, temperature, humidity, etc.) change which may require different preparation parameters or even process. In some cases, equipment operational parameters may be dynamically adjusted based on determined (expected, predicted or measured) container or vehicle parameters based on travel information. For example, equipment may be placed in a closed operation status if vehicle parameters exceed some operational requirements (temperature, to reduce spillage, spoilage, equipment malfunction, etc.). In some cases, the selected food preparation equipment may be changed based on determined (expected, predicted or measured) container or vehicle parameters and travel information. For example, a closed system food preparation equipment (e.g., auger, agitator, plunger etc.) may be selected or adjusted for a processing step based on the travel information, as opposed to an open system food preparation equipment like a conveyor, mixer, etc. In some cases, the control system may pause food preparation at a waypoint stop or may increase food preparation or transfer at a waypoint stop (e.g., when the vehicle is being weighed at a weigh station, when the vehicle is being charged/fueled, or at an operator rest stop, etc.). In some cases, if the container temperature is too hot, equipment operations may be paused or adjusted to meet process requirements.

Additionally or alternatively, the control system may match certain processing steps with certain portions of the route and/or select different travel information based upon the determined effect of the travel information on one or more of the process steps. The control system may monitor progress of the sauce preparation process and adjust timings according to the train's progress along the route such that all sauce is finished and packaged by the time the train reaches its destination. The container may also be loaded to a semi-truck or ship for continued or new travel route and continued processing. In some cases, the control system may compare measured preparation information with expected or estimated preparation information for that particular food preparation process step and adjust process and/or food preparation equipment properties directly (add/remove heat, add oxygen) and/or adjust preparation process.

Figure 9:
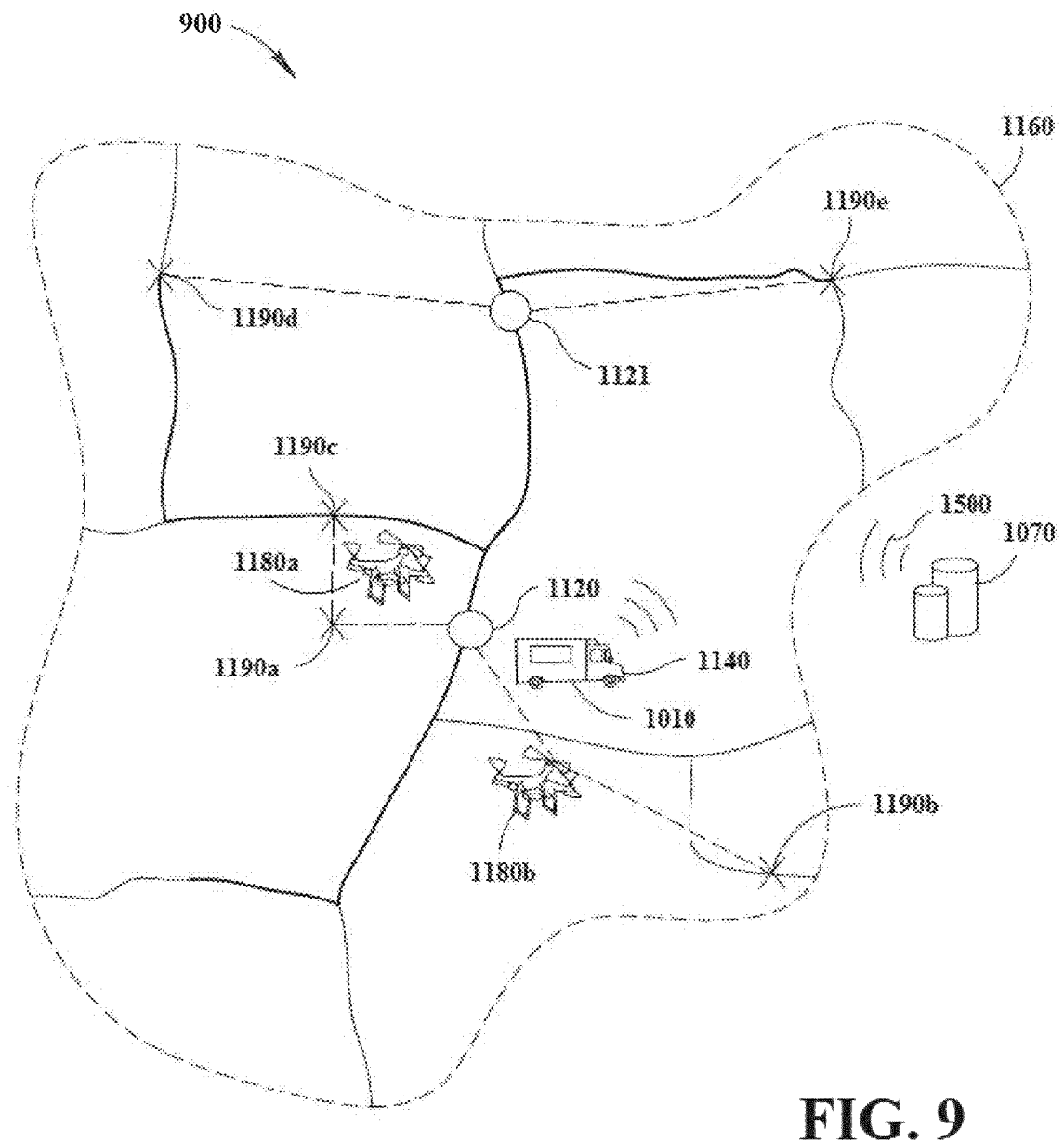
FIG. 9 is a schematic diagram of a food preparation and delivery system in which a land-based vehicle serves as a hub and provides food items to other aerial drones that may transport those food items to delivery locations, according to at least one illustrated implementation.

FIG. 9 shows an implementation of a multi-modal food preparation and delivery system 900, which may include a land-based vehicle 1010 and one or more delivery vehicles. The land-based vehicle 1010 may be manned, or unmanned, autonomous or remote controlled, and may be a transport vehicle 214 or a delivery vehicle 208 as discussed above. As illustrated in FIG. 9, the delivery vehicles may be aerial drones 1180a, 1180b, but other delivery vehicles may also be used, for example, other automated, unmanned or manned vehicles, bicycles, Segways®, another land-based vehicle 1010, or some other such vehicle. The system may operate in constellation mode, a cook en route mode, and a pop-up kitchen mode, according to at least one illustrated implementation. In the constellation mode, a land-based vehicle 1010 may be at a location 1120, operating as a hub 1140, while using food preparation equipment to prepare and cook food items 204 that are to be delivered to customers in a geographic area 1160 surrounding the location 1120. As each food item 204 is prepared and each order is complete, separate vehicles serve as delivery vehicles and may be used to deliver the prepared food item 204 to an appropriate delivery destination 1190. Optionally, these separate delivery vehicles may also prepare and cook or complete cooking of food items 204, while en route to a delivery destination, for example, by maintaining the food item 204 at a desired temperature using a heating element, a cooling element or some other environmental control. In some implementations, the constellation mode may serve a geographic area 1160 that is about 2-3 miles in width or radius. In some implementation, the constellation mode may serve any suitable geographic area that can be covered by the delivery vehicles.

In some implementations, the hub 1140 may be used to replenish other vehicles 1010 operating in the constellation mode. In such an implementation, one or more vehicles 1010 may have supplies replenished from the hub 1140, as necessary. The delivery vehicles may receive food items 204 for delivery to or from these one or more vehicles 1010. In some implementations, hubs 1140 may be used to replenish supplies held by other hubs 1140. In other implementations, the hub 1140 may be replenished by delivery vehicles 1180 retrieving ingredients or food items 204 from physical locations, such as physical supply locations 206, ingredient providers 212, or food item providers 216, as described above.

In a cook en route mode, the land-based vehicle 1010 may prepare and cook food items 204 for delivery as the land-based vehicle 1010 travels between different delivery destinations 1190. In such a mode, the land-based vehicle 1010 may serve as a cooking and delivery vehicle. The order of cooking and delivering the food items 204 may be modifiable based on various criteria (e.g., optimizing delivery or wait times, or geographical groupings). In some implementations, the land-based vehicle 1010 operating in the cook en route mode may be provided with orders for food items 204 grouped within a geographic area 1160 to optimize time and resources for delivery.

In some implementations, the land-based vehicle 1010 may be simultaneously operating in both the cooking en route mode and the constellation mode. In such an implementation, the land-based vehicle 1010 may be traveling to a delivery destination 1190 to deliver a food item 204 while at the same time preparing other food items 204 to be delivered to other delivery locations 1190 by other separate delivery vehicles. As such, the land-based vehicle 1010 may transmit one or more meeting locations to these other separate delivery vehicles at which the prepared food items 204 may be transferred to the other separate delivery vehicles. The meeting locations may be different from the current location of the land-based vehicle 1010. For example, in some implementations, the land-based vehicle 1010 may determine the time remaining before a food item 204 to be delivered by one of the other separate delivery vehicles will be prepared. The land-based vehicle 1010 may then determine a location or area where the land-based vehicle 1010 is likely to be when delivering the food item 204 for the cooking en route mode. The land-based vehicle 1010 may then transmit a meeting spot to the other separate delivery vehicle to meet at the determined location or within the determined area to transfer the food item 204 to be delivered in the constellation mode. In some implementations, the land-based vehicle 1010 may temporarily remain stationary at the determined location or within the determined area to transfer food items 204 to multiple other delivery vehicles for delivery to multiple other delivery destinations 1190 as part of the constellation mode. When all of the transfers are complete, the land-based vehicle 1010 may then continue to the delivery destination 1190 for the food item 204 to be delivered as part of the cooking en route mode.

In a pop-up kitchen mode, the land-based vehicle 1010 may remain in a location 1120 while preparing and cooking food items 204 for orders that are to be picked up by customers from the land-based vehicle 1010. In some implementations, the land-based vehicle 1010 may operate concurrently in both the constellation mode and the pop-up kitchen mode. As such, the vehicle may process orders in the constellation mode to be delivered by other delivery vehicles and, at the same time, process orders to be picked up at the land-based vehicle 1010 by customers in the pop-up kitchen mode 1300.

The land-based vehicle 1010 may be communicatively coupled to a computer system 1070 in any of the three modes. The computer system 1070 may be an off-board computer system, as shown in FIG. 9, or an onboard computer system disposed in the land-based vehicle. In some implementations, the separate delivery vehicles may optionally be communicatively coupled to the computer system 1070 and/or to the land-based vehicle 1010. Such computer system 1070 may execute one or more programs or sets of instructions to coordinate the operation of one or more vehicles 1010 as part of a multi-modal food preparation and distribution system 900, and may transmit information 1500 to one or more of the vehicles 1010 and/or the separate delivery vehicles to facilitate the operation of the vehicles 1010 in each of the various modes. In some implementations, such instructions may cause the computer system 1070 to serve as a centralized order fulfillment system. In some implementations, the computer system 1070 may communicate and coordinate the operation of multiple vehicles 1010, at least some of which may be operating in different modes. In such an implementation, the multi-modal food preparation and distribution system 900 may include one or more off-board computer systems 1070, one or more vehicles 1010, and one or more delivery vehicles, and may facilitate and coordinate concurrent operations of multiple vehicles 1010 operating within different modes.

For example, as illustrated in FIG. 9, a food delivery system may include a land-based vehicle 1010 that may carry a number of aerial drones 1180*a*, 1180*b* and a number of payloads, such as containers 800 described below. Each payload may contain one or more food items 204 to be delivered to a delivery destination 1190. The payloads may be coupled to aerial drones 1180*a*, 1180*b* for delivery to the delivery locations 1190. Land-based vehicle 1010*a* may be deployed to first location 1120, where a first payload may be coupled to first aerial drone 1180*a*. The first aerial drone 1180*a* may then be dispatched from the land-based vehicle to deliver the first payload to a first delivery location 1190*a*. A second payload may be coupled to a second aerial drone 1180*b*. The second aerial drone 1180*b* may be dispatched to deliver the second payload to a delivery location, such as the first delivery location 1190*a* (if additional food items 204 in excess of the capacity of the first aerial drone 1180*a* still need to be delivered to first delivery location 1190*a*), or to a second delivery location 1190*b* that is different from the first delivery location 1190*a*. The second aerial drone 1180*a* may be dispatched to the desired delivery location while the first aerial drone is still in transit to or from the first delivery location 1190*a*. An aerial drone may deliver more than one payload per dispatch. For example, a first payload and a second payload may be coupled to the first aerial drone 1080*a*. The first aerial drone may then be dispatched to deliver the first payload from the land-based vehicle 1010 at first location 1120 to first delivery location 1080*a*. Once that delivery has been completed, the first aerial drone may then be dispatched to deliver the second payload to the next delivery location, as illustrated in FIG. 9. Once their respective deliveries are made the aerial drones 1180*a*, 1180*b* may then return to the land-based vehicle to deposit empty payloads, pick up new payloads, and/or to recharge. The land-based vehicle may wait at first location 1120 until the aerial drones 1180*a*, 1180*b* have returned and completed all respective deliveries (which may include multiple trips out from and to the land-based vehicle). Alternatively, the land-based vehicle may deploy to a second location 1121, and the aerial drones may rendezvous with the land-based vehicle at the second location 1121, or while it is transiting from the first location 1120 to the second location 1121. Once the land-based vehicle has deployed to the second location 1121, additional payloads may be coupled to the aerial drones 1180*a*, 1180*b* for delivery to additional delivery locations 1190*d*, 1190*e*. For instance, a payload may be coupled to first aerial drone 1180*a* for delivery from second location 1121 to delivery location 1190*d*. Similarly, a payload may be coupled to second aerial drone 1180*b* for delivery to either delivery location 1190*d* or delivery location 1190*e*.

The computer system 1070 may determine the location of the first location 1120 and/or the second location 1121 prior to deploying the land-based vehicle to those location. For example, the computer system 1070 may determine the first location based at least in part on an actual or a predicted demand for the food items 204 and based at least part on the capabilities of the delivery vehicles, including the aerial drones 1180*a*, 1180*b*. An actual demand may be where the computer 1070 has already received a set of orders that the land-based vehicle 1010 must deliver. A predicted demand may be derived from historical orders from previous days or weeks or may be calculated based on a market analysis and other factors. Similarly, the capabilities of the delivery vehicles, including aerial drones 1180*a*, 1180*b* may factor into the computer's selection of a suitable location. The carrying capacity, speed, round trip range, performance in current environmental conditions, and status (such as whether the vehicle is at full power or still charging) may all be factored into the selection of locations. The computer 1070*t* may identify suitable locations from which the land-based vehicle 1010 may act as a hub 1140 and dispatch delivery vehicles. The computer may then choose an optimal location 1120 from potential hub 1140 locations, by using information about the demand and vehicle capabilities, and any other factors that may impact delivery time or efficiency, including but not limited to an estimate transit time for the land-based vehicle to a respective location, an estimate transit time for the delivery vehicles, including the aerial drones 1180*a*, 1180*b* to at least one of the delivery destinations, an estimate transit time for the delivery vehicles, including the aerial drones 1180*a*, 1180*b* to at least one of the delivery destinations from each of a number of the plurality of locations, or any combination thereof. In circumstances where the delivery vehicle range cannot cover all delivery locations, or when using a second location may lead to a more efficient delivery solution, the computer may determine a second location 1121 based at least in part on an actual or a predicted demand for the food items 204 and based at least part on delivery vehicle characteristics, such as the a round trip range of the aerial drones 1180*a*, 1180*b*.

In this manner, the computer may determine a routing of the land-based vehicle 1010 to traverse a path including of a plurality of locations, including the first location 1120, based at least in part on a predicted demand for the food items 204. The routing may be determined dynamically, as new orders come in and are received, or the routing may be pre-planned. The routing may be determined based at least in part on a predicted demand for the food items 204, an actual demand for the food items 204, characteristics of the delivery vehicles, including a round trip range of the aerial drones 1180*a*, 1180*b*, an estimate transit time for the land-based vehicle to a respective location, an estimate transit time for the delivery vehicles, including the aerial drones 1180*a*, 1180*b* to at least one of the delivery destinations, an estimate transit time for the delivery vehicles, including the aerial drones 1180*a*, 1180*b*, to at least one of the delivery destinations from each of a number of the plurality of locations, or any combination thereof. The computer may further perform one or more optimizations on a traveling salesmen type problem to optimize on one of time to delivery, time of transit, or resource efficiency while determining the routing of the land-based vehicle to traverse a path including a plurality of locations.

Figure 10A:
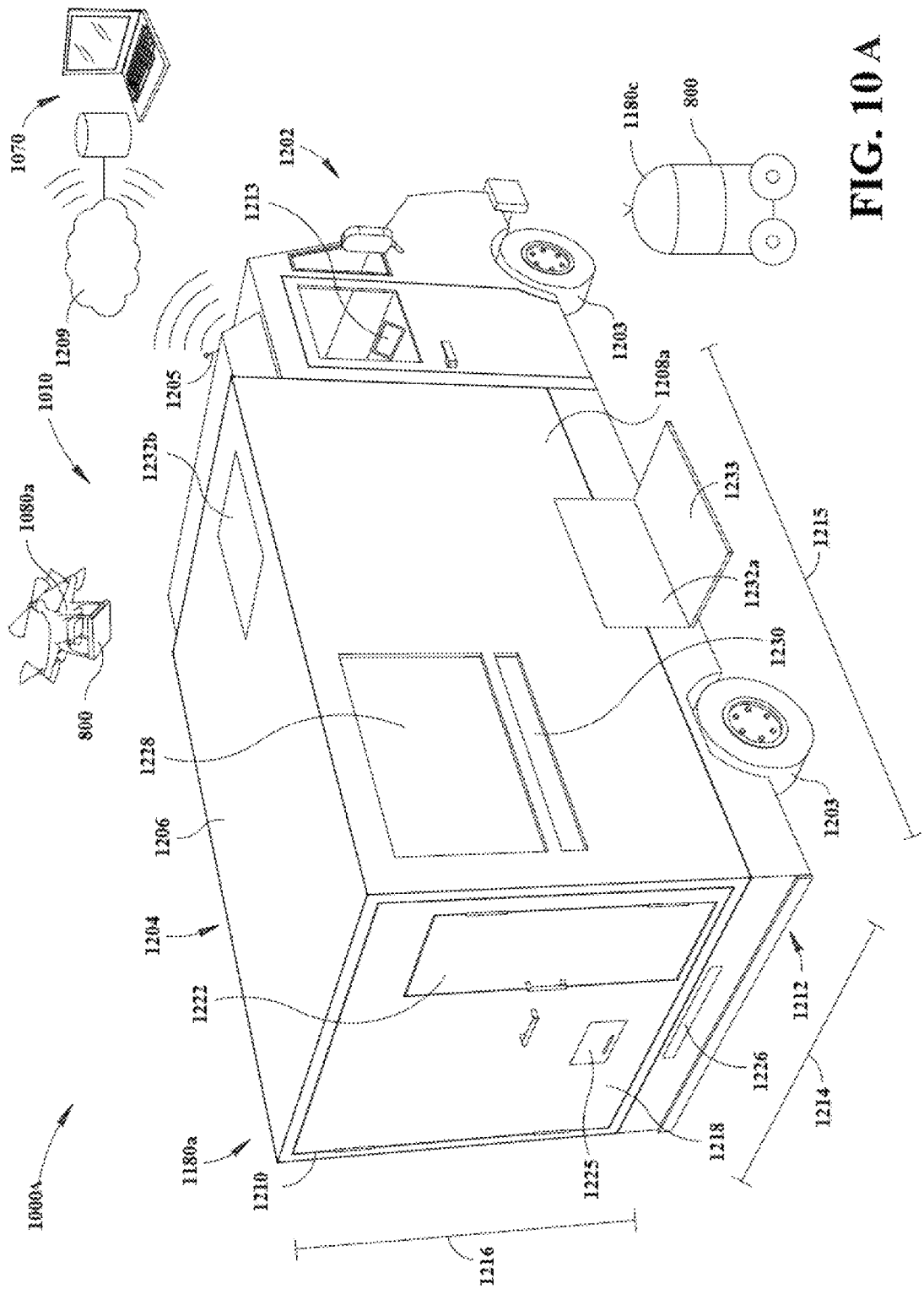
FIG. 10A is an isometric view of a food preparation and delivery system that includes a vehicle, a control system, and optionally, one or more additional vehicles that may be used to deliver food items prepared by the vehicle, according to at least one illustrated implementation.

FIG. 10A is a view of a food preparation and delivery system 1000A that includes a land-based vehicle 1010, a control system 1070, may further include one or more additional delivery vehicles. The additional delivery vehicles, including an aerial drone 1180*a* may be used to deliver food items 204 prepared by the vehicle 1010, for example, when the vehicle 1010 serves as a hub 1140 in a constellation mode. Such delivery vehicles may include insulated carriers for containers 800 into which the food item 204 to be delivered may be loaded. Such an insulated container may prolong the amount of time that the food item 204 stays at a hot (or otherwise elevated) or cold (or otherwise chilled) temperature, as appropriate for the food item 204. Optionally, the additional delivery vehicles 1180 may include food preparation units, operable to cook or finish preparing food items 204 en route to a delivery destination. For example, they may have environmental controls, such as heating elements or cooling elements that can be used to maintain the food item 204 at a desired temperature while the delivery vehicle 1180 is in transit, as discussed in greater detail below.

In some implementations, the type of delivery vehicle (e.g., ground drones 1180*c*, aerial drones 1180*a*, bicycles, or other such vehicles such as scooters) chosen to deliver a food item 204 may be based on various considerations. For example, in some situations, the relative travel times of each type of available delivery vehicle to a delivery destination 1190 may be considered in selecting a specific type of delivery vehicle to travel to the delivery destination 1190. Thus, in situations in which the route to the delivery destination 1190 includes one or more congested streets, a bicycle or aerial drone 1180*a* may be selected as the delivery vehicle to deliver the food items 204 to the delivery destination 1190. In some instances, local, state, or federal laws may restrict the use of ground drones 1180*c* and/or aerial drones 1180*a*. In some implementations, state or local ordinances and/or traffic conditions may limit the speed or range of some types of delivery vehicles, such as, for example, scooters or other types of motorized vehicles.

The vehicle 1010 may include a cab portion 1202 and a cargo portion 1204, according to at least one illustrated implementation. The vehicle 1101 may include one or more wheels 1203 that are in contact with the ground and support the vehicle 1010 in a position above the ground. The vehicle 1010 may further include a wireless communications interface, such as one or more antenna 1205 and one or more controls/displays 1213. The one or more antenna 1205 may, for example, be located on or above the roof of the cab portion 1202. The antenna(s) 1205 and controls/displays 1213 may be communicatively coupled to enable communication between components on the vehicle 1010 and a control system 1070 located remotely from the vehicle via a communications network 1209. The cab portion 1202 typically includes one or more seats for a driver and passenger(s).

The cargo portion 1204 may include a top side 1206, a left exterior side wall 1208*a* and a right exterior side wall 1208*b* (collectively, "exterior side walls 1208"), a back wall 1210, and a bottom side 1212. The cargo portion 1204 may have a width 1214, a length 1215, and a height 1216. The dimensions of the width 1214, length 1215, and height 1216 of the cargo portion 1204 may be based on local or state ordinances regarding use of public roadways, including, for example, local or state ordinances governing food delivery vehicles. In some implementations, the dimensions of the width 1214, length 1215, and height 1216 of the cargo portion 1204 may be smaller than the maximum dimensions allowed by local or state ordinances. Smaller cargo portions 1204 may be advantageous, for example, when the vehicle 1010 is to travel in or through neighborhoods or areas with narrow roads and/or tight turns.

The back wall 1210 may include one or more loading doors 1218 that are sized and dimensioned to provide access to a cargo area enclosed within the cargo portion 1204 of the vehicle 1010. In some implementations, the loading door(s) 1218 may be a single door that stretches substantially across (i.e., >50%) the width 1214 along the back wall 1210. The back wall 1210 may include a personnel door 1222 located within the loading door 1218. The personnel door 1222 may be physically, rotationally coupled to the loading door 1218, and may rotate in the same direction or in the opposite direction as the loading door 1218 in which the personnel door 1222 is located. The dimensions, e.g., width and height, of the personnel door 1222 are smaller than the corresponding dimensions of the loading door 1218, for instance (<33%) of the width 1214 along the back wall 1210. The personnel door 1222 may be set within the loading door 1218 relatively closer to one or the other exterior side walls 1208, or the personnel door 1222 may be centered within the loading door 1218 relative to the exterior side walls 1208. The personnel door 1222 may be positioned to provide access between the exterior of the vehicle 1010 to the cargo area, and sized and dimensioned to receive a human therethrough (e.g., 36 inches or 42 inches wide, 60 or more inches tall). The size, shape, dimensions, and/or location of the personnel door 1222 may be set according to local or state ordinances, such as, for example, those ordinances regarding health and safety for operating food delivery and/or food serving vehicles. In some implementations, the loading door 1218 may include one or more additional small doors 1225 that may be smaller than the personnel door 1222. In some implementations, the small doors 1225 may enable food products to be passed from the cargo portion 1204 to a person or customer standing outside of the vehicle.

The cargo portion 1204 may further optionally include a ramp 1226 that may be selectively deployed when the vehicle 1010 is in a stationary, parked position to stretch from a ground-level location behind the back wall 1210 of the vehicle 1010 to the cargo area towards the bottom side 1212 of the cargo portion 1204. The ramp 1226 may be used to roll supplies, equipment, or other material into and out of the cargo area. In some implementations, the ramp 1226 may be used to roll supplies, equipment, or other material out of one vehicle 1010 and into the cargo portion 1204 of another vehicle 1010. When not deployed, the ramp 1226 may be stowed within a cavity proximate the bottom side 1212 of the cargo portion 1204.

One or both of the exterior side walls 1208 may include a display or monitor 1228 oriented to display images, e.g., video images, towards the exterior of the vehicle 1010. The display or monitor 1228 may be any type of display or monitor, such as, for example, a thin profile LCD, OLED or similar type of screen. The display or monitor 1228 does not extend into the cargo area. The display or monitor 1228 may be one that uses a minimal amount of electrical power during operation. The display or monitor 1228 may display any type of programming, including still images or moving images. In some implements, the display or monitor 1228 may display a video feed captured by one or more cameras located within the cargo area of the vehicle 1010. In some implementations, such display or monitor 1228 may provide advertisements and/or a menu for the products being sold by the vehicle 1010. In some implementations, the vehicle 1010 may make pizzas to order and/or for delivery using one or more robots and/or assembly lines located within the cargo area of the cargo portion 1204 of the vehicle 1010. In such an implementation, the cameras may capture images, which may be displayed live or alternatively as pre-recorded images, from the cargo area of the movements and positioning of the various robots when assembling food items 204. Such images may be displayed by the display or monitor 1228 as a form of advertisement and/or entertainment for current and potential customers. In some implementations, the display on the display or monitor 1228 may progressively or randomly provide different displays (e.g., menu, interior shot, and advertisement) for defined periods of time.

One or both of the exterior side walls 1208 may include a food slot 1230 that may be used to deliver a hot, prepared food item 204, for example a pizza, that has been packaged for delivery. The size, dimension, and position of the food slot 1230 may be based, for example, on the type of food item 204 that is to be prepared and delivered. For example, a food slot 1230 for pizza may be wider and shorter in height than a food slot 1230 used for prepared and packaged food items. The food slot 1230 may be used to deliver food items 204 automatically after the food item 204 has been prepared within the cargo area.

One or both of the exterior side walls 1208 may include one or more food delivery ports 1232 that provides access to one or more delivery robots, such as terrestrial food delivery robots (e.g., ground drones 1180*c*) or flying food delivery robots (e.g., aerial drones 1180*a*) (collectively, "delivery robots 1180*a-c*"), that may be used to transport prepared food to the final delivery destination 1190. A ground food delivery port 1232*a* may provide an aperture located proximate the bottom side 1212 of the cargo portion 1204 of the vehicle 1010. Such a ground food delivery port 1232*a* may further include a ramp 1233 that may slope downwards from the ground food delivery port 1232*a* towards the ground. Such a ramp may be used by ground drones 1180*c* to enter and exit the cargo area where the ground drones 1180*c* may be loaded with prepared food items 204 for delivery to remote locations. An air food delivery port 1232*b* may be located along the top side 1206 of the cargo portion 1204 of the vehicle 1010. Such an air food delivery port 1232*b* may be used to provide entry and exit to the cargo area by one or more aerial drones 1180*a*. A docking station with one or more docks, as described below, may be positioned around the air food delivery port to assist in coupling the land-based vehicle 101 to the aerial drone 1180*a* so that food items 204 can be loaded or unloaded. Such aerial drones 1180*a* may be used to deliver food items 204 via the air to one or more remote locations. Each of the food delivery ports 1232 may include one or more covers that may be used to shield and/or seal a food delivery port 1232 when the food delivery port 1232 is not in use.

The delivery robots 1180*a-c* may be used in lieu of delivery people. The delivery robots 1180*a-c* may be manually controlled by a human who is located locally or remotely from the delivery robot 1180*a-c*, and/or controlled autonomously, for example using location input or coordinate from an on-board GPS or GLONASS positioning system and receiver for from one or more wireless service provider cellular towers. In some implementations, location input and/or positioning may be provided using on-board telemetry to determine position, vision systems coupled with pre-recorded photos of the surrounding environment, peer-to-peer relative positioning with other autonomous or non-autonomous vehicles, and/or triangulation with signals from other autonomous or non-autonomous vehicles. In some implementations involving multiple delivery robots 1180a-c, the delivery robots 1180a-c may make deliveries during overlapping time periods.

Figure 10B:
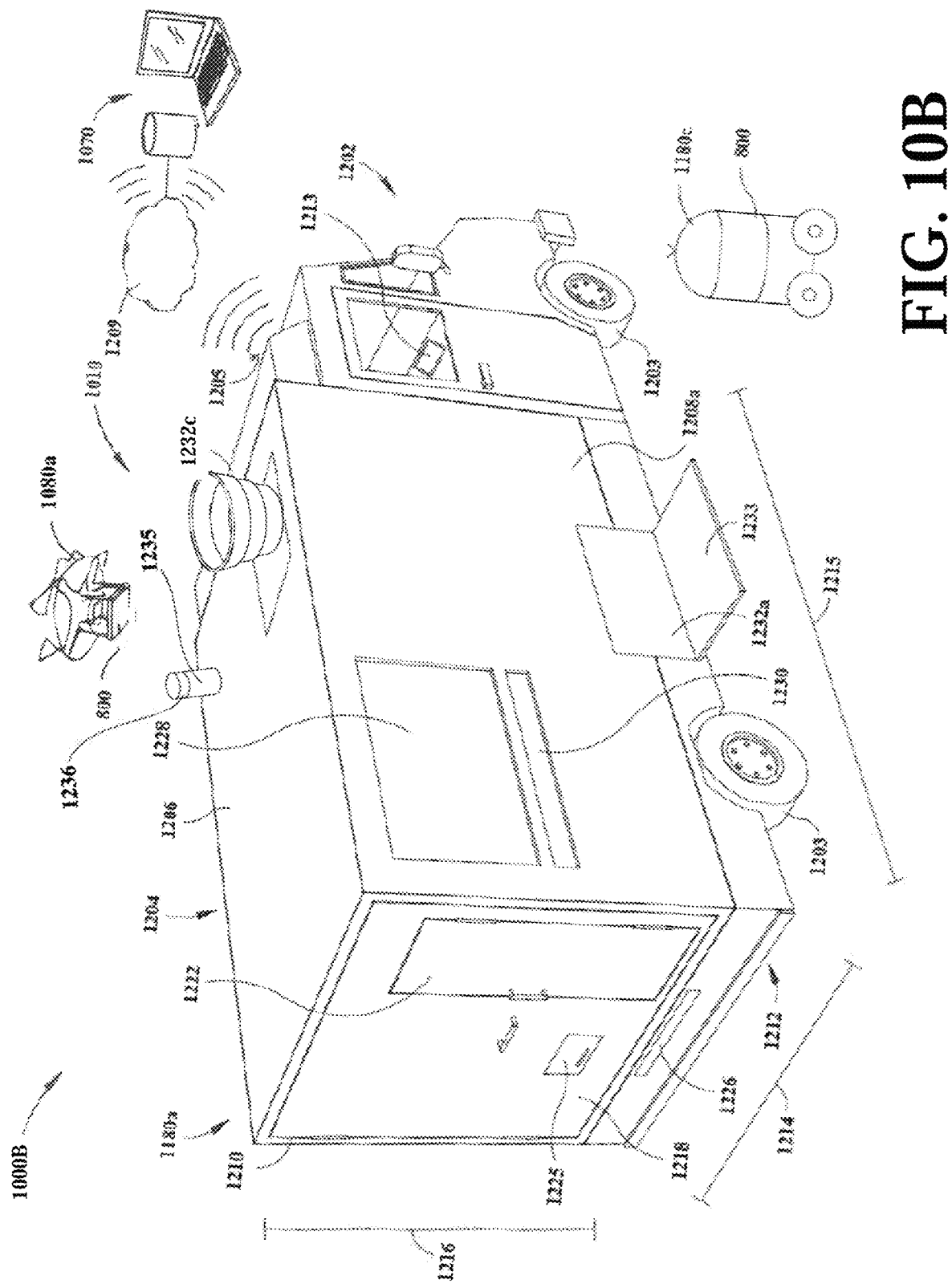
FIG. 10B is an isometric view of a portion of a cargo area of a land-based vehicle having a conning tower with one or more sensors, and a dock having a skirt.

FIG. 10B is an isometric view of a portion of a cargo area of a land-based vehicle of a food preparation and delivery system 1000B having a conning tower with one or more sensors, and a dock having a skirt. In some embodiments, a delivery vehicle 208 or a transport vehicle may be provided that may be provided with sensors 1236, such as GPS devices/receivers, cameras and distance measuring devices. Sensors 1236, as used herein is defined broadly, including devices that directly measure or capture a physical characteristic, such as range finders and cameras, and devices that indirectly calculate a physical characteristic, such as a GPS receiver that calculates a GPS location based on received GPS signals. Any suitable sensor 1236 that may directly measure or indirectly calculate a characteristic of an environment at a location at which a delivery vehicle 208 or transport vehicle 213 may be stationed may be used with the disclosed concepts. In some implementations some, or all such sensors may be located in a conning tower 1235. The readings and images taken by the sensors may assist in evaluating the suitability of drone deployment locations 1120. For example, GPS location data, images captured by a camera, and/or range data may be provided to an onboard or off-board computer system 1070 which may evaluate the suitability of a potential drone deployment location 1120. GPS data may be compared to map application data to determine whether the potential drone deployment location 1120 is a location where aerial drones are not allowed, such as near an airport. Range data may be used to determine whether there are any trees, power lines, or other obstacles in the way that would interfere with drone loading and unloading at the potential drone deployment location 1120. Image data of any characteristic of the environment of a location may be processed and used to determine whether there is any indicator that might make the location unsuitable for launching or recovering drones. For example, one or more images captured by one or more cameras can be used to detect an indicator, such as any obstacles in the way that would interfere with launching or recovering aerial drones. Image data may also be processed to detect an indicator, such as visual confirmation that the location is near something that may restrict or prohibit the operation of aerial drones (such as an airport, military base, school), or whether there are obstacles or other hazards (such as workers) nearby that may interfere with launching or recovering aerial drones. The computer system 1070 may then evaluate the data provided by the sensors and determine whether deployment location 1120 is suitable. This determination may be made autonomously by the computer or with human assistance or oversight. If so, it may allow aerial drones to proceed with docking and departing the docking station(s) 1232c on the delivery vehicle. If potential deployment location 1120 is not suitable, the computer system 1070 may instruct the delivery vehicle 208 or transport vehicle 214 to reposition to an alternative deployment location 1121 before proceeding with aerial drone 1080a deliveries.

Figure 11:
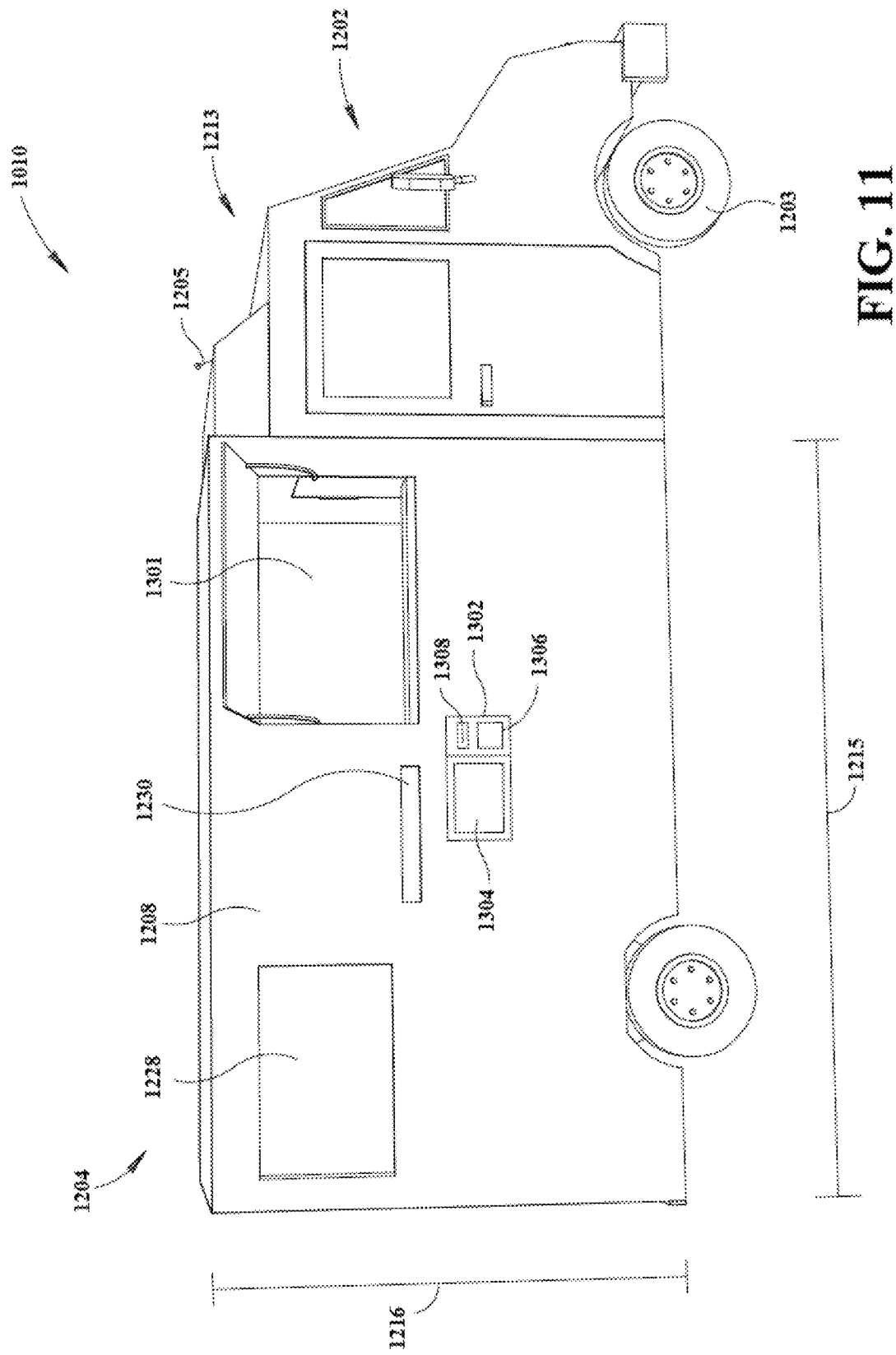
FIG. 11 is a side elevational view of a second configuration of a land-based vehicle that can prepare and/or deliver food as part of a food preparation and delivery system, according to one illustrated implementation.

FIG. 11 is an exterior view of a second configuration of the vehicle 1010 that includes a cab portion 1202 and a cargo portion 1204. In this configuration, the cargo portion 1204 of the vehicle 1010 may include a service window 1301 that customers may use to place and receive delivery of orders. The service window 1301 may be sized, dimensioned, and located to facilitate transactions between customers and operators of the vehicle 1010 and/or robots thereof. The location of the service window 1301 may be modified based upon the layout of equipment within the cargo area. The lower edge of the service window 1301 may be about four and one-half to five and one-half feet above the ground. The service window 1301 may be about four feet high, and between three feet to seven feet wide. In some implementations, a point-of-sale (POS) terminal 1302 may be included in the side wall 1208 of the vehicle 1010 and located proximate the service window 1301 and/or food slot 1230. In such an implementation, the POS terminal 1302 may be used to facilitate transactions with customers by processing various forms of payment (e.g., payment via credit cards, debit cards, and/or gift cards) for orders placed with an operator via the service window 1301. The service window 1301 and/or food slot 1230 may be conveniently located at or close to the end of a food preparation assembly line or area at which hot, prepared food will be placed to be conveyed to customers to complete an order.

In some implementations, the POS terminal 1302 may be used to receive and process orders from customers. For example, the POS terminal 1302 may include one or more of a video display 1304, a keypad 1306, and a card slot 308. In such an implementation, the video display 1304 may be used to provide a menu and ordering options to customers. Customers may therefore be able to submit orders for food items 204 via the POS terminal 1302. Payment for such orders may be submitted by inserting a payment card (e.g., credit card, debit card, or gift card) into the card slot 1308 for processing. Customer may submit information, such as menu selections and/or payment information, using the keypad 1306. In some implementations, the video display 1304 may be a touchpad screen that can accept customer selections.

In some implementations, the POS terminal 1302 may be located in a kiosk that is located apart from the vehicle 1010. The use of a separate kiosk or multiple separate kiosks having POS terminals 1302 located apart from the vehicle 1010 may advantageously be used, for example, to control the flow of customers. In such a situation, ordering customers may form one or more lines to place orders at some location apart from the vehicle 1010, thereby limiting the customers who may be congregating around the vehicle 1010 to those who are waiting on their orders to be completed.

In some implementations, the POS terminal 1302 may include a wireless access point, which allows orders to be placed and paid for by a customer via a mobile device (e.g., smartphone, tablet computer). This may enable a customer to place and pay for an order before arriving at the vehicle 1010, so freshly prepared food is ready on the customer's arrival. This may also allow the customer to pick up and order with minimal or even no human interaction with a server, cook or other human. For example, the hot, freshly prepared food item 204 may be delivered via food slot 1230 when the customer submits identification information (e.g., an access code provided with the order, a customer ID and login, the credit card used to pay for the order) via the POS terminal 1302. In some implementations, the POS terminal 1302 may be incorporated into an electronic pad that is wirelessly coupled to the vehicle 1010. Such a POS terminal 1302 may be carried by employees through a crowd, such as a sporting event, to take orders from customers, who could retrieve the ordered item from the parked vehicle 1010.

Figure 12:
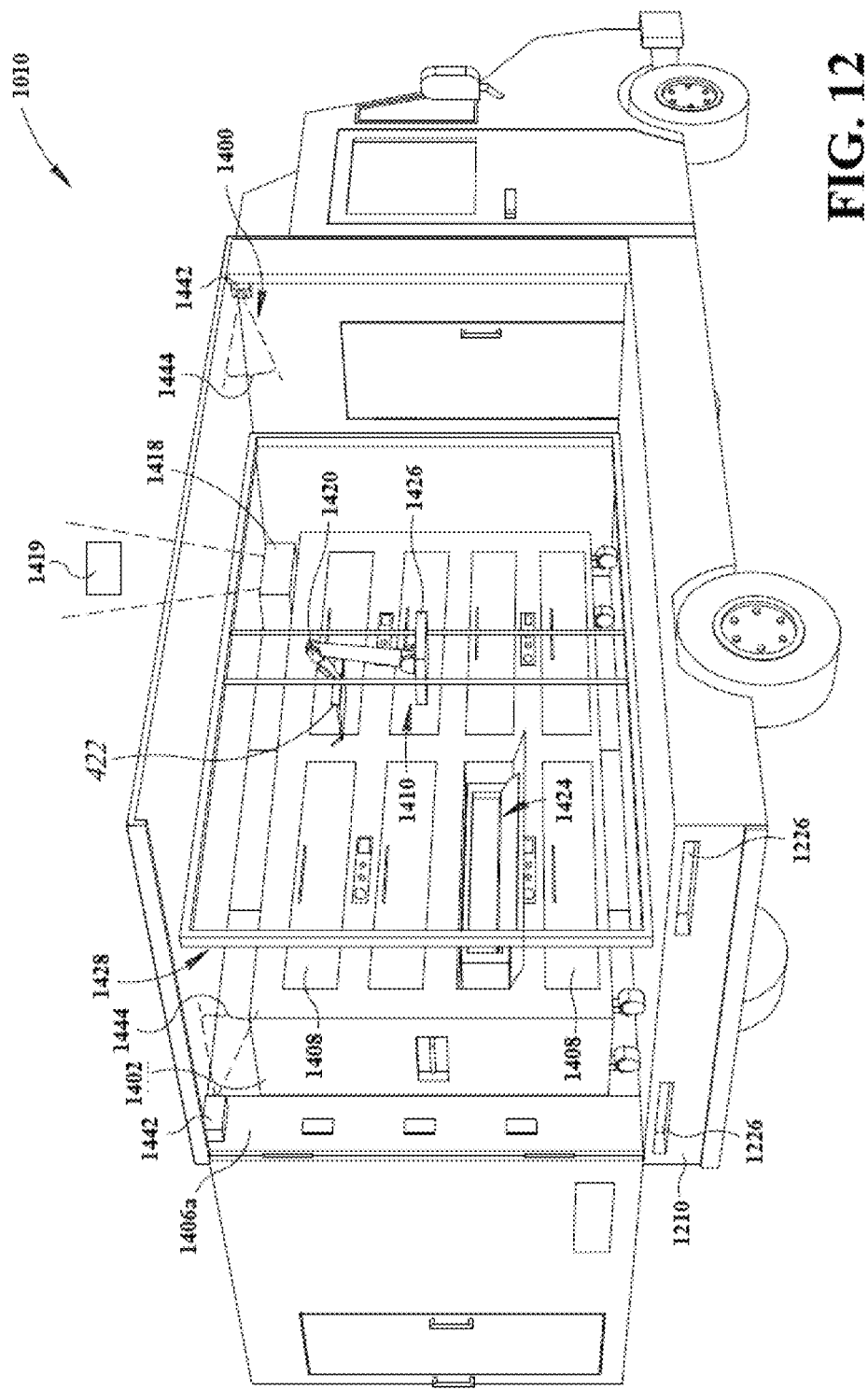
FIG. 12 is an isometric view of a portion of a cargo area of a land-based vehicle that may be used to prepare and, or distribute, food, for example hot food, in which the right-hand interior side wall has been cut away, the cargo area to include a number of cooking and preparation components secured to the side walls, and a transfer robot to transfer food items between the various cooking and preparation components, according to at least one illustrated implementation.
Figure 13:
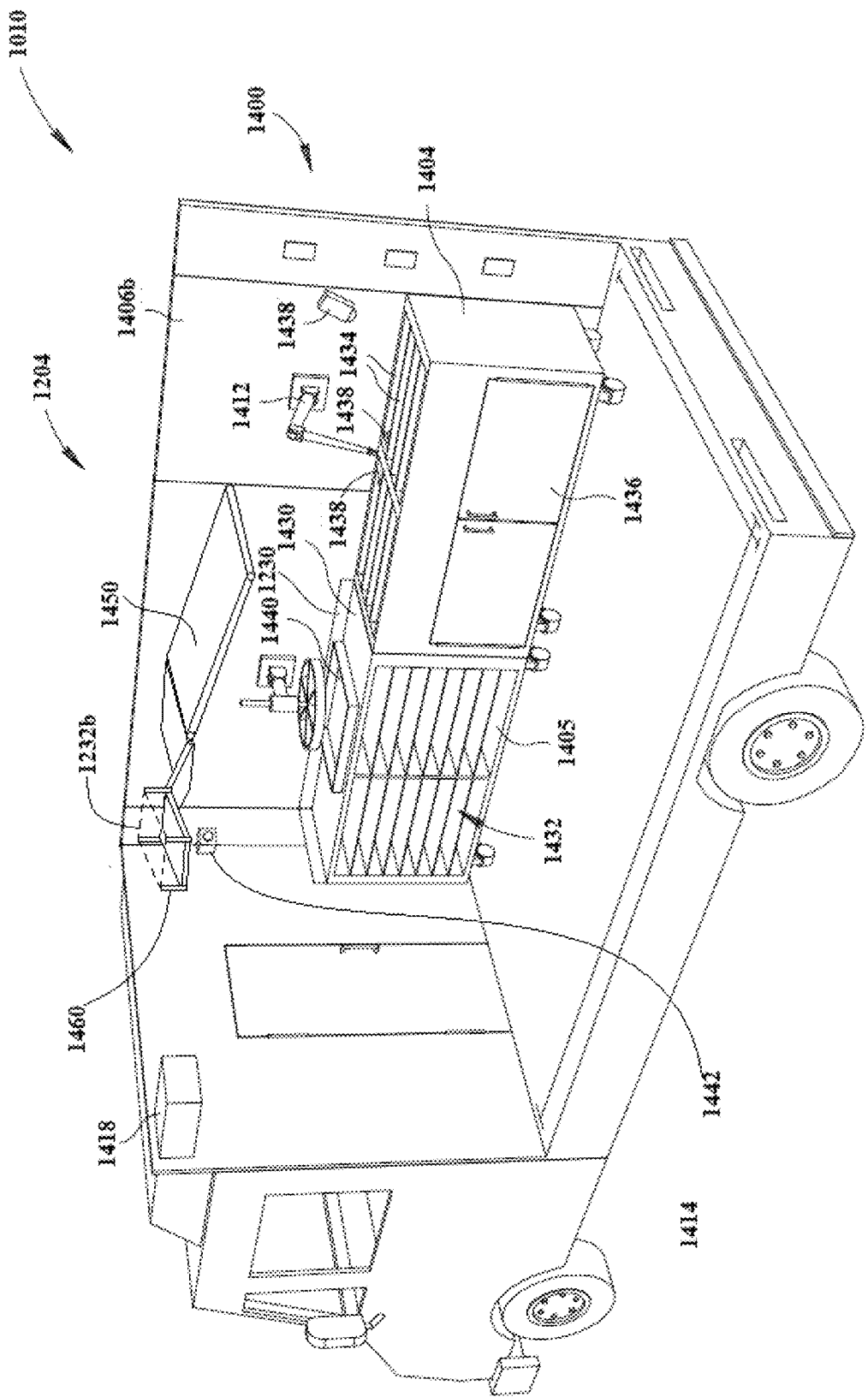
FIG. 13 is an isometric view of a portion of a cargo area of a land-based vehicle that may be used to prepare and, or distribute food, for example hot food, in which the left-hand interior side wall has been cut away, the cargo area to include a number of cooking and preparation components secured to the side walls, and a transfer robot to transfer food items between the various cooking and preparation components, according to at least one illustrated implementation.

FIG. 12 and FIG. 13 show different angled views of a cargo area 1400 of a vehicle 1010 into which food preparation and/or storage equipment and multiple robots have been loaded, according to at least one illustrated implementation. The food preparation and/or storage equipment include a rack 1402, a toppings holder 1404, and a food preparation/storage unit 1405. In some implementations, the rack 1402 may include multiple ovens 1408 as shown in FIG. 4A, although such disclosure should not be considered limiting. Other cooking components may be loaded and secured into the cargo area 1400. Such cooking components may include, for example, a fryer, a griddle, a sandwich or tortilla press, and other like cooking components. The cargo area 1400 may include one or more robots that perform food preparation functions within the cargo area 1400. The robots may include, for example, a transfer robot appendage 1410, a dispensing robot appendage 1412, and a cutter 1414. The cargo area 1400 of the vehicle 1010 may be modularly configurable such that any number and/or configuration of preparation and cooking equipment may be loaded and used within the cargo area 1400. As such, the vehicle 1010 may operate in any one of the constellation mode, the cook en route mode, and the pop-up kitchen mode.

The cargo area 1400 may include an on-board control system 1418 which may act as the control system 1070, for the land-based vehicle 1010, and for other land-based vehicles 1010, or which may communicate with an off-board control system 1070. The on-board control system may execute one or more applications or programs to facilitate the preparing and delivery of food items 204 by the vehicle 1010. The on-board control system 1418 may execute programs that enable the vehicle 1010 to communicatively couple with the off-board control system 1070. When communicatively coupled, the off-board control system 1070 may provide routing, delivery, and/or cooking instructions to the vehicle 1010 and/or the components in the vehicle 1010, as discussed in more detail below. The on-board control system 1418 may execute one or more programs that enable the vehicle 1010 to operate in a vehicle-centric mode in providing food items 204 to be delivered or provided to customers. For example, the on-board control system 1418 may execute a vehicle-centric order fulfillment system 1419, which may enable the vehicle 1010 to receive and process orders from customers.

In some implementations, such as when the on-board control system 1418 has lost communication with the off-board control system 1070, the on-board control system 1418 may execute one or more programs to enter a recovery mode at a time when the on-board control system 1418 regains a communication connection with the off-board control system 1070. The on-board control system 1418 may be communicatively coupled to the various food preparation and cooking equipment and robots located within the cargo area 1400, such as, for example, the rack 1402, the toppings holder 1404, the food preparation/storage unit 1405, the transfer robot appendage 1410, the dispensing robot appendage 1412, and the cutter 1414. In some implementations, such communication connections may be one or more of parallel cables or serial cables capable of high speed communications, for instance, via one or more of FireWire®, Universal Serial Bus® (USB), Thunderbolt®, Gigabit Ethernet®, a Canbus, a Modbus, or any other type of standard or proprietary communication linked interface using standard and/or proprietary protocols. In some implementations, the communication connections may include optical fiber. In some implementations, the communication connections may include a wireless transceiver that communicates wirelessly with the on-board control system 1418 via a short-range wireless communications protocol (e.g., Bluetooth®, Bluetooth® Low Energy, WIFI®, and NFC).

The rack 1402 may be securely attached to and spaced along an interior side wall 1406a and oriented such that the ovens 1408 may be accessible from the cargo area 1400. The rack 1402 and each oven 1408 within the rack 1402 may be communicatively coupled to the on-board control system 1418 via one or more communication ports and/or networks. The on-board control system 1418 may provide cooking commands that control the heating elements within each of the ovens 1408. Such cooking commands may be generated according to processor-executable instructions executed by one or some combination of the on-board control system 1418, the off-board control system 1070, or some other remote computer system.

The transfer robot appendage 1410 may be used to selectively transfer food items 204 into and out of the ovens 1408 via one or more arms 1420 and an end tool 1422. The transfer robot appendage 1410 may be communicatively coupled to the on-board control system 1418, which may provide instructions to control the movement of the transfer robot appendage 1410. The end tool 1422 may be linearly or rotationally moved with respect to the cargo area 1400 in response to signals received from the on-board control system 1418 to move food items 204 about the cargo area 1400. For example, the transfer robot appendage 1410 can move the end tool 1422 to transfer a food item 204, such as a par-baked pizza, into an interior compartment 1424 of the oven 1408 for baking. The transfer robot appendage 1410 can move the end tool 1422 to transfer a food item 204, such as a fully baked pizza, out of the interior compartment 1424 of the oven 1408. To facilitate movement about the cargo area, the transfer robot appendage 1410 may be supported by a transfer robot platform 1426 that is moveably coupled to and contained in a frame 1428 that extends from the cab portion 1202 of the vehicle 1010 towards the back end 1210.

The end tool 1422 can be used to transfer a food item 204 to a preparation surface 1430 on the food preparation/storage unit 1405. The food preparation/storage unit 1405 may be secured to the interior side wall 1406b. The preparation surface 1430 on the food preparation/storage unit 1405 may be a food-safe horizontal surface that is used to prepare the food item 204 to be served. In some implementations, the food preparation/storage unit 1405 may include a storage area 1432 that may be used to store additional food items 204 to be baked within the ovens 1408. As such, the delivery capacity of the vehicle 1010 may be increased beyond the number of ovens 408 that may be loaded into the cargo area 1400. The storage area 1432 may be refrigerated to prolong the freshness of the additional food items 204. The storage area 1432 may be sized and dimensioned to enable the end tool 1422 of the transfer robot appendage 1410 to retrieve the food items 204 contained within the storage area 1432. The on-board control system 1418 may provide one or more commands to retrieve a food item 204 from the storage area 1432 and/or to place the food item 204 into an appropriate oven 1408.

The preparation surface 1430 may be located proximate the toppings holder 1404, the dispensing robot appendage 1412, and the cutter 1414. The toppings holder 1404 may be secured to and located along the interior side wall 1406a. The toppings holder 1404 may include one or more repositories 1434 of toppings that may be placed onto the food item 204 to complete the preparation. The repositories 1434 may store food items 204, for example, that are not baked, but instead, are placed into, onto, or along the food item 204 after the baking process has been completed. In some implementations, the repositories 1434 may store non-food items that may be placed along a prepared food item 204 to complete an order. Such non-food items may include, for example, a set of plastic utensils, napkins, or a disposable cup. In some implementations, the toppings holder 1404 may include a storage area 1436 that may be used to store additional toppings or other items. The storage area 1436 may be refrigerated to prolong the freshness and shelf-life of the stored items.

In some implementations, the toppings holder 1404 may include one or more sensors 1438 that may be used to track the amount of each item (food or non-food) still contained within the respective repository 1434. Such sensors 1438 may include, for example, one or more of optical sensors, electrical contacts, load cells, imaging devices (e.g., video cameras), or other similar such sensors. When the amount of each item that is still contained within the respective repository 1434 crosses below a defined threshold, the appropriate sensor 1438 may transmit an alert signal to the on-board control system 1418. In response, the on-board control system 1418 may transmit an alert message to the operator of the vehicle 1010 and/or to the off-board control unit 1070 to provide notice that the threshold has been crossed. The off-board control unit 1070 may, in response, dispatch a supply truck with additional toppings to replenish the vehicle 1010. In some implementations, the off-board control unit 1070 may send a replacement vehicle 1010 to replace the existing vehicle 1010. In some implementations, the threshold may be adjusted based upon the current level and/or an expected level of demand for each of the food items 204. The expected level may be based upon historical data and machine learning algorithms based on order histories involving similar times, locations, and/or other information.

The toppings holder 1404 may be located below the dispensing robot appendage 1412. The dispensing robot appendage 1412 may be secured to and located along the interior side wall 1406b. The movements of the dispensing robot appendage 1412 may be controlled via signals received from the on-board control system 1418. The dispensing robot appendage 1412 can retrieve toppings from one or more repositories 1434 that hold toppings. As such, one dispensing robot appendage 1412 can retrieve and dispense more than one type of toppings. The dispensing robot appendage 1412 can have various end effectors or end of arm tools designed to retrieve various toppings. For example, some end effectors or end of arm tools can include opposable digits, while others take the form of a scoop or ladle, and still others a rake or fork having tines. In some instances, the end effector may include a suction tool that may be able to pick and place large items.

The cutter 1414 may be located above the preparation surface 1430. The cutter 1414 may be secured to and located along the interior side wall 1406b. The cutter 1414 may include a set of blades, an actuator (e.g., solenoid, electric motor, pneumatic piston), and a drive shaft that may be used to cut the food item 204, while the food item 204 sits on the preparation surface 1430. In some implementations, the food item 204 may be placed in a container or package 1440 before or after being cut by the cutter 1414. In some implementations, the dispensing robot appendage 1412 may place one or more non-food items (e.g., utensils or napkins) or other non-topping food items (e.g., mints or fortune cookies) into the package 1440 before the package 1440 is provided to the operator or a customer. In some implementation, the prepared, packaged food item 204 may be conveyed out of the food slot 1230 via a conveyor or an extendable shelf. In some implementations where the package 1440 containing the food item 204 is to be delivered by aerial drone 1180a to a delivery destination 1190, it may be put in a suitable container 800, as described below. In other implementations, the package 1440 may be a suitable container 800 for use in delivering the food item 204 to a delivery destination 1190.

Once the food item 204 is prepared and packaged, the package 1440 and/or container 800 may be provided to a payload dispenser for coupling to an aerial drone 1180a. For example, the package 1440 and/or container may be placed on a conveyor 1450 for transport to assist in coupling the package 1440 or container 800 to an aerial drone 1180a. The operator, or one of the robotic appendages 1410, 1412, or an additional robotic appendage, may assist in placing the package 1440 or container 800 on the conveyor 1450. In some implementations the conveyor may lead to an elevator 1460 which transports the package 1440 to a roof-based docking station or dock in order to couple same to the aerial drone 1180a. The robot appendages 1410, 1412, or additional robot appendages may also act as payload dispensers, and assist in coupling the package 1440 or container 800 to the aerial drone 1180a. In other implementations, the docking station(s), and/or dock(s) may be disposed within the inner compartment of the land-based vehicle, such that the aerial drone 1180a may enter the inner compartment of the land-based vehicle 1010 through an opening in the roof that provides access between the interior and exterior of the land-based vehicle 1010. In some implementations, where the aerial drones 1180a are carrying multiple containers 800 or may have multiple storage areas in their respective carriers, the end of the conveyor belt may be adjustable to properly locate couple each additional package 1440 or container 800 to the aerial drone 1180a.

In some implementations, the cargo area 1400 may include one or more cameras 1442 that may be oriented to capture images of the cargo area 400. Each of the cameras 1442 may have a field of view 1444 in which the camera 1442 may capture still or moving images. In some implementations, the field of view 1444 of each camera 1442 may encompass substantially the entire cargo area 1400. In some implementations, the cameras 1442 may be used to capture and provide live images. Such live images may be transmitted via the antenna 205 to a remote location, such as to the off-board control system 1070, so that the food preparation and delivery operations of the vehicle 1010 may be monitored. In some implementations, the live images from the cameras 1442 may be supplied to the display or monitors 228 located along the exterior side wall(s) 1208 of the vehicle 1010 and visible from the exterior of the vehicle.

Although discussed with respect to FIG. 12 and FIG. 13, the cargo area 1400 may be modularly laid out with various types and configurations of food preparation and/or cooking equipment. The configuration and types of food preparation and cooking equipment shown in FIG. 12 and FIG. 13 should not be considered limiting.

Figure 14:
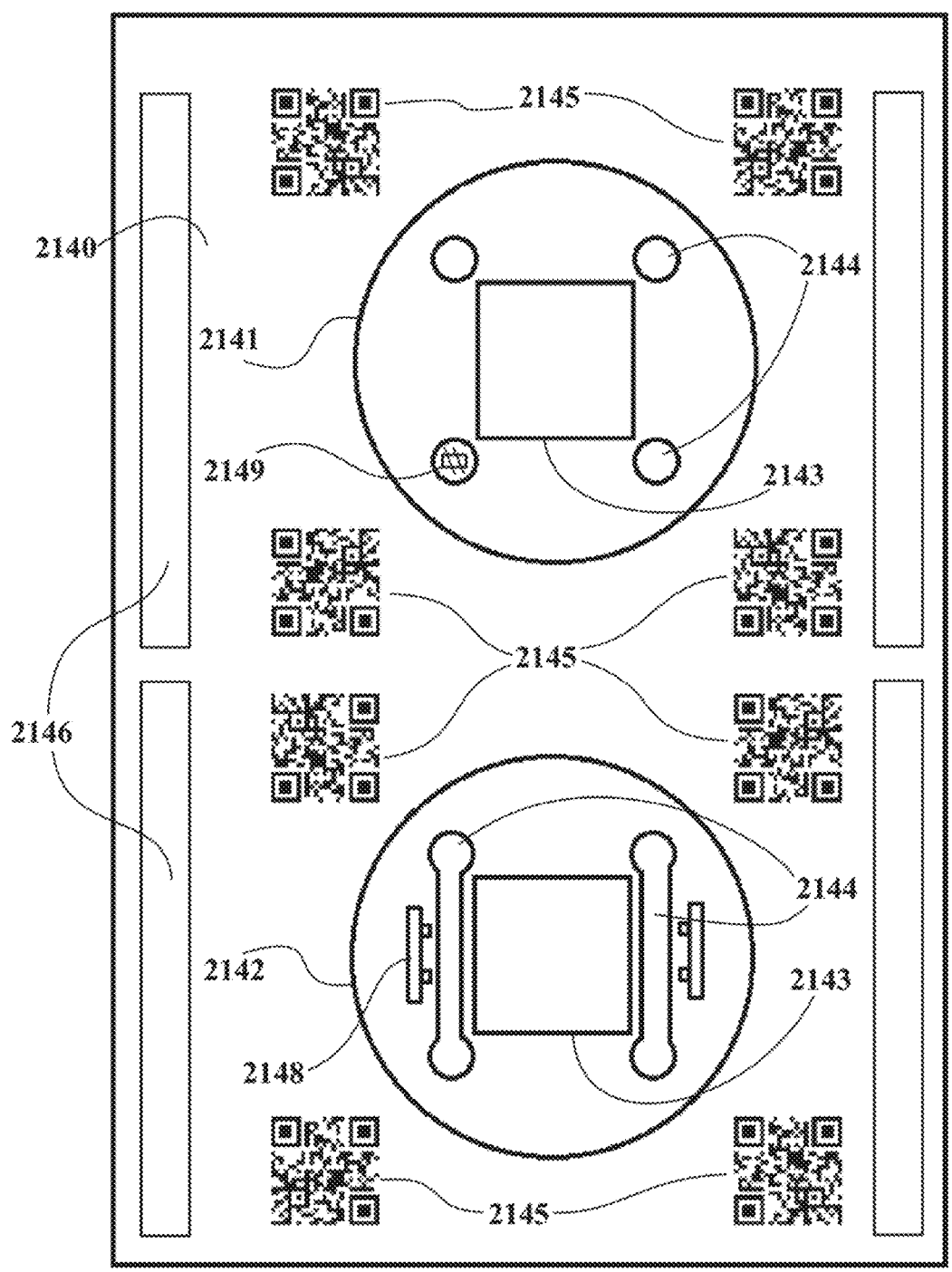
FIG. 14 is a top view of an implementation of a docking station having two docks for receiving and dispatching aerial drones.

FIG. 14 shows a top view of an implementation of a docking station 2140 for receiving and dispatching aerial drones 1180a. As shown in FIG. 14, in certain implementations the physical supply locations 206 and land-based vehicles 1010, including delivery vehicles 208 and/or transport vehicles 214 that receive and rendezvous with aerial drones 1180a may have one or more docking stations 2140. The docking station(s) 2140 may be located on the roof of the physical supply locations 206, land-based vehicles 1010 delivery vehicles 208 and/or transport vehicles 214. The docking station 2140 may be provided with one or more docks 2141, 2142, and covering structures 2146. The docks 2141, 2142 may comprise a door 2143 for an elevator 1460 and receiving structures 2144 which may receive and secure the landing gears of the aerial drones 1180*a*. The door 2143 may provide access to the internal chambers of physical supply locations 206, delivery vehicles 208 and/or transport vehicles 214 allowing ingredients 202 or food items 204 to be passed back and forth between the aerial drone 1180*a* and the physical supply locations 206, delivery vehicles 208 and/or transport vehicles 214. In some implementations, the entire docking station may be an elevator 1460 such that the aerial drone 1180*a* can be housed within the physical supply locations 206, delivery vehicles 208 and/or transport vehicles 214. Docks 2141, 2142 may be implemented to both receive deliveries from the aerial drone 1180*a*, and to provide food items 204 for pick up by the aerial drones 1180*a* to delivery locations 216. Alternatively, one dock 2141 may be implemented to only distribute food items 204 to unmanned vehicles 1180*a* for delivery, while another dock 2142 may be implemented to only receive delivered ingredients 202, food items 204 or empty containers from the aerial drones 1180*a*.

The receiving structures 2144 may simply be recesses in, or marked areas on, the surface of the dock 2141, 2142, or they may include physical restraints 2148, such as the walls or segments having projections, claws, grips or electro magnets shown in FIG. 29 through 35. For example, dock 2141 may be provided with circular, recessed receiving structures 2144 to receive the feet on the bottom of the legged landing structures 2093. Alternatively, landing structure 2142 may be provided with elongated receiving structures 2144 to receive the rails of railed landing structures 2093. Persons of skill in the art will recognize that the disclosed concepts may be implemented with receiving structures 2144 and/or physical restraints 2148 of any type and suitable design or structure known in the art or to be developed. Each docking station 2140 or dock 2141 may further be provided with markers 2145 to assist the aerial drone 1180*a* in identifying the docking station 2140 or dock 2141 and orienting itself relative to the docking station 2141 or dock 2142. FIG. 14 illustrates the markers as large QR codes that can be read by a camera or scanner sensors on an aerial drone 209, however any suitable marker known in the art or to be developed that can be read by an aerial drone 1180*a* may be used with the disclosed concepts, including but not limited to color, shapes, RFID, infrared, or Doppler sound. One or more of the receiving structures 2144 may further be provided with an induction coil 2149 to facilitate recharging. Alternatively, the receiving structures, or more generally, the dock, may be provided with an electrical interface that may electrically couple to a complementary interface on the aerial drone 209 to facilitate charging. Such an electrical interface may be positioned and oriented to make electrical contact with a complementary terminal of an aerial drone to recharge the aerial drone when docked to the first dock of the first docking station. The dock may be provided with a power pack dispenser, such as a robot appendage 1410, 1412 that may remove a depleted, or partially depleted power pack from an aerial drone 1180*a* and couple a replenished, fresh power pack to the aerial drone 1180*a*. Similarly, the power pack dispenser may provide replenished power packs to payloads and containers 800 and remove any depleted or partially depleted power packs that may be present in same. The power pack dispenser may then couple the depleted, or partially depleted, power pack to a power supply to recharge same. The covering structures 2146 may be dimensioned to cover only the dock 2141, 2142, or door(s) 2143, or may be dimensioned to cover all, or a portion of, the docking station 2140, and/or the aerial drone 1180*a*. The covering structures may further be retractable or rotatable. Persons of skill in the art will recognize that any suitable covering structure known in the art or to be developed may be used with the disclosed concepts. The docking station(s) may also include a refueling module that can provide other types of fuel to a drone such as liquid fuel (e.g., gasoline) or gaseous fuel (e.g., propane).

Figure 15:
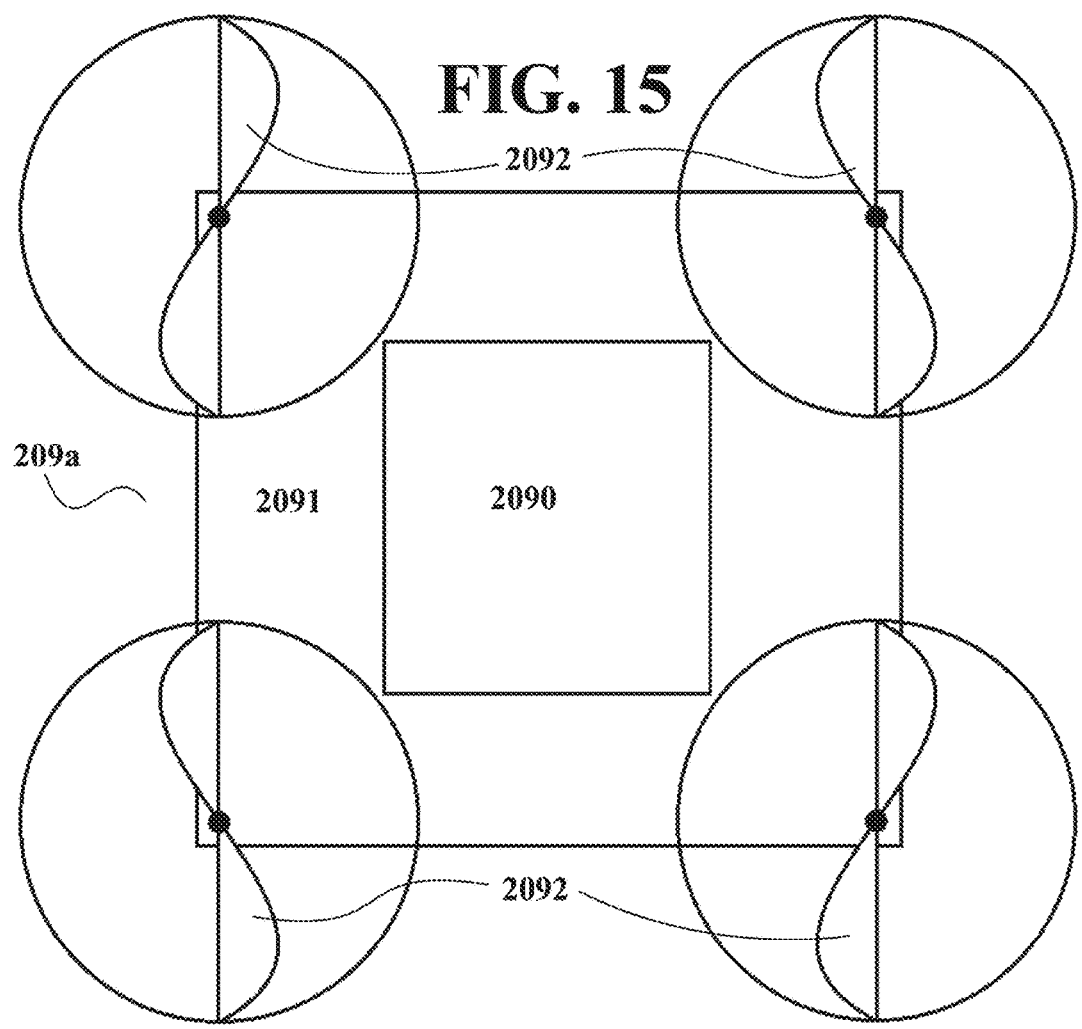
FIG. 15 is a top view of an implementation of an aerial drone.
Figure 16:
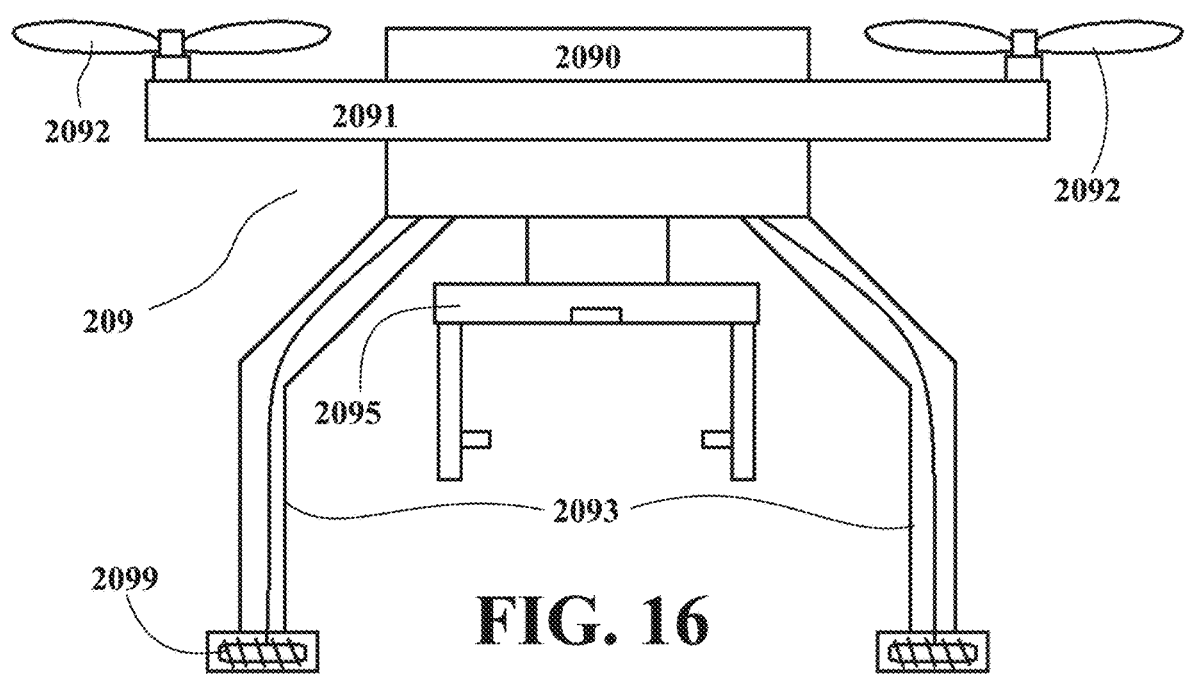
FIG. 16 is a side view of an implementation of an aerial drone.
Figure 17:
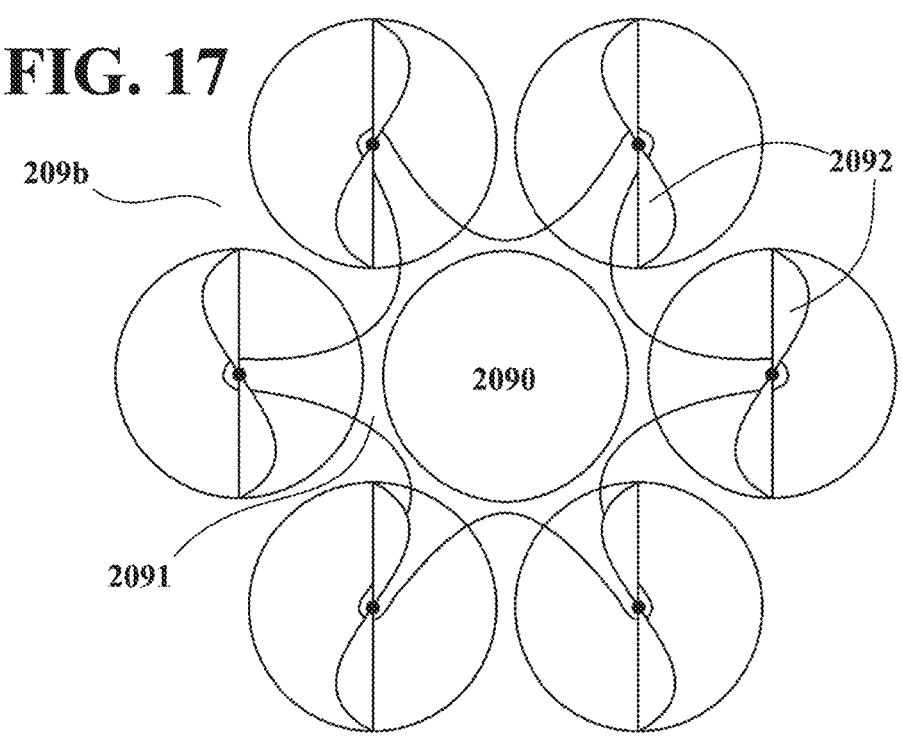
FIG. 17 is a top view of a second implementation of an aerial drone.
Figure 18:
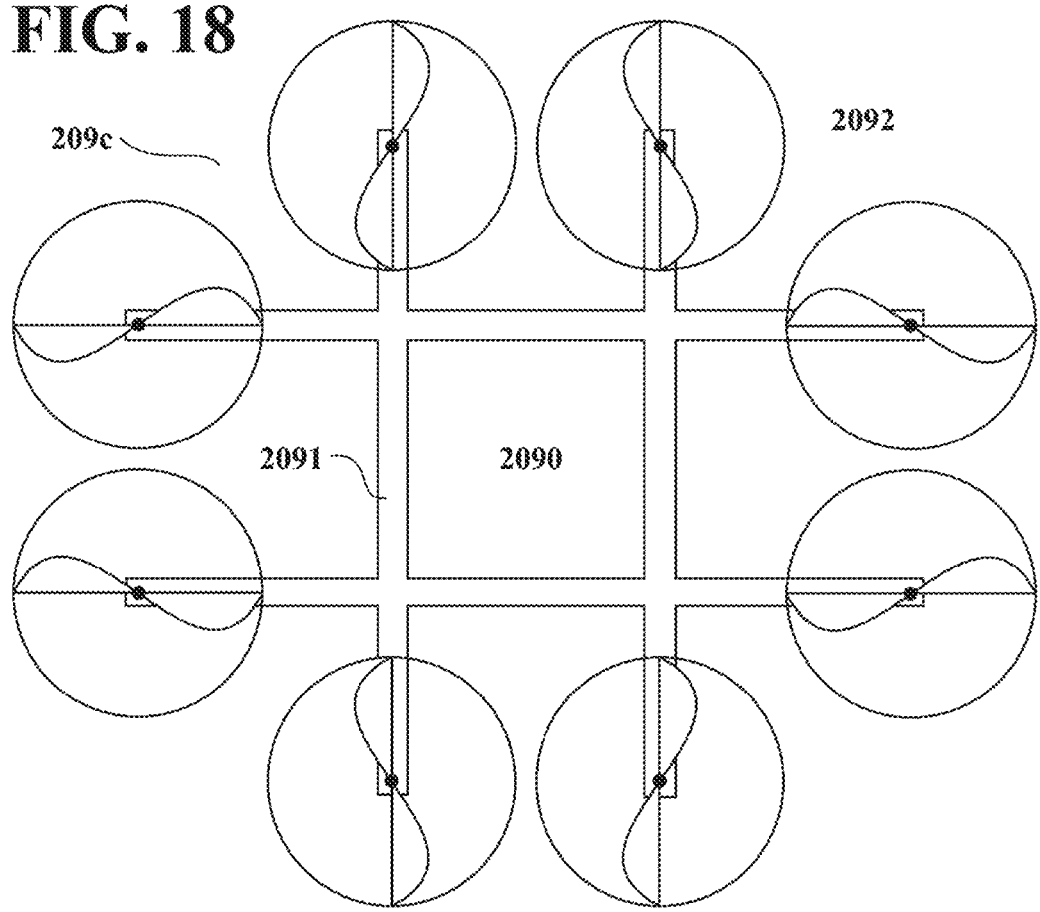
FIG. 18 is a top view of a third implementation of an aerial drone.

In certain implementations the aerial drones 1180*a* may be a multicopter 209*a*, 209*b*, 209*c*, or multirotor vehicle as shown in FIG. 15 through 18. FIG. 15 is a top view of an implementation of an aerial drone 209*a*, 1180*a*, 1180*b* that is a quadcopter 209*a*. FIG. 16 is a side view of the quadcopter 209*a* of FIG. 15. FIG. 17 is a top view of an implementation of an aerial drone 1180*a* that is a hexacopter 209*b*. FIG. 18 is a top view of an implementation of an aerial drone that is an octacopter 209*c*. The disclosed concepts may be practiced with a quadcopter 209*a*, as shown in FIGS. 15 and 16, a hexacopter 209*b*, as shown in FIG. 17, or an octacopter 209*c*, as shown in FIG. 18. Persons of skill in the art will recognize that the disclosed concepts can be implemented with an aerial drone 1180*a* having any suitable number of rotors or landing structures, and any suitable design. As noted above, the aerial drones 1180*a* used in implementations of this disclosure may be autonomous or remote controlled. The aerial drones 1180*a* may preferably have a main body 2090, a frame 2091, propellers 2092, landing structures 2093, and carrier 2095. The landing structures 2093 may include legs, feet, rails, wheels, or any other suitable structures known in the art or to be developed. The landing structures 2093 may further be rigid, or retractable to increase the aerodynamic profile of the aerial drone 1180*a* while it is in flight, or controllable, such as a robot arm, to allow the aerial drone 1180*a* to better adapt and adjust to the surface on which it is landing.

The aerial drone 1180*a* may be provided with an induction coil 2099 connected to its power supply 2096, to facilitate charging when it reaches a compatible dock 2140 having a corresponding induction coil 2149. For example, the landing structures 2093, such as the feet or landing rails of an aerial drone 1180*a* may house the induction coil 2099. In this manner when the aerial drone 1180*a* lands on such a dock 2141, such that its induction coil(s) 2099 is or are adjacent to the induction coil(s) 2149 of the dock, the coils 2099, 2149 can be activated until such time as the aerial drone's power supply 2096 is sufficiently charged.

Figure 19:
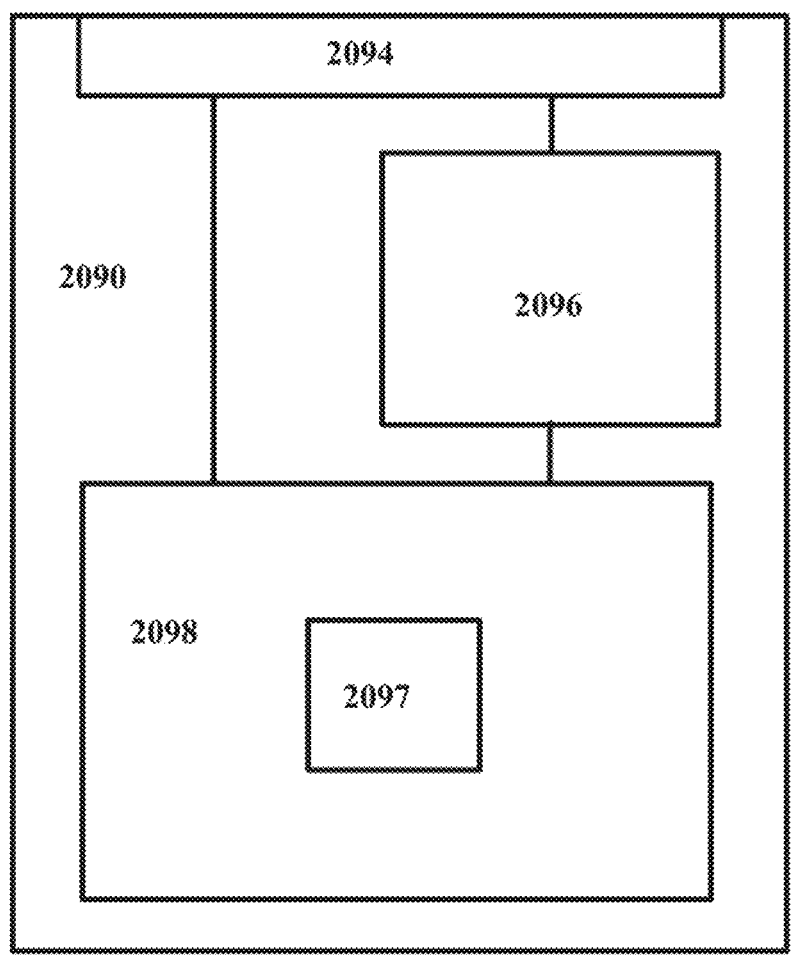
FIG. 19 is a schematic diagram of a body of an aerial drone.

FIG. 19 shows a schematic diagram of a body 2090 of an aerial drone 1180*a*. As shown in FIG. 19, the main body 2090 may comprise an aerial drone's sensors 2094, power supply 2096, processor 2097, and avionics 2098. The sensors 2094 may include GPS, cameras, RFID, distance sensors, radar, gyroscopes, accelerometers, and any other sensors known to a person of skill in the art or to be developed that are suitable for use in aerial drones 1180*a*. The sensors 2094 may be arranged internally within the main body 2090 or along any or all of the sides of the main body 2090. Any suitable power supply known in the art may be used with the disclosed concepts, including batteries and power packs. The power supply 2096 may be fixed to the aerial drone 1180*a* or may be detachably secured to same. A detachable power supply, such as a detachable power pack can facilitate recharging the aerial drone 1180*a* while it is docked with the land-based vehicle 108, 214, 1010, in that the depleted power pack can be removed from the aerial drone 1180*a* and charged on the land-based vehicle 1010, 208, 214, while a fully charged power pack is connected to the aerial drone 1180*a* so that it may immediately resume operation. Any suitable processor 2097 known in the art or to be developed may be included in the aerial drone 1180a. The avionics 2098 may include any electrical equipment necessary or useful to the aerial drone 1180a, such as communications equipment, navigation equipment, monitoring equipment, collision detection/avoidance systems, altimeters, ground sensing radar or proximity detectors, attitude indicators, autopilot, flight recorders, and any other suitable equipment known in the art or to be developed. The power supply 2096 may be connected to the processor 2097 and avionics 2098, as well as to any sensors 2094 that require power. Similarly, the sensors 2094 may be connected to the avionics 2098 and processor 2097 in order to provide information to same. The power supply 2096 may also be connected to the carrier 2095, the landing structures 2093, the propellers 2092, and to any other structure on the aerial drone 1180a that may require power. The body 2090 may be unitary or may be made of separate pieces. In implementations where the body 2090 is made of separate pieces, the pieces may be connected to one another, or may be separated by the frame 2091 or another structure. The body 2090 and the frame 2091 may be separate structures or may be integrated, and/or comprise a single piece. The carrier may form part of the body 2090 or frame 2091 or may be separate from and connected to either the body 2090 or the frame 2091 or some other intervening structure.

Figure 20:
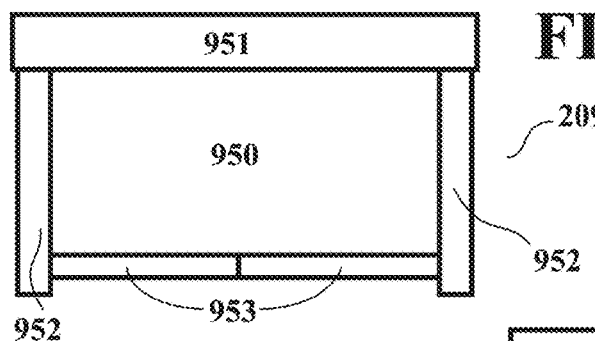
FIG. 20 is a side view of an implementation of a carrier with its floor of its storage area in a closed position.
Figure 21:
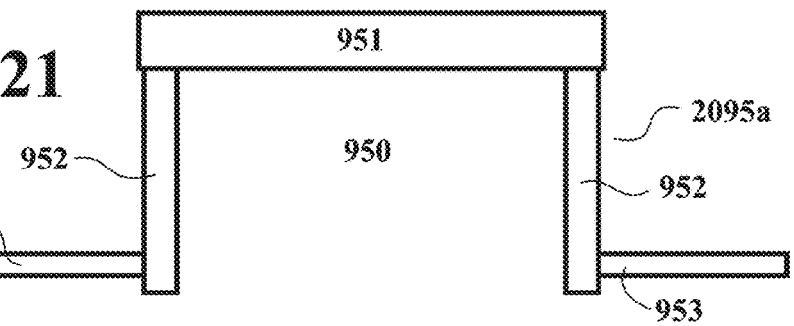
FIG. 21 is a side view of the carrier of FIG. 20 with it's the floor of its storage area in an open position.

FIG. 20 shows a side view of an implementation of a carrier 2095a with its floor of its storage area in a closed position. FIG. 21 shows a side view of the carrier 2095b of FIG. 20 with it's the floor of its storage area in an open position. Carrier 2095a may comprise food item storage space 950, where a food item 204, or a container housing an ingredient 202 or a food item 204 may be placed for delivery. Item storage space 950 may be defined by a top wall 951 from which two or more side walls 952 descend. In some implementations, sidewalls 952 may also serve as the landing structure 2093 for the aerial drone 1180a. Floor 953 may be provided in two sections such that each side wall carries half of the floor 953. When the unmanned aerial vehicle arrives at its destination, the floor may be opened by sliding it outwards, as shown in FIG. 21, allowing the ingredient 202, food item 204 or container housed in the storage space 950 to be dropped onto the surface beneath the floor 953. The carrier 2095a may be provided with climate control, such as a heating or cooling element, to maintain the desired temperature of the food item 204 or ingredient 202 located within same. Any suitable heating or cooling element known in the art or to be developed may be used with the disclosed concepts, including but not limited to wire coils or grids, heat lamps, refrigeration units or freezing, ice or ice packs. The borders of the storage space(s) may be provided with insulation or made from an insulating material to further maintain a desired temperature. In some implementations, as discussed in greater detail below, the environmental controls, such as heating or cooling elements, may be moved into the containers 800 for the ingredient 202 or food item 204, which may be electrically coupled to the power supply 2096 of the aerial drone 1180a via contacts in the carrier 2095a.

Figure 22:
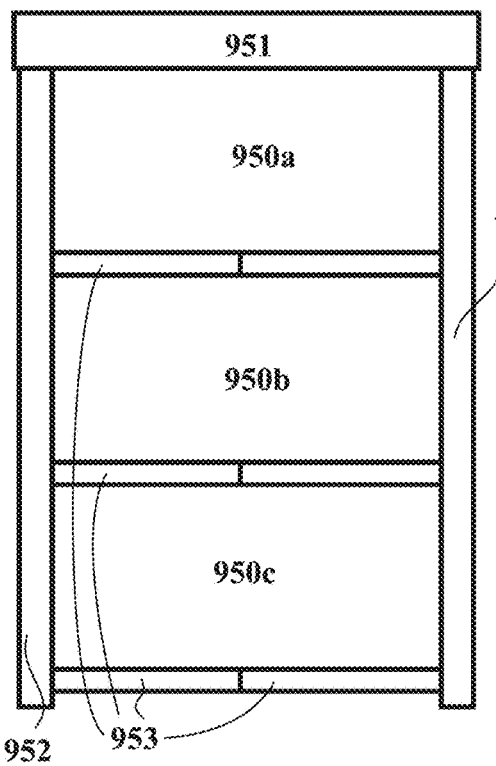
FIG. 22 is a side view of an implementation of a carrier having a plurality of storage areas with its floors all in a closed position.
Figure 23:
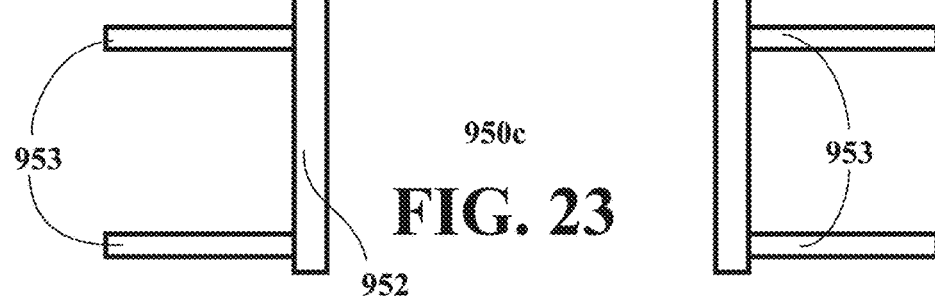
FIG. 23 is a side view of the carrier of FIG. 22 having with its top floor all in a closed position, and its remaining floors in an open position.

FIG. 22 shows a side view of an implementation of a carrier 2095b having a plurality of storage areas with its floors all in a closed position. FIG. 23 shows a side view of the carrier 2095b of FIG. 22 having with its top floor all in a closed position, and its remaining floors in an open position. FIGS. 22 and 23 illustrate an alternative, multi-tiered carrier 2095b, having three storage spaces 950a, 950b, 950c. Accordingly, when the first delivery is made by the aerial drone 1180a, the floor 953 of storage space 950c opens to allow the ingredient 202, food item 204 or container 800 to be deposited on the surface beneath the floor 953. Similarly, as shown in FIG. 23, when the second item is delivered, the floor beneath the storage space 950b may be opened, allowing the ingredient 202, food item 204 or container 800 to be deposited on the surface beneath the floor 953. Persons of skill in the art will recognize that the disclosed concepts may be practiced with any suitable number of tiers and storage spaces, as allowed by the capabilities and lifting capacity of the aerial drone 1180a.

Figure 24:
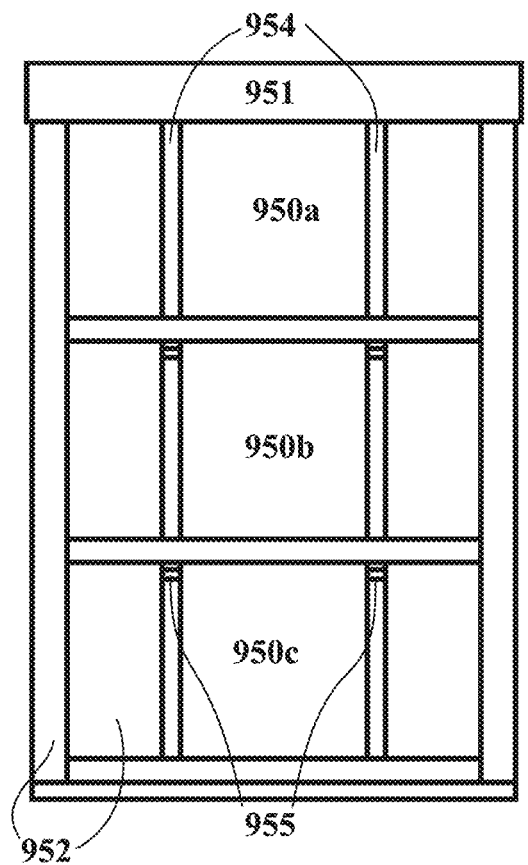
FIG. 24 is a side view of an implementation of a carrier having channels and catches in its side walls.
Figure 25:
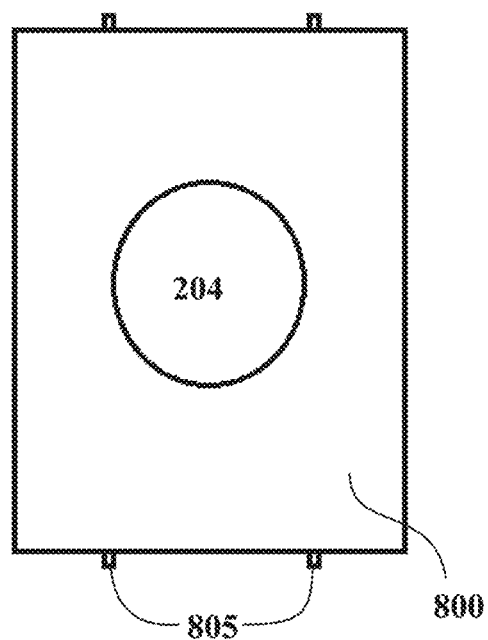
FIG. 25 is a top view of an implementation container having projections projecting out of its sides.

FIG. 24 shows a side view of an implementation of a carrier 2095b having channels and catches in its side walls. As illustrated in FIG. 19, to prevent the second and third delivery items from dropping a significant distance rapidly, slowing structures, may be provided within the carrier 2095b. For example, some side walls 952 may be provided with channels 954 and catches 955. Thus, when the floor of the middle storage space 950b is opened, the catches 955 catch the pins 805 or projections on container 800 and may be moved from a raised position to a lowered position in order to control the rate of descent to the bottom of the carrier 2095b. The catches 955 may be retractable or may rotate out of the way to allow the food item 204 to be removed once they reach the bottom of their respective section or of the carrier 2095. Similar catches 955 can be found underneath the floor of the top storage space 950a. FIG. 25 shows an implementation of a container 800 as a tray carrying food item 204, where the tray has pins 805, which can be positioned within channels 954 such that they are engaged and held by catches 955. In some implementation the pins 805 and catches 955 may be made from metal and also may serve as electrical contacts to provide power to environmental controls, such as heating and cooling elements inside container 805.

Figure 26:
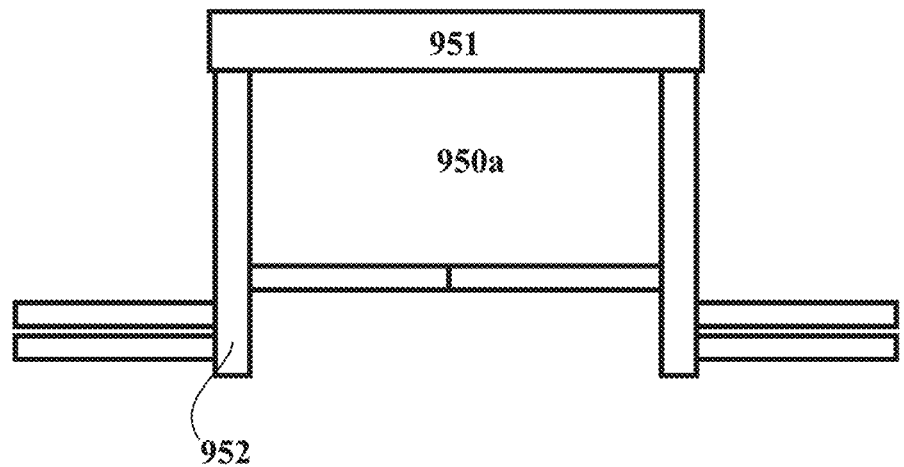
FIG. 26 is a side view of an implementation of a carrier having retractable side walls.

FIG. 26 is a side view of an implementation of a carrier 2095b having retractable side walls. As illustrated in FIG. 26, in an alternative implementation, the side walls 952 of the carrier 2095b may be retractable to limit the distance that the ingredient 202, food item 204 or container 800 may fall. Persons of skill in the art will recognize that any suitable slowing structures or designs for minimizing the distance the food is dropped that are known in the art or to be developed may be used with the disclosed concepts.

Figure 27:
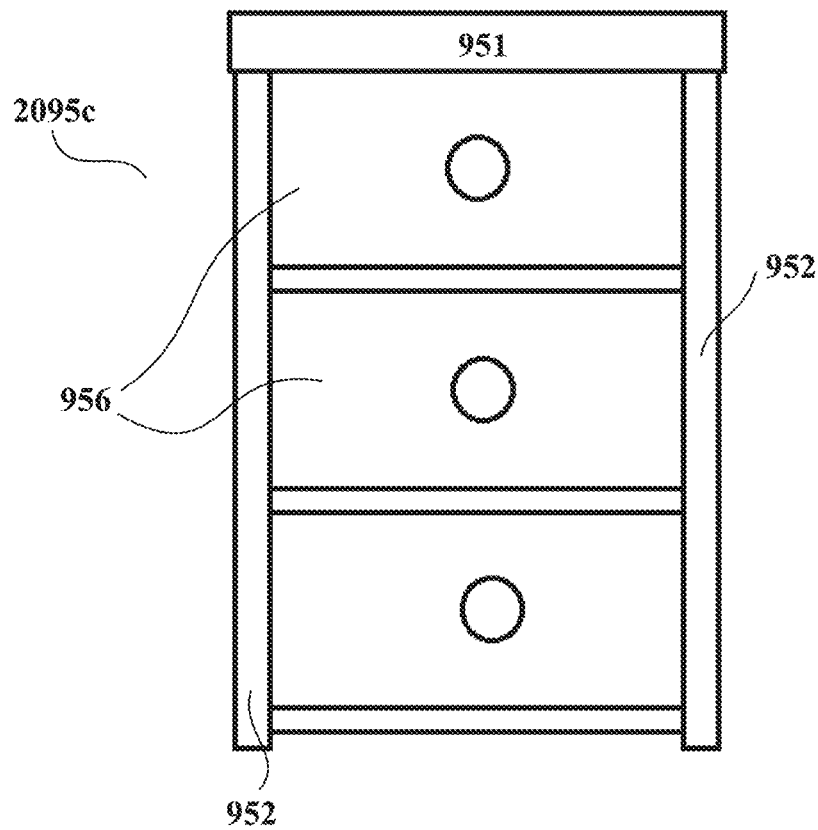
FIG. 27 is a frontal view of an implementation of a carrier having doors or drawers.
Figure 28:
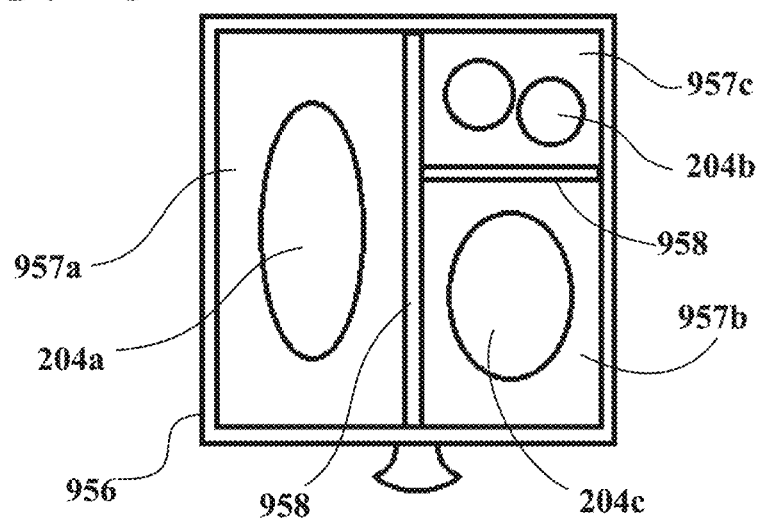
FIG. 28 is a top view of an implementation of a drawer for the carrier of FIG. 27.

FIG. 27 shows a frontal view of an implementation of a carrier 2095c having doors or drawers 956. FIG. 28 shows a top view of an implementation of a drawer 956 for the carrier of FIG. 27. As illustrated in FIG. 27, in some implementations, a multi-tiered carrier 2095c may be provided with doors/drawers 956 that a consumer may open in order to remove their purchased food item 204 from the storage space 950. As illustrated in FIG. 28, in implementations having drawers, the drawer may be partitioned into separately controllable-environmental storage chambers 957 having insulating walls 958 therebetween. Each chamber 957 may have environmental controls, such as a heating or cooling element, or both, such that it can maintain a desired temperature for that chamber 957 during delivery, while the aerial drone 1180a is in transit. For example, as illustrated in FIG. 28, drawer 956 may be provided with a large storage chamber 957a having a heating element and kept at a hot temperature, where hot food item 204a may be kept, a medium-sized storage chamber 957b kept at room temperature, where ambient temperature food item 204b may be kept, and a smaller cold chamber 957c having a cooling element (or containing ice) where cold food items 204c may be kept. In this manner, the preparing or cooking of the food item 204 can be continued while the aerial drone 1180a is in transit. The insulating walls 958 may be modular and detachable, such that a user could modify and create the necessary number and size of chambers in the drawer on a per-order basis when the food items 204 are prepared. The drawers 956 may be part of the carrier 2095c or may be separate containers 800 that can be removed from the carrier 2095c.

Figure 29:
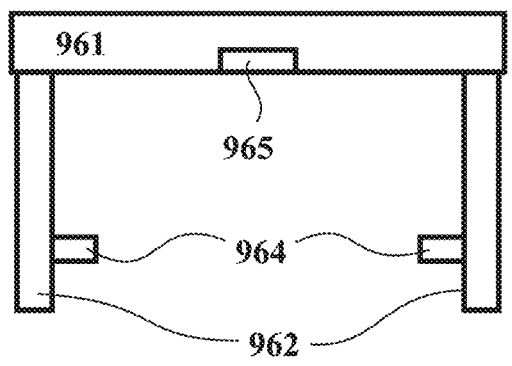
FIG. 29 is a side view of an implementation of a carrier having inward projections.
Figure 30:
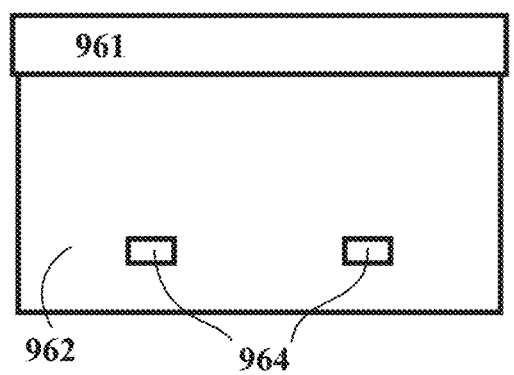
FIG. 30 is a cross-sectional side view of an implementation of a carrier in accordance with FIG. 29.
Figure 31:
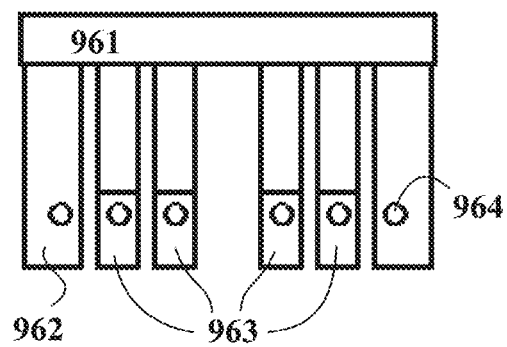
FIG. 31 is a cross-sectional side view of an implementation of a carrier having multiple side wall segments in accordance with FIG. 29.
Figure 32:
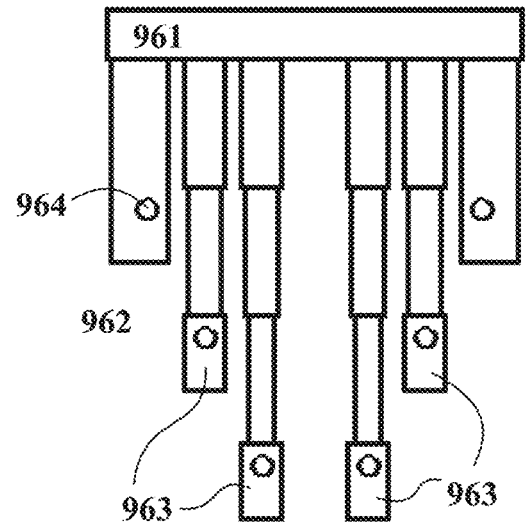
FIG. 32 is a cross-sectional side view of an implementation of a carrier having multiple side wall segments with segments extended to different levels in accordance with FIG. 31.

In some implementations, the carrier 2095 may be provided with securing elements that can engage complementary securing elements in a container 800 in order to secure the container 800 to the carrier 2095. Any securing structure known in the art or to be developed may be used with the disclosed concepts. FIG. 29 shows a side view of an implementation of a carrier 2095d having inward projections. FIG. 30 shows a cross-sectional side view of an implementation of a carrier 2095d in accordance with FIG. 29. FIG. 31 is a cross-sectional side view of an implementation of a carrier 2095e having multiple side wall segments 963 in accordance with FIG. 29. FIG. 32 is a cross-sectional side view of an implementation of a carrier 2095e having multiple side wall segments 963 with segments extended to different levels in accordance with FIG. 31. FIG. 29 through 32 illustrate alternative implementations of carriers 2095d and 2095e. These carriers 2095d, 2095e may have a top wall 961 from which two or more side walls 962 may descend. The side walls 962 may be provided with projections 964 which may engage holes or recesses 808 in the containers 800 carried by the carriers 2095. As shown in FIG. 29, each projection 964 may be paired with a corresponding projection 964 on the opposing side wall 962 to grip and secure container 800 from opposing sides. To increase balance, the projections 964 may also be paired symmetrically across a plane transverse vertically to the center of the side wall 962, as shown in FIG. 30 through 32. Alternatively, larger projections that extend across the plane that is transverse vertically through the center of the side walls can also be used to achieve similar results. The projections 964 may be extensible and retractable from side wall 962 to engage and release container 800. Alternatively, the side walls 962 may be movable towards each other such that the container can be positioned and aligned within the space between the side walls 962, and the side walls 962 can then be moved inwardly to secure the container 800. Persons of skill in the art will recognize that the projection/recess relationship between the side walls 962 and the container 800 can be flipped such that the holes or recesses are disposed in the side walls, and the projections are disposed in the containers. Furthermore, any suitable method of gripping a container 800 by a carrier known in the art or to be developed may be used with the disclosed concepts. Persons of skill in the art will recognize that the projections and recesses in the side walls and the container may have any suitable shape and size, including but not limited to rectangular, cylindrical, and any other complementary shape desired. One or both of the projections and recesses or holes may further be chamfered in order to facilitate insertion of the projections into the recesses or holes.

Carriers 2095d and 2095e may also be provided with a container interface 965 which may electrically connect the carrier (and therefore the aerial drone's 1180a power supply 2096) to the container, either directly or through an induction connection. This connection may be used such that the aerial drone 1180a serves as a power supply to the containers 800 to power any heating elements, cooling elements, or electronics that they may contain. Alternatively, this may allow the containers to provide power back to the aerial drone so that when the aerial drone picks up a new set of containers for delivery, where some or all of the containers are provided with their own power supply, the aerial drone's 1180a power supply 2096 may be recharged while the aerial drone 1180a is traveling to its delivery destination. Similarly, the interface 965 may be used to allow the aerial drone's 1180a communications systems to communicate with the container 800. For example, where the aerial drone 1180a receives updated transport instructions 422 requiring an undelivered container 800 to turn on or off or change the intensity value for a heating element in that undelivered container 800, that instruction may be passed along through interface 965. In this manner the preparation and/or cooking of the food item 204 can continue while the food item 204 is transit in the aerial drone 1180a. Alternatively, the aerial drone 1180a and container 800 may be provided with a suitable physical connection or coupling with wireless communication equipment to obviate the need to communicate through the interface 965.

As shown in FIGS. 31 and 32, in order for the carrier 2095e to carry more than one container 800, multiple paired sets of projections 964 may be disposed in a side wall 962 that is segmented. The implementation shown in these figures has three sets of paired projections 964 that are paired across the plane that vertically bisects the side wall 962, and these may also be paired with a corresponding projection in the opposing side wall 962. As shown in FIG. 32, some or all of the segments 963 may be extensible and retractable such they can be extended to carry additional containers disposed beneath the containers held by the adjacent set of projections 964, and they can be retracted once their respective container 800 has been dropped off, and either assist in securing the container 800 above them, and not be in the way when the delivery is in progress obviating the need to drop the container 800 being delivered any distance.

Figure 33:
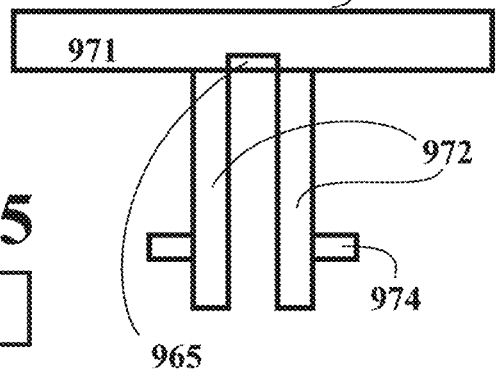
FIG. 33 is a side view of an implementation of a carrier having outward projections.

FIG. 33 shows a side view of an implementation of a carrier 2095f having outward projections. FIG. 33 illustrates an alternative implementation of the carrier 2095s that is similar to the carriers shown in FIG. 29 through 32, having sidewalls 972 that descend from top wall 971, except that sidewalls 972 and projections 974 move or extend outwardly instead of inwardly to secure container 800.

Figure 34:
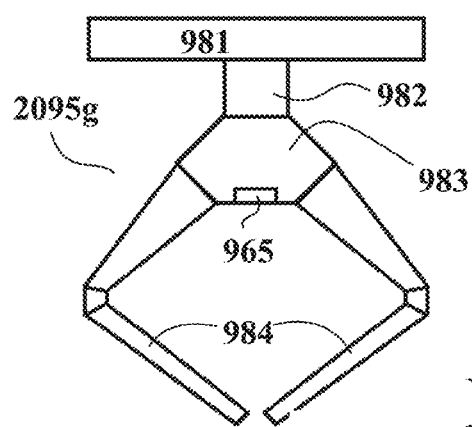
FIG. 34 is a side view of an implementation of a carrier having a claw.

FIG. 34 shows a side view of an implementation of a carrier 2095g having a claw. FIG. 34 illustrates an alternative implementation of a carrier having a top wall 981 from which an arm 982 extends, and a claw 983 having two or more fingers 984 may be disposed on the end of the arm. The arm may be a simple rigid cylindrical arm, as illustrated in FIG. 29, or may be a robotic arm that may be retractable and extensible and may have joints, and/or several degrees of freedom of movement. Any type of robotic or mechanical arm known in the arts or to be developed may be used with the disclosed concepts. As shown in FIG. 34, some of the fingers 984 may be opposable, and they may be oriented adjacent and parallel to one another, or extending radially from the center of the claw. Any suitable number an orientation of fingers may be used with the disclosed concepts.

Figure 35:
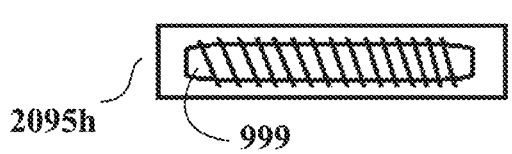
FIG. 35 is a schematic diagram of an implementation of a carrier with an electromagnet.

FIG. 35 illustrates a carrier 2095h comprising an electro magnet 999 that can be activated or deactivated to pick up or release a container. A winch having a rope or wire with a hook or other tether for securing a container 800 at the free end may also be used as a carrier. Persons of skill in the art will recognize that these exemplary implementations are illustrative, and not limiting and that any suitable carrier known in the art or to be developed may be used with the disclosed concepts.

Figure 36:
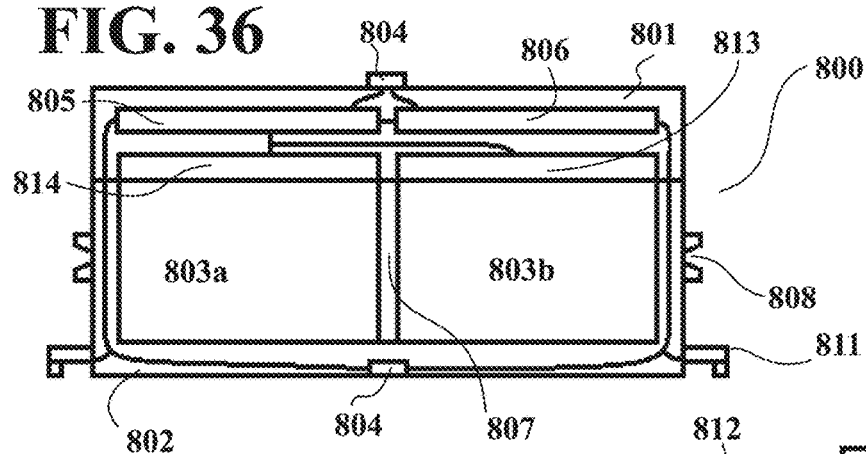
FIG. 36 is a cross-sectional view of an implementation of a container.
Figure 37:
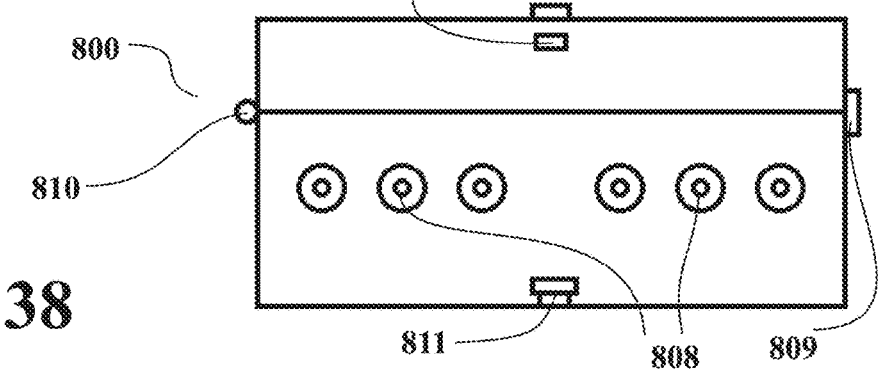
FIG. 37 is a side view of an implementation of the container of FIG. 36.
Figure 38:
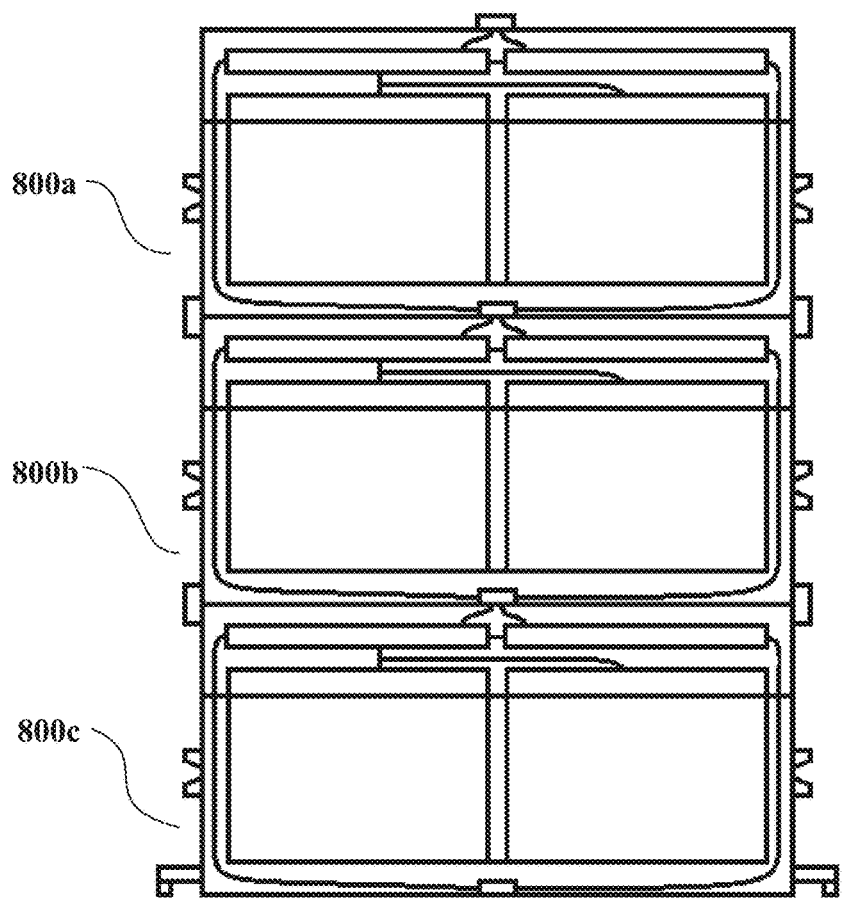
FIG. 38 is a cross sectional view of multiple containers in accordance with FIG. 36 stacked together.

Persons of skill in the art will recognize that any suitable container that can be carried by carrier 2095 may be used with the disclosed concepts, and that the words payload and container are used herein interchangeably. As discussed above, container 800 may be a tray (see FIG. 25), a removable drawer 956 (see FIG. 28), or something as simple as a cardboard box. FIG. 36 through 38 illustrate an implementation of a modular container 800 that may be used with the disclosed concepts. Container 800 may be a wheeled delivery vehicle, or a wheeled trolley, or other similar vehicles.

FIG. 36 shows a cross-sectional view of an implementation of container 800. FIG. 37 shows a side view of an implementation of the container 800. FIG. 38 shows a cross sectional view of multiple containers 800*a*, 800*b*, 800*c* stacked together. Container 800 may include a top portion 801 or lid, and a bottom portion 802.

The top portion may optionally include an interface 804, power supply 806, electronics 805, and one or more heating elements 813 or cooling elements 814. Alternatively, some or all of these items can be placed into lower portion 802. Top portion 801 and bottom portion 802 define one or more storage areas 803 in which ingredients 202 or food items 204 may be placed. The storage areas 803 may be separated by an insulating wall 807 such that each storage area 803*a*, 803*b* may be separately environmentally controlled. As discussed above with respect to drawer 956, these insulating walls 807, 957 may be modular and removable such that any desired number, size and shape of storage areas 803 may be used. A hinge 810 may connect the top portion 801 and the bottom portion 802 on one side of container 800. A mechanical or electrical latch 809 may be provided on an opposing side of the container 800. In some implementations, other securing structures, such as clips, clamps, zippers, or any other suitable securing structure known in the art or to be developed may be used to secure the top portion 801 to the bottom portion 802. As discussed above, recesses 808 may be provided along the outer side wall of container 800. The recesses 808 may be disposed on outer projections on the side walls of container 800, as shown in FIGS. 36 and 38, or may be embedded in the side wall of the container 800. The sides of recess 808 may be chamfered to guide projections 964 to their proper seating. To reinforce the connection between adjacent containers 800*a*, 800*b*, 800*c*, each container 800 may be provided with a pair of grips 811 that can be rotated into place to engage a corresponding recess 812 in the adjacent container. In some implementations, rips may be vertically slid into place, or may comprise electromagnets that can be activated and deactivated to secure or release adjacent containers 800*a*, 800*b*, 800*c*. Any suitable grip or securing structure known in the art or to be developed may be used with the disclosed concepts. In some implementations multiple grips can be placed along the side wall of container 800 and paired with corresponding grips extending from the opposite side wall of container 800. In some implementations the use of grips may obviate the need to use a multi-tiered carrier, as adjacent containers can simply hold on to one another, and the instructions to engage or release an adjacent container 800*a*, 800*b*, 800*c* may be transmitted between the carrier and the various containers 800 by direct communication through the respective interfaces 965, 804, or by wireless communication. As discussed above the power supply 806 may be a battery, or a power pack, and may be permanently affixed to the container 800 or detachably secured to same.

As discussed above with respect to the interface 965 in the carrier, the top portion of container 800 may be provided with a complementary interface 804 that can engage carrier interface 965. In this manner the carrier (and by extension the aerial drone 1180*a*) and the container 800 can transmit and exchange signals and/or power. This may include instructions for managing the heating element 813 and cooling element 814 in containers, in order to continue preparing or cooking the food item 204 while the food item 204 is in the container 800. The bottom portion 802 of container 800 may also be provided with an interface 804. This allows adjacent containers 800*a*, 800*b*, 800*c*, to interface with each other, and communicate via their respective interfaces 804 and electronics 805.

In some implementations, the top portion 801 may be completely detachable from the lower portion 802, such that a consumer may detach the lower portion 802 containing the food item 204 and leave the top portion 801 containing the power supply and environmental controls attached to the aerial drone 1180*a*.

In some implementations, container 800 may be provided with sensors 2094, 1236, such as cameras, thermometers, or any other suitable sensors to take readings of the food item 204 at the time of delivery, such as temperature and an image of the food item 204. The images may be stored by the unmanned aerial drone 209 or may be transmitted bac to a computer system in order to evaluate whether the food item 204 has been delivered in an ideal or acceptable condition, or if there is evidence that delivery has damaged or otherwise affected the condition of the food item.

Figure 39:
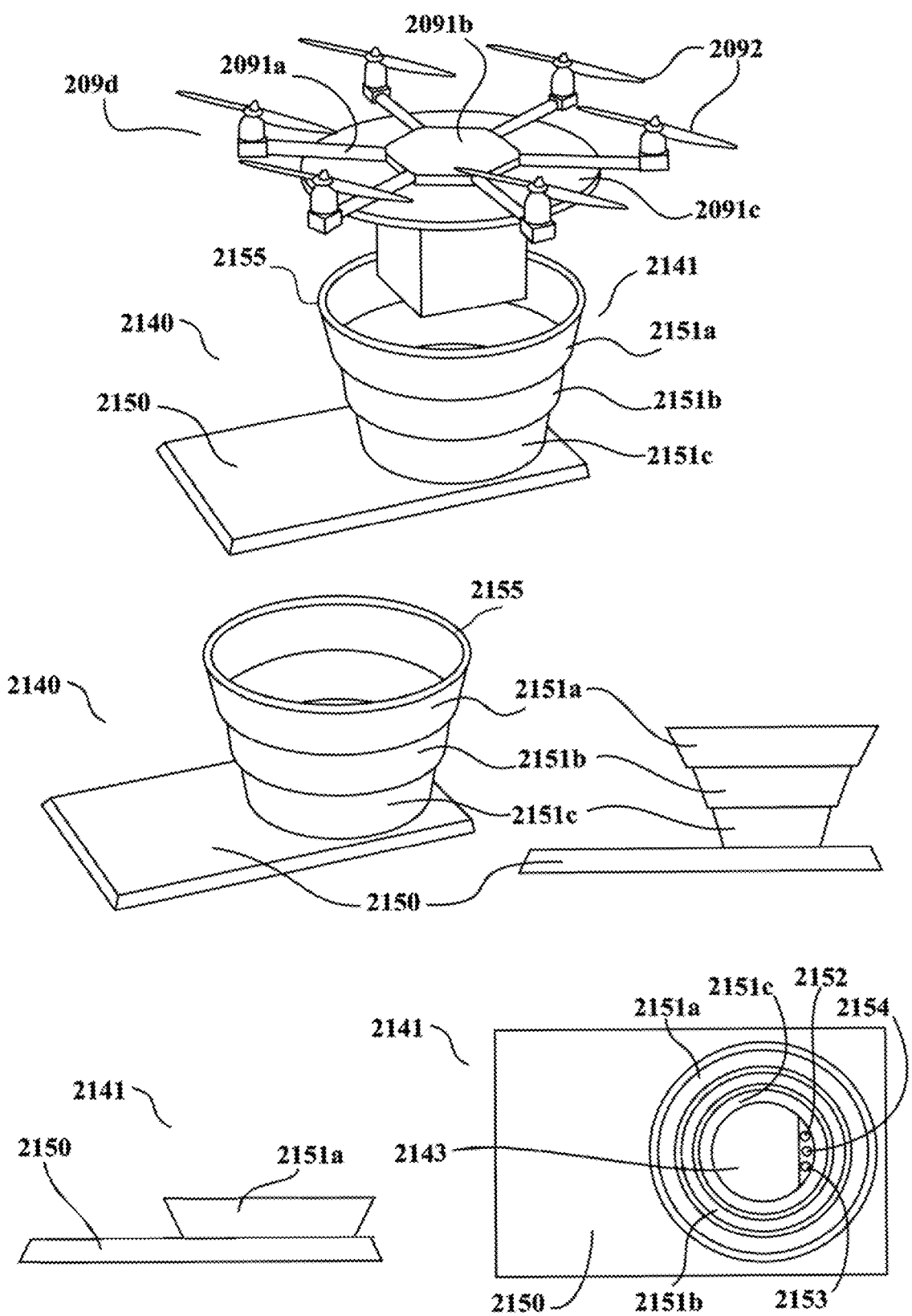
FIG. 39 illustrates an implementation of an aerial drone interacting with an implementation of a docking station and various views of the docking station.

FIG. 39 illustrates an implementation of an aerial drone 209*d*, interacting with an implementation of a docking station 2140 and various views of the docking station 2140. Aerial drone 209*d* may be a hexacopter having six propellers 2092, as shown, or may be any other suitable aerial drone. The aerial drone 209*d* may include a frame 2091. The frame may include a hub 2091*a*, spokes 2091*b*, and a dock interface 2091*c*. As discussed above, portions of the frame 2091, including the dock interface 2091*c* and the hub 2091*b* may be part of the main body 2090 as well. Alternatively, the dock interface 2091*c* may be part of the main body 2090 of the aerial drone 209*d*.

The docking station 2140 may include a base 2150, and one or more docks 2141. The base 2150 may be integrated with a vehicle door or rooftop, or may be secured to same by bolts, or any other suitable connection. The dock may include an inverted skirt 2151 which may have a generally frustoconical shape. The skirt may include a plurality of sections 2151*a*, *b*, *c*. The sections may be collapsible, telescoping, and/or movable between different heights relative to the roof of the vehicle and/or the base of the docking station. For example, the skirt 2151 may be extended to one height while a delivery or transit vehicle is parked and interacting with aerial drones 209 to send or receive deliveries. Once the deliveries have been completed, the skirt 2151 may be collapsed, retracted, or otherwise moved to a second height in order to decrease the operating height of the vehicle to within legal (or desired) limits. Various perspective, side, and top views of the docking station 2140 with the dock 2141 in extended or collapsed positions are also shown in the figure.

The skirt 2151 may be made of any suitable material, including plastic and metal, and may be adjustable in height, width and shape to accommodate various types of aerial drones 209*d*. The bottom of the skirt may be provided with a door 2143 which may provide access to the interior of the vehicle directly or via an elevator 1460. The door 2143 may be a sliding door or a hinged door depending on the implementation. Covering structures 2146 may be provided for the skirt 2151 to keep the skirt 2151 covered while the aerial drone 209*d* is not attached to same. A drain 2154 may be provided to remove any rain and small debris that may be captured by the skirt during operation in inclement weather. Drain 2154 may be connected to a gutter such that rain and other debris that are captured by skirt 2151 while the aerial drone 209*d* is docking in the dock 2141. In some examples, the skirt may include one or more environmental protection elements and/or physical restraints as described herein. The environmental protection elements and/or physical restraints may be activated based on whether the vehicle is parked, a weather condition at the delivery destination, and/or a payload type, for example.

As with the other docks described above, the skirt 2151 may further include induction coils 2149 or electrical coupling interfaces to allow recharging of the aerial drone 209*d* while it is secured to the dock 2141. In some implementations, the aerial drone may pick up and deposit containers 800 within the dock 2141 without landing or securing itself to the dock and may only land and secure itself to the dock when it needs to recharge.

As discussed above, the aerial drone 209*d* and the dock 2141 may be provided with receiving structures 2144 and/or physical restraints 2148 to couple to one another. Additionally, the top rim, or perimeter 2155 of the skirt 2151 may have a shape that is complementary to shape of the shape of the dock interface 2091*c* of the aerial drone 209*d* to facilitate coupling. The corresponding complementary shapes may further contact one another along an entire inner periphery of the perimeter 2155, to effectively close off the inner chamber of the from the external environment at the location of the vehicle. For example, the portion of the dock interface 2091*c* that is shaped similar to the perimeter of the skirt may contact the entire inner periphery of the skirt when the aerial drone 209*d* is docked to the skirt. In some implementations, one or both of the dock interface 2091*c* and the top rim 2155 of the skirt may be provided with O-rings and/or other seal forming materials in order to form an air-tight seal with between them. Similar sealing materials may be part of or mate with door 2143 and or covering structures 2146. Forming and breaking the airtight seal may be facilitated by air intake 2152 and air outlet 2153. In this manner the skirt 2151 together with the dock interface 2091*c* may act as a.

In some implementations, the docking station may include a. The may be formed, in part by skirt 2151, and may include a transfer chamber (which may be or include the interior delineated by the skirt) where containers or power packs may be coupled to, or removed from, aerial drones that couple with the dock 2141. The transfer chamber may have a first (or interior) opening between the chamber and an interior environment or chamber of the land-based vehicle, and a second (or exterior) opening between the chamber an external environment that is external to the land-based vehicle and the. In some implementations, the acts to minimize exposure of the internal environment to the external environment, limiting the entry of debris and/or air from the external environment into the internal environment. In some implementations, the may act as an airlock, preventing such a transfer. The may further include an interior door 2143 that may be operable to open and close the first opening between the chamber the interior environment of the land-based vehicle. In some implementations, the second opening of the may be embodied on the perimeter or top rim 2155 of the skirt. In such implementations, the coupling of an aerial drone 209*d* having a docking interface 2091*c* may serve to close the second opening of the. In other implementations, the second opening of the may be closed by an exterior door, such as covering structures 2146.

In some implementations, once the vehicle has connected, the air within the skirt chamber may be vacuumed via the outlet 2153, or otherwise driven out, such as by flushing the chamber with $CO_2$. Clean or filtered air may then be injected into the chamber via the inlet 2152. The door 2143 may then be opened, and the delivery package 800 may be transitioned to or from the interior chamber of the vehicle. In this manner the environment of the interior chamber of the vehicle where food is prepared can be maintained. Persons of skill in the art will recognize that the disclosed concepts can be implemented by a single opening to the chamber which can act as both the inlet and the outlet, or by positioning the inlet and/or outlet at any suitable location on the skirt or docking station 2140. Similarly, the drain 2154 and the outlet 2153 may be combined. In other embodiments, the entirety of the docking station 2140 may be a provided with sealing capabilities the entire aerial drone 209 can be taken into the interior chamber. In such implementations, the covering structures 2146 may form a seal, and may act as the outer door of the, while the door 2143 may act as the inner door of the.

Certain specific details are set forth herein in order to provide a thorough understanding of various disclosed embodiments. However, one skilled in the relevant art will recognize that embodiments may be practiced without one or more of these specific details, or with other methods, components, materials, etc. In other instances, certain structures associated with aerial or ground based drone delivery of food products from en route preparation and delivery vehicles such as portioning equipment, packaging equipment, and other similar devices, closed-loop controllers used to control processing conditions and techniques, wired and wireless communications protocols, wired and wireless transceivers, radios, communications ports, geolocation, and optimized route mapping algorithms have not been shown or described in detail to avoid unnecessarily obscuring descriptions of the embodiments. In other instances, certain structures associated with conveyors, robots, and/or vehicles have not been shown or described in detail to avoid unnecessarily obscuring descriptions of the embodiments.

As used herein the term "travel information" refers to delivery destination locations, one or more potential routes between the delivery destinations, road condition information (road curvatures, road tilt, expected vehicle tilt, construction, road roughness, etc.) for the potential routes, traffic condition information for the potential routes, weather condition information (temperature, humidity, altitude, winds, wave size, etc.) for the potential routes, licensing information, and any other conditions that may affect travel of the vehicle equipped to transport regulated consumables.

As used herein the terms "robot" or "robotic" refer to any device, system, or combination of systems and devices that includes at least one appendage, typically with an end of arm tool or end effector, where the at least one appendage is selectively moveable to perform work or an operation useful in the preparation a regulated consumable or packaging of a regulated consumable. The robot may be autonomously controlled, for instance based at least in part on information from one or more sensors (e.g., optical sensors used with machine-vision algorithms, position encoders, temperature sensors, moisture or humidity sensors). Alternatively, one or more robots can be remotely controlled by a human operator. Alternatively, one or more robots can be partially remotely controlled by a human operator and partially autonomously controlled.

As used herein, the term "partial processing equipment" refers to any equipment or appliance used partially prepare "regulated consumables" including, but not limited to portioning (selecting a quantity), heating, chilling, shaking, airing, packaging, or labeling in compliance with one or more regulations. Partial processing equipment may also be able to control temperature, pressure, mechanical stability, humidity, airflow, etc.

As used herein the terms "food item" and "food product" refer to any item or product intended for human consumption, including ingredients for same. One of ordinary skill in the culinary arts and food preparation will readily appreciate the broad applicability of the systems, methods, and apparatuses described herein across any number of prepared food items or products, including cooked and uncooked food items or products, and ingredients or components of food items and products. In some instances, well-known structures associated with computing systems including client and server computing systems, machine learnings, machine learning systems, as well as networks, including various types of telecommunications networks, have not been shown or described in detail to avoid unnecessarily obscuring descriptions of the implementations. Examples of food items, as referred to herein, include entrees, pizzas, appetizers, hors d'oeuvre, antipasti, deserts, candy, confectionary items, pastries, side dishes, soups, pasta, salads, salad bar items, sandwiches, a particular course of a multi-course meal, breakfast items, brunch items, lunch items, happy hour menu items, dinner items, late night menu items, main course items, beverages, alcohol, wine, beer, liquor, cocktails, soft drinks, coffee, tea, buffet items, combination meals, vegetarian dishes, meat dishes, fish dishes, chicken dishes, pork dishes, roasts, gluten free dishes, organic dishes, vegan dishes, animal product dishes, dietary needs dishes, special order items, menu items, off-menu items, substitution items, customized menu items, customized meals, catered items, build-your-own pizzas, build-your-own menu items, build-your-own meals, take-out items, promotional items, specials, coupon items and pre-packaged items.

As used herein the term "vehicle" refers to any car, truck, van, train, watercraft, aircraft, drone, multi-rotor copter, or other vehicle useful in cooking and heating a food item for distribution to a customer. The size and shape of the vehicle may depend in part on licensing requirements of the locality in which the vehicle is intended to operate. In some instances, the size and shape of the vehicle may depend on the street layout and the surrounding environment of the locality in which the vehicle is intended to operate. For example, small, tight city streets may require a vehicle that is comparatively shorter and/or narrower than a vehicle that can safely and conveniently navigate larger, suburban thoroughfares.

As used herein the term "service area" refers to a physical area in which food items are provided or made available to consumers. The physical area is defined as a region in which physical sale locations (e.g., stores, vending machines, kiosks) are located and delivery vehicles provide or make available food items. The region may be defined, for example, by physical boundaries (e.g., streets, rivers); postal codes; provincial, county, or local government organization; or combinations thereof. The service area is a geographic region comprising a plurality of food services establishments supplied by a logistics provider or commissary. A service area represents an area serviced or defined by one or more of logistics suppliers, processors, trucking companies, shipping companies, wholesalers, resellers, supply chains managers, producers, farms, agricultural cooperatives, plantations, agricultural areas, markets, sales regions, distributors, retailers, importers, exporters, restaurants, restaurant chains, commissaries, grocery stores, co-ops, farmers markets, snack stands, concession stands, food trucks, food carts, vending kiosks, locker kiosks, hot dog carts, pop-up restaurants, supper clubs, temporary restaurants, venues, festivals, concerts, neighborhoods, boroughs, camps, community centers, cities, towns, counties, states, commonwealths, provinces, parishes, municipalities, districts, regions, countries and governments.

According to some examples, a vehicle for preparation and drone based delivery of food items is described. The vehicle may include a cargo area configured to provide a sterile environment for preparation of the food items; a storage area for a plurality of drones, the plurality of drones configured to carry payloads comprising the food items to a plurality of delivery locations; and one or more docking stations configured to provide a secure docking mechanism to the plurality of drones; facilitate transfer of the food items as the payloads to the plurality of drones; and provide a launching mechanism for the plurality of drones. The vehicle may also include an on-board controller configured to determine vehicle travel information, drone travel information, food item information, and preparation information associated with the food items to be prepared and delivered; control one or more food preparation equipment to execute the preparation of the food items; adjust one or more parameters of the preparation of the food items based on one or more of the vehicle travel information, availability of the plurality of drones, or delivery progress of the plurality of drones; and control an operation of the plurality of drones to carry the prepared food items from the delivery destination to the plurality of delivery locations.

According to other examples, the plurality of drones may include one or more aerial drones or one or more ground based drones. At least one of the plurality of drones may be configured to carry multiple payloads to a plurality of delivery locations. The on-board controller may be further configured to adjust one or more parameters of the preparation, vehicle travel, and/or drone travel based on one or more of the vehicle travel information, the drone travel information, the food item information, and the preparation information, where the one or more parameters of the vehicle travel include a speed of the vehicle, a route of travel of the vehicle, or a selection of the delivery destination, and the one or more parameters of the drone travel include a speed of each drone, a route of travel of each drone, a number of payloads for each drone, or a selection of the plurality of delivery locations. The on-board controller may be further configured to measure a characteristic of an external environment at the delivery destination; determine whether the delivery destination is suitable for delivery of the prepared food items to a delivery location by at least one of the plurality of drones based at least in part on the measured characteristic of the external environment at the delivery destination; in response to a determination that the delivery destination is not suitable for the delivery of the prepared food items due to a structural hinderance, select one or more of a new delivery destination or a new delivery method; and in response to a determination that the delivery destination is not suitable for the delivery of the prepared food items due to a weather-related or regulatory hinderance, select one or more of a new delivery destination, a new delivery time, or a new delivery method. The on-board controller may also be configured to in response to a determination that the delivery destination is not suitable for the delivery of the prepared food items, transmit one or more of a recommendation or a selection associated with the new delivery destination, the new delivery time, or the new delivery method to a delivery recipient; and receive a confirmation of the recommendation or an indication of the selection from the delivery recipient. The at least one of the plurality of drones may include a sensor configured to sense the measured characteristic, and wherein a controller on the at least one of the plurality of drones is configured to select another delivery location based on the sensed characteristic.

According to further examples, at least one of the one or more docking stations may include a skirt having a shape that is complementary to a corresponding portion of a dock interface of a drone and the skirt is configured to contact the corresponding portion of the dock interface along a portion of an inner periphery of the skirt when the drone is docked to the at least one of the one or more docking stations. At least one of the one or more docking stations may include a skirt having a shape that is complementary to a corresponding portion of a dock interface of a drone and the skirt is configured to contact the corresponding portion of the dock interface along an entire inner periphery of the skirt when the drone is docked to the at least one of the one or more docking stations. At least one of the one or more docking stations may include a robotic appendage to transfer multiple payloads to a single drone configured to carry the multiple payloads to a plurality of delivery locations. At least one of the one or more docking stations may include a transfer lock to transfer a payload to a drone when docked to the at least one of the one or more docking stations, the transfer lock comprising a transfer chamber with two or more doors such that an opening and a closing of the two or more doors minimizes an exposure of an interior of the vehicle to an external environment exterior to the vehicle. The vehicle may further include a refueling module to refuel the plurality of drones, where the refueling module is positioned in one of the one or more docking stations or the storage area for the plurality of drones, and the refueling module is configured to refuel the plurality of drones by providing an electrical charge, a liquid fuel, or a gaseous fuel. The on-board controller may be further configured to control the one or more food preparation equipment to autonomously execute the preparation of the food items such that at least a portion of the food items are prepared when the vehicle reaches the delivery destination. The on-board controller may also be configured to control the one or more food preparation equipment to autonomously execute the preparation such that at least a portion of the food items are prepared while the vehicle is at the delivery destination. The vehicle may further include a delivery window to provide direct delivery of at least a portion of the prepared food items to customers from the vehicle along with the delivery of at least another portion of the prepared food items via the plurality of drones.

According to other examples, a docking station for a food item preparation and delivery vehicle is described. The docking station may include a base affixed to a roof or a sidewall of a cargo area of the vehicle; and one or more docks, each of the one or more docks coupled to a transfer mechanism to receive prepared food items from the cargo area of the vehicle. The one or more docks may be configured to provide a secure docking mechanism to a plurality of drones configured to deliver the prepared food items from a delivery destination of the vehicle to a plurality of delivery locations; transfer of the food items received from the cargo area of the vehicle as payloads to the plurality of drones; and provide a launching mechanism for the plurality of drones.

According to some examples, the plurality of drones may include aerial drones and/or ground based drones. The one or more docks may include an inverted skirt having a frustoconical shape that is complementary to a corresponding portion of a dock interface of a drone and the skirt is configured to contact the corresponding portion of the dock interface along at least a portion of an inner periphery of the skirt when the drone is docked to at least one of the one or more docks. The skirt may include a plurality of collapsible, telescoping, and/or movable sections at different heights relative to the roof of the vehicle and/or the base of the docking station. The docking station may further include a robotic appendage to transfer a single payload or multiple payloads to a single drone. The docking station may also include a transfer lock to transfer a payload to a drone when docked to the docking station, the transfer lock comprising a transfer chamber with two or more doors such that an opening and a closing of the two or more doors minimizes an exposure of an interior of the vehicle to an external environment exterior to the vehicle. The docking station may further include a refueling module to refuel the plurality of drones when docked to the docking station, where the refueling module is configured to refuel the plurality of drones by providing an electrical charge, a liquid fuel, or a gaseous fuel. The docking station may further include one or more environmental protection elements and/or physical restraints, wherein the one or more environmental protection elements and/or physical restraints are activated based on one or more of whether the vehicle is parked, a weather condition at the delivery destination, or a payload type.

According to further examples, a system for preparation and drone based delivery of food items is described. The system may include a plurality of drones configured to carry payloads comprising the food items to a plurality of delivery locations; and a vehicle. The vehicle may include a cargo area configured to provide a sterile environment for preparation of the food items; one or more docking stations configured to provide a secure docking mechanism to the plurality of drones; facilitate transfer of the food items as the payloads to the plurality of drones; and provide a launching mechanism for the plurality of drones; and a controller. The controller may be configured to determine vehicle travel information, drone travel information, food item information, and preparation information associated with the food items to be prepared and delivered; transmit instructions to an on-board controller of the vehicle to control one or more food preparation equipment to execute the preparation such that the food items; adjust one or more parameters of the preparation of the food items based on one or more of the vehicle travel information, availability of the plurality of drones, or delivery progress of the plurality of drones; and control an operation of the plurality of drones to carry the prepared food items from the delivery destination to the plurality of delivery locations.

According to other examples, the plurality of drones may include one or more aerial drones or one or more ground based drones and at least one of the plurality of drones is configured to carry multiple payloads to a plurality of delivery locations. The controller may be further configured to adjust one or more parameters of the preparation, vehicle travel, and/or drone travel based on one or more of the travel information, the vehicle travel information, the drone travel information, the food item information, and the preparation information; and transmit the adjusted one or more parameters to the on-board controller, where the one or more parameters of the vehicle travel include a speed of the vehicle, a route of travel of the vehicle, or a selection of the delivery destination, the one or more parameters of the drone travel include a speed of each drone, a route of travel of each drone, a number of payloads for each drone, or a selection of the plurality of delivery locations. The controller may also be configured to receive a measured a characteristic of an external environment at the delivery destination from one or more of a sensor on the vehicle, a sensor at the delivery destination, or a third party information service; and determine whether the delivery destination is suitable for delivery of the prepared food items to a delivery location by at least one of the plurality of drones based at least in part on the measured characteristic of the external environment at the delivery destination. The controller may be further configured to in response to a determination that the delivery destination is not suitable for the delivery of the prepared food items due to a structural hinderance, select one or more of a new delivery destination or a new delivery method; and in response to a determination that the delivery destination is not suitable for the delivery of the prepared food items due to a weather-related or regulatory hinderance, select one or more of a new delivery destination, a new delivery time, or a new delivery method. The controller may be further configured to in response to a determination that the delivery destination is not suitable for the delivery of the prepared food items, transmit one or more of a recommendation or a selection associated with the new delivery destination, the new delivery time, or the new delivery method to a delivery recipient; and receive a confirmation of the recommendation or an indication of the selection from the delivery recipient. The controller may also control the one or more food preparation equipment to autonomously execute the preparation of the food items such that at least a portion of the food items are prepared when the vehicle reaches the delivery destination.

There are various vehicles by which processes and/or systems and/or other technologies described herein may be affected (e.g., hardware, software, and/or firmware), and the preferred vehicle will vary with the context in which the processes and/or systems and/or other technologies are deployed. For example, if an implementer determines that speed and accuracy are paramount, the implementer may opt for mainly hardware and/or firmware vehicle; if flexibility is paramount, the implementer may opt for mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disk (DVD), a digital tape, a computer memory, a solid state drive (SSD), etc.; and a transmission type medium such as a digital and/or an analog communication medium (e.g., a fiber optic cable, a waveguide, a wired communication link, a wireless communication link, etc.).

It is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A processing system may be implemented utilizing any suitable commercially available components, such as those found in data computing/communication and/or network computing/communication systems. The herein described subject matter sometimes illustrates different components contained within, or connected with, different other components. Such depicted architectures are merely exemplary, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A vehicle for preparation and drone based delivery of food items, the vehicle comprising:
   a cargo area configured to provide a sterile environment for preparation of the food items via preparation equipment;
   a storage area for a plurality of drones, the plurality of drones configured to carry payloads comprising the food items to a plurality of delivery locations;
   one or more docking stations configured to:
      provide a secure docking mechanism to the plurality of drones;
      facilitate transfer of the food items as the payloads to the plurality of drones; and
      provide a launching mechanism for the plurality of drones; and
   an on-board controller configured to:
      determine vehicle travel information, drone travel information, food item information, and preparation information associated with the food items to be prepared and delivered;
      control one or more food preparation equipment to execute the preparation of the food items;
      adjust one or more parameters of the preparation of the food items based on one or more of the vehicle travel information, availability of the plurality of drones, or delivery progress of the plurality of drones; and
      control an operation of the plurality of drones to carry the prepared food items from the delivery destination to the plurality of delivery locations.

2. The vehicle of claim 1, wherein the plurality of drones includes one or more aerial drones or one or more ground based drones.

3. The vehicle of claim 1, wherein at least one of the plurality of drones is configured to carry multiple payloads to the plurality of delivery locations.

4. The vehicle of claim 1, wherein the on-board controller is further configured to:
   adjust one or more parameters of the preparation, vehicle travel, and/or drone travel based on one or more of the vehicle travel information, the drone travel information, the food item information, and the preparation information, and
   wherein
      the one or more parameters of the vehicle travel include a speed of the vehicle, a route of travel of the vehicle, or a selection of the delivery destination,
      the one or more parameters of the drone travel include a speed of each drone, a route of travel of each drone, a number of payloads for each drone, or a selection of the plurality of delivery locations.

5. The vehicle of claim 1, wherein the on-board controller is further configured to:
measure a characteristic of an external environment at the delivery destination; and
determine whether the delivery destination is suitable for delivery of the prepared food items to a delivery location by at least one of the plurality of drones based at least in part on the measured characteristic of the external environment at the delivery destination.

6. The vehicle of claim 5, wherein the on-board controller is further configured to:
in response to a determination that the delivery destination is not suitable for the delivery of the prepared food items due to a structural hinderance, select one or more of a new delivery destination or a new delivery method; and
in response to a determination that the delivery destination is not suitable for the delivery of the prepared food items due to a weather-related or regulatory hinderance, select one or more of a new delivery destination, a new delivery time, or a new delivery method.

7. The vehicle of claim 6, wherein the on-board controller is further configured to:
in response to a determination that the delivery destination is not suitable for the delivery of the prepared food items, transmit one or more of a recommendation or a selection associated with the new delivery destination, the new delivery time, or the new delivery method to a delivery recipient; and
receive a confirmation of the recommendation or an indication of the selection from the delivery recipient.

8. The vehicle of claim 5, wherein the at least one of the plurality of drones includes a sensor configured to sense the measured characteristic, and wherein a controller on the at least one of the plurality of drones is configured to select another delivery location based on the sensed characteristic.

9. The vehicle of claim 1, wherein at least one of the one or more docking stations comprises a skirt having a shape that is complementary to a corresponding portion of a dock interface of a drone and the skirt is configured to contact the corresponding portion of the dock interface along a portion of an inner periphery of the skirt when the drone is docked to the at least one of the one or more docking stations.

10. The vehicle of claim 1, wherein at least one of the one or more docking stations comprises a skirt having a shape that is complementary to a corresponding portion of a dock interface of a drone and the skirt is configured to contact the corresponding portion of the dock interface along an entire inner periphery of the skirt when the drone is docked to the at least one of the one or more docking stations.

11. The vehicle of claim 1, wherein at least one of the one or more docking stations comprises a robotic appendage to transfer multiple payloads to a single drone configured to carry the multiple payloads to a plurality of delivery locations.

12. The vehicle of claim 1, wherein at least one of the one or more docking stations comprises a transfer lock to transfer a payload to a drone when docked to the at least one of the one or more docking stations, the transfer lock comprising a transfer chamber with two or more doors such that an opening and a closing of the two or more doors minimizes an exposure of an interior of the vehicle to an external environment exterior to the vehicle.

13. The vehicle of claim 1, further comprising:
a refueling module to refuel the plurality of drones, wherein the refueling module is positioned in one of the one or more docking stations or the storage area for the plurality of drones, and the refueling module is configured to refuel the plurality of drones by providing an electrical charge, a liquid fuel, or a gaseous fuel.

14. The vehicle of claim 1, wherein the on-board controller is further configured to:
control the one or more food preparation equipment to autonomously execute the preparation of the food items such that at least a portion of the food items are prepared when the vehicle reaches the delivery destination.

15. The vehicle of claim 1, wherein the on-board controller is further configured to:
control the one or more food preparation equipment to autonomously execute the preparation such that at least a portion of the food items are prepared while the vehicle is at the delivery destination.

16. The vehicle of claim 1, further comprising:
a delivery window to provide direct delivery of at least a portion of the prepared food items to customers from the vehicle along with the delivery of at least another portion of the prepared food items via the plurality of drones.

* * * * *